United States Patent
Gentry

(10) Patent No.: US 8,515,058 B1
(45) Date of Patent: Aug. 20, 2013

(54) BOOTSTRAPPABLE HOMOMORPHIC ENCRYPTION METHOD, COMPUTER PROGRAM AND APPARATUS

(75) Inventor: Craig B. Gentry, New York, NY (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 483 days.

(21) Appl. No.: 12/943,240

(22) Filed: Nov. 10, 2010

Related U.S. Application Data

(60) Provisional application No. 61/259,796, filed on Nov. 10, 2009.

(51) Int. Cl.
*H04L 29/06* (2006.01)

(52) U.S. Cl.
USPC .......................................................... 380/28

(58) Field of Classification Search
USPC .......................................................... 380/28
See application file for complete search history.

(56) References Cited

U.S. PATENT DOCUMENTS

| | | | | |
|---|---|---|---|---|
| 4,405,829 A * | 9/1983 | Rivest et al. | ..................... | 380/30 |
| 6,530,020 B1 * | 3/2003 | Aoki | ............................. | 713/163 |
| 7,500,111 B2 * | 3/2009 | Hacigumus et al. | .......... | 713/193 |
| 7,640,432 B2 * | 12/2009 | Gennaro et al. | .............. | 713/180 |
| 2002/0103999 A1 * | 8/2002 | Camnisch et al. | ............ | 713/155 |
| 2002/0164035 A1 * | 11/2002 | Yokota et al. | ................. | 380/278 |
| 2003/0172262 A1 * | 9/2003 | Curry | ............................. | 713/156 |
| 2005/0120233 A1 * | 6/2005 | Halcrow et al. | ............... | 713/193 |
| 2005/0193048 A1 * | 9/2005 | Vaudenay et al. | ............ | 708/400 |
| 2006/0015946 A1 * | 1/2006 | Yagawa | .......................... | 726/32 |
| 2006/0262933 A1 * | 11/2006 | Furukawa | ..................... | 380/281 |
| 2007/0140479 A1 * | 6/2007 | Wang et al. | ..................... | 380/30 |
| 2007/0156586 A1 * | 7/2007 | Kerschbaum | ................... | 705/50 |
| 2007/0192864 A1 * | 8/2007 | Bryant et al. | ..................... | 726/23 |
| 2008/0010467 A1 * | 1/2008 | Kerschbaum et al. | ........ | 713/189 |
| 2008/0226066 A1 * | 9/2008 | Yi et al. | .......................... | 380/47 |
| 2008/0294909 A1 * | 11/2008 | Ostrovsky et al. | ............ | 713/189 |
| 2009/0062942 A1 * | 3/2009 | Smaragdis et al. | ............. | 700/94 |
| 2009/0103721 A1 * | 4/2009 | Sada et al. | ....................... | 380/42 |
| 2009/0268908 A1 * | 10/2009 | Bikel et al. | ..................... | 380/255 |
| 2009/0327748 A1 * | 12/2009 | Agrawal et al. | ............... | 713/189 |

\* cited by examiner

*Primary Examiner* — Michael S McNally

(57) ABSTRACT

Embodiments of the present invention describe a fully homomorphic encryption scheme using a "bootstrapable" homomorphic encryption scheme that evaluate a function $f$ when $f$ is the encryption schemes own decryption function. Specifically, the fully homomorphic encryption scheme uses the "bootstrapable" homomorphic encryption scheme to determine the decryption function to decrypt data encrypted under the fully homomorphic encryption scheme.

16 Claims, No Drawings

BOOTSTRAPPABLE HOMOMORPHIC ENCRYPTION METHOD, COMPUTER PROGRAM AND APPARATUS

CROSS REFERENCE TO RELATED APPLICATIONS

This application claims the benefit of PPA Ser. No. 61/259,796, filed Nov. 10, 2009 by the present inventor, which is incorporated by reference.

This application is related to "A Fully Homomorphic Encryption Method Based on a Bootstrappable Encryption Scheme, Computer Program and Apparatus", Ser. No. 12/590,584. That application, also filed on Nov. 10, 2009 by the present inventor, describes and claims a method to transform a bootstrappable encryption scheme into a fully homomorphic encryption scheme, but it does not claim a bootstrappable encryption scheme or a fully encryption scheme. Roughly speaking, the present application claims and describes (among other things) a bootstrappable encryption scheme, and also claims a fully homomorphic encryption scheme (which became possible once a bootstrappable encryption scheme was constructed). These comments are meant only to sketch how the subject matters of the two applications differ, and are not meant to be limiting.

STATEMENT OF GOVERNMENTAL SUPPORT

This invention was made with Government support under contract CNS-0715739 awarded by the National Science Foundation. The Government has certain rights in this invention.

FIELD OF THE INVENTION

This invention relates generally to encryption and decryption algorithms and apparatus and, more specifically, to homomorphic encryption algorithms and apparatus.

BACKGROUND OF THE INVENTION

A fully homomorphic encryption scheme allows the computation of arbitrary functions over encrypted data without requiring the use of a decryption key. However, actually constructing a fully homomorphic encryption scheme was a major open problem in cryptography for over 30 years, since 1978. This application will describe (among other things) a bootstrappable homomorphic encryption scheme, which can be used to construct (the first) fully homomorphic encryption scheme. However, first we provide some background.

A (regular) (public-key) encryption scheme allows for the encryption and decryption of data. More formally, a public-key encryption scheme has three procedures: KeyGen, Encrypt and Decrypt. A user uses the KeyGen procedure to generate its secret and public keys sk and pk, and it publishes its public key pk so that other parties can easily obtain it. Later, when a sender wants to send an encrypted message m to the user, the sender computes a ciphertext using the Encrypt procedure with the user's public key: $c \leftarrow \text{Encrypt}(pk, m)$. The user uses its secret key to recover the message from the ciphertext $m \leftarrow \text{Decrypt}(sk, c)$.

A homomorphic encryption scheme has all of the properties of a regular encryption scheme. However, it also allows anyone to modify what is encrypted, even without the secret key. For example, an additively homomorphic encryption scheme allows anyone to do the following. Suppose ciphertext $c_1$ encrypts the message $m_1$ under public key pk, and ciphertext $c_2$ encrypts the message $m_2$ under pk. Then, given $c_1, c_2$, and pk, anyone can compute a ciphertext c that encrypts $m_1+m_2$ under pk. When we say "anyone" can do this, we mean in particular that the new ciphertext c can be computed efficiently without knowing sk. (Of course, computing c with sk is easy: using sk, one can use Decrypt to recover $m_1$ and $m_2$ from $c_1$ and $c_2$, and then one can set $c \leftarrow \text{Encrypt}(pk, m_1+m_2)$.) A multiplicatively homomorphic encryption scheme allows anyone to use $c_1, c_2$, and pk to compute a ciphertext c that encrypts $m_1 \times m_2$ under pk.

The essence of a fully homomorphic encryption (FHE) scheme is that it allows any function of the data or messages to be evaluated, while this data remains encrypted—not merely the addition function or the multiplication function. More formally, given ciphertexts that encrypt $\pi_1, \ldots, \pi_t$, fully homomorphic encryption should allow anyone (not just the key-holder) to output a ciphertext that encrypts $f(\pi_1, \ldots, \pi_t)$ for any desired function $f$, as long as that function can be efficiently computed. No information about $\pi_1, \ldots, \pi_t$ or $f(\pi_1, \ldots, \pi_t)$, or any intermediate plaintext values, should leak; the inputs, output and intermediate values are always encrypted. More specifically, in addition to the usual algorithms KeyGen, Encrypt, and Decrypt of an encryption scheme, a fully homomorphic encryption scheme $\epsilon$ also has an efficient algorithm Evaluate$_\epsilon$ that, for any valid public key pk, any circuit C (which represents the function $f$ that you want to be computed), and any ciphertexts $\psi_i \leftarrow \text{Encrypt}_\epsilon(pk, \pi_i)$, outputs $$\psi \leftarrow \text{Evaluate}_\epsilon(pk, C, \psi_1, \ldots, \psi_t),$$

a valid encryption of $C(\pi_1, \ldots, \pi_t)$ under pk. By a valid encryption of $C(\pi_1, \ldots, \pi_t)$ under pk, we mean that Decrypt $(sk, \psi)=C(\pi_1, \ldots, \pi_t)$. We say that an encryption scheme is fully homomorphic if Evaluate works correctly for any circuit C. That is, for any function $f$ that can be performed efficiently on unencrypted data (and it was already well-known that such a function can be computed efficiently via a boolean circuit C), that function can be performed efficiently on encrypted data, as long as the data is encrypted with an encryption scheme that is fully homomorphic.

One might say that a homomorphic encryption scheme is "malleable", in the sense that the plaintext data can be modified while it is encrypted, while it is "inside the encryption box". A useful, readable reference on homomorphic encryption is the article by Craig Gentry, "Computing Arbitrary Functions of Encrypted Data", in the March 2010 issue of Communications of the ACM, available online here: http://crypto.stanford.edu/craig/easy-fhe.pdf. This article uses a physical analogy to describe homomorphic encryption. Encryption is like a lockbox: the sender puts his data inside a box for which only the user has a key, and then he sends the lockbox to the user; the user "decrypts" by unlocking the box. Homomorphic encryption is like a locked glovebox. It is like a lockbox in the sense that once something is locked inside, only the user with the secret key can remove it. However, the gloves allow anyone to manipulate or "process" objects while they remain securely inside a box.

Why is homomorphic encryption desirable, why would you want to let ciphertexts be malleable so that anyone can modify what is encrypted? Essentially, the answer is that there are many settings where you might want to let someone else process your data, but you don't want to give away access to your data—i.e., you want to keep your data private. Consider a search engine query (e.g., a Google search). You might like to get a response from Google, without revealing to Google exactly what your query is. If you have a fully homomorphic encryption scheme, this actually becomes possible.

Suppose (the bits of) your query is $\pi_1, \ldots, \pi_t$. You run KeyGen to get a key-pair (sk, pk) and you encrypt these bits under pk using the encryption scheme to get some ciphertexts $\psi_1, \ldots, \psi_t$ that you send to Google. Now suppose that Google agrees to use fully homomorphic encryption to process encrypted queries. Google has some function $f$, which can be represented as a boolean circuit C, that it uses to respond to queries. (This function $f$ depends on the bits of the query, on the bits of the (huge amount of) data that Google has on its servers, and on the particular algorithm that Google uses to respond to searches.) Google simply runs $\psi \leftarrow \text{Evaluate}_\epsilon(\text{pk}, C, \psi_1, \ldots, \psi_t)$, and sends c to the user. (In practice, the response may consist of more than one ciphertext; in particular, it will if C has more than one output wire.) Finally, the user obtains $C(\pi_1, \ldots, \pi_t) \leftarrow \text{Decrypt}(\text{sk}, \psi)$, which is exactly the response that it wanted from Google. But, due to the encryption, Google never learns any information about the query that it answered! Fully homomorphic encryption is also very useful in many cloud computing settings.

The notion of fully homomorphic encryption has been known for a long time. In 1978, Rivest, Adleman and Dertouzous suggested that such a scheme may be possible, referring to the notion as a privacy homomorphism, and they suggested some possible schemes, but these schemes were quickly found to be insecure—i.e., the ciphertexts did not actually hide the message well. (See R. Rivest, L. Adleman, and M. Dertouzos, "On data banks and privacy homomorphisms", in *Foundations of Secure Computation*, pages 169-180, 1978.) Since that time, it has been a major open problem in cryptography to find a secure fully homomorphic encryption scheme.

(The notion of a "provably secure" encryption scheme will be known to those well-versed in the art, but may be a bit mysterious to outsiders. Roughly speaking, in modern cryptography, one is expected to prove that the security of a proposed cryptosystem is based on an established problem that is believed to be hard. For example, one might prove a statement like the following: if there is an attacker that can efficiently break this cryptosystem, then this attacker can be used as a subroutine to make an efficient algorithm that factors very large integers into their prime factors. Since it is widely assumed that no efficient algorithm for factoring large numbers exists, the above statement proves that the scheme is secure, under the assumption that factoring is "hard". There are, of course, many other problems that are assumed to be hard, besides factoring.)

In the prior art, there have been provably secure encryption schemes that are partially homomorphic. For example, there are encryption schemes that are additively homomorphic. There are also schemes that are multiplicatively homomorphic. However, there are no schemes that are fully homomorphic. Unfortunately, if you have an encryption scheme that is only (say) additively homomorphic, it cannot be used (for example) to enable an encrypted Google search as described above, because Google's search function will be quite complicated, certainly not (even close to being) expressible by a sequence of addition operations. The same is true of encryption schemes that are only multiplicatively homomorphic (and not homomorphic over addition).

The cryptographic literature on homomorphic encryption is quite extensive, and indicative of how important the open problem of fully homomorphic encryption was. In fact, the first public-key encryption scheme, called RSA for its authors (R. Rivest, A. Shamir, and L. Adleman. A method for obtaining digital signatures and public-key cryptosystems. In Comm. of the ACM, 21:2, pages 120-126, 1978), was multiplicatively homomorphic: given an RSA public key (N, e) and ciphertexts $c_1 = m_1^e \mod N, \ldots, c_t = m_t^e \mod N$, one can compute $c = \Pi_{i=1}^t c_i \mod N = (\Pi_{i=1}^t m_i)^e \mod N$, a ciphertext that encrypts the product of the original plaintexts. (Possibly, this multiplicative homomorphism of RSA awakened Rivest, Adleman and Dertouzous to the notion of fully homomorphic encryption.) The first partially (additively in this case) homomorphic encryption scheme with a desirable property called "semantic security" against chosen plaintext attacks was by Goldwasser and Micali, "Probabilistic encryption and how to play mental poker keeping secret all partial information", Proc. 14th Symposium on Theory of Computing: 365-377.

It is known that one can construct additively homomorphic encryption schemes from lattices or linear codes. The lattice-based scheme and the Reed-Solomon-code-based scheme allow multiplications, though with exponential expansion in ciphertext size. Ciphertexts implicitly contain an "error" that grows as ciphertexts are added together. Thus, ciphertexts output by Evaluate do not have the same distribution as ciphertexts output by Encrypt, and at some point the error may become large enough to cause incorrect decryption. For this reason, the homomorphism is sometimes referred to as a "pseudohomomorphism" or a "bounded homomorphism".

There are schemes that use a singly homomorphic encryption scheme to construct a scheme that can perform more complicated homomorphic operations (T. Sander, A. Young, and M. Yung. Non-interactive cryptocomputing for NC1. In Proc. of FOCS '99, pages 554-567, 1999, and Y. Ishai and A. Paskin. Evaluating Branching Programs on Encrypted Data. In Proc. of TCC '07. Sanders, Young and Yung (SYY) show that one can use a circuit-private additively homomorphic encryption scheme to construct a circuit-private scheme that can handle arbitrary circuits, where the ciphertext size increases exponentially with the depth of the circuit. Their scheme may, therefore, feasibly evaluate NC1 circuits. Ishai and Paskin show how to evaluate branching programs, and with much smaller ciphertexts than SYY. In their scheme Evaluate outputs a ciphertext whose length is proportional to the length of the branching program. This remains true even if the size of the branching program is very large, e.g., super-polynomial. However, the computational complexity of their scheme is proportional to the size.

In more detail, Ishai and Paskin use a "leveled" approach to evaluate a branching program. A (deterministic) branching program (BP) P is defined by a DAG from a distinguished initial node in which each nonterminal node has two outgoing edges labeled 0 and 1, and where the terminal nodes also have labels.

Cryptographers have accumulated an assortment of applications for fully homomorphic encryption since then. However, until now, there was no viable construction of a fully homomorphic encryption scheme. In fact, previous homomorphic encryption schemes could compute only very simple functions.

SUMMARY

The foregoing and other problems are overcome by the use of the exemplary embodiments of this invention.

This specification describes in part the first fully homomorphic encryption scheme, solving a central open problem in cryptography proposed by Rivest et al. in 1978. To construct a fully homomorphic encryption scheme, we use a stepping-stone: we construct a "somewhat homomorphic" (i.e., not "fully homomorphic") encryption scheme that has a special property called bootstrappability. This bootstrappable somewhat homomorphic encryption scheme cannot immediately, by itself, correctly evaluate any circuit homomorphically (as a fully homomorphic scheme could), but it can evaluate a very important circuit—namely, the circuit corresponding to the decryption algorithm of the bootstrappable encryption scheme itself. (Strictly speaking, the bootstrappable encryption scheme can evaluate a function that is slightly more complex than its own decryption function.) This self-referential property of the bootstrappable encryption scheme turns out to be very useful—in particularly, by using a recursive self-embedding of the bootstrappable encryption scheme, we can obtain a fully homomorphic encryption scheme. The above description is just a sketch of the idea; more precise details are given in the Detailed Description.

So, a bootstrappable encryption scheme is very useful; it can be used to construct a fully homomorphic encryption scheme. Our somewhat homomorphic encryption scheme is also useful "on its own". As mentioned above, previous homomorphic encryption schemes could evaluate only very simple functions homomorphically. However, our somewhat homomorphic scheme is able to compute (multivariate) polynomials of fairly high degree homomorphically.

In one embodiment, our somewhat homomorphic encryption scheme uses ideal lattices. However, other embodiments are possible.

In a first aspect thereof the exemplary embodiments of this invention provide a method that comprises receiving a plurality of ciphertexts that encrypt information under a public key of a bootstrappable homomorphic encryption scheme; and applying the Evaluate function of the bootstrappable homomorphic encryption scheme to inputs comprising the ciphertexts and a circuit.

In a further aspect thereof the exemplary embodiments of this invention provide a method that comprises receiving a plurality of ciphertexts that encrypt information under a public key of a homomorphic encryption scheme, where the homomorphic encryption scheme is operable to compactly evaluate the addition of two values and also operable to compactly evaluate a multiplication of two values, where the homomorphic encryption scheme uses public key information and secret key information, and includes an encryption function, a decryption function and an evaluation function, where the secret key information in the homomorphic encryption scheme comprises a secret representation of an algebraic ideal in a ring, where the encryption function takes input comprising first information and outputs second information comprising an element of the ring that is in a coset of the algebraic ideal, where the distribution of coset conditioned on the first information has high min-entropy, where the decryption function operates to decrypt data encrypted under the certain public key by using at least the secret representation of the algebraic ideal in the secret key information; and applying the Evaluate function of the homomorphic encryption scheme to inputs comprising the ciphertexts and a circuit.

In a further aspect thereof the exemplary embodiments of this invention provide a program storage device readable by a machine and tangibly embodying a program of instructions executable by the machine for performing operations that comprise receiving a plurality of ciphertexts that encrypt information under a public key of a bootstrappable homomorphic encryption scheme; and applying the Evaluate function of the bootstrappable homomorphic encryption scheme to inputs comprising the ciphertexts and a circuit.

In a further aspect thereof the exemplary embodiments of this invention provide a program storage device readable by a machine and tangibly embodying a program of instructions executable by the machine for performing operations that comprise receiving a plurality of ciphertexts that encrypt information under a public key of a homomorphic encryption scheme, where the homomorphic encryption scheme is operable to compactly evaluate the addition of two values and also operable to compactly evaluate a multiplication of two values, where the homomorphic encryption scheme uses public key information and secret key information, and includes an encryption function, a decryption function and an evaluation function, where the secret key information in the homomorphic encryption scheme comprises a secret representation of an algebraic ideal in a ring, where the encryption function takes input comprising first information and outputs second information comprising an element of the ring that is in a coset of the algebraic ideal, where the distribution of coset conditioned on the first information has high min-entropy, where the decryption function operates to decrypt data encrypted under the certain public key by using at least the secret representation of the algebraic ideal in the secret key information; and applying the Evaluate function of the homomorphic encryption scheme to inputs comprising the ciphertexts and a circuit.

Follow-on Work

Since the present inventor's announcement of the first fully homomorphic encryption scheme (Craig Gentry, "Fully homomorphic encryption using ideal lattices", in ACM Symposium on Theory of Computing (STOC) 2009, pages 169-178), there has been considerable follow-on work. Most notably the scheme has been implemented by different teams of researchers. See Nigel P. Smart and Frederik Vercauteren, "Fully Homomorphic Encryption with Relatively Small Key and Ciphertext Sizes", in 13th International Conference on Practice and Theory in Public Key Cryptography (PKC), pages 420-443. See also Craig Gentry and Shai Halevi, "Implementing Gentry's Fully Homomorphic Encryption Scheme", available at http://eprint.iacr.org/2010/520.

DETAILED DESCRIPTION

1 Introduction

We propose a solution to the old open problem of constructing a fully homomorphic encryption scheme. This notion, originally called a privacy homomorphism, was introduced by Rivest, Adleman and Dertouzous (R. Rivest, L. Adleman, and M. Dertouzos, "On data banks and privacy homomorphisms", in *Foundations of Secure Computation*, pages 169-180, 1978) shortly after the invention of RSA by Rivest, Shamir, and Adleman (R. Rivest, A. Shamir, and L. Adleman, "A method for obtaining digital signatures and public-key cryptosystems", in *Comm. of the ACM*, 21:2, pages 120-126, 1978). Basic RSA is a multiplicatively homomorphic encryption scheme—i.e., given RSA public key pk=(N, e) and ciphertexts $\{\psi_i \leftarrow \pi_i^e \mod N\}$, one can efficiently compute $\Pi_i \psi_i = (\Pi_i \pi_i)^e \mod N$, a ciphertext that encrypts the product of the original plaintexts. One imagines that it was RSA's multiplicative homomorphism, an accidental but useful property, that led Rivest, Adleman and Dertouzos to ask a natural question: What can one do with an encryption scheme that is fully homomorphic: a scheme $\epsilon$ with an efficient algorithm Evaluate$_\epsilon$ that, for any valid public key pk, any circuit C (not just a circuit consisting of multiplication gates as in RSA), and any ciphertexts $\psi_i \leftarrow \text{Encrypt}_\epsilon(pk, \pi_i)$, outputs $$\psi \leftarrow \text{Evaluate}_\epsilon(pk, C, \psi_1, \ldots, \psi_t)$$

a valid encryption of $C(\pi_1, \ldots, \pi_t)$ under pk? Their answer: one can arbitrarily compute on encrypted data—i.e., one can process encrypted data (query it, write into it, do anything to it that can be efficiently expressed as a circuit) without the decryption key. As an application, they suggested private data banks. A user can store its data on an untrusted server in encrypted form. Later, it can send a query on the data to the server, whereupon the server can express this query as a circuit to be applied to the data, and use the Evaluate$_\epsilon$ algorithm to construct an encrypted response to the user's query, which the user then decrypts. We obviously want the server's response here to be more concise than the trivial solution, in which the server just sends all of the encrypted data back to the user to process on its own.

Cryptographers have accumulated a long assortment of "killer" applications for fully homomorphic encryption since then. (See Subsection 1.8.) However, until now, we did not have a viable construction.

1.1 A Very Brief and Informal Overview of Our Construction

Imagine you have an encryption scheme with a "noise parameter" attached to each ciphertext, where encryption outputs a ciphertext with small noise—say, less than n—but decryption works as long as the noise is less than some threshold $N \gg n$. Furthermore, imagine you have algorithms Add and Mult that can take ciphertexts E(a) and E(b) and compute E(a+b) and E(a*b), but at the cost of adding or multiplying the noise parameters. This immediately gives a "somewhat homomorphic" encryption scheme that can handle circuits of depth roughly log log N−log log n.

Now suppose that you have an algorithm Recrypt that takes a ciphertext E(a) with noise N'<N and outputs a "fresh" ciphertext E(a) that also encrypts a, but which has noise parameter smaller than $\sqrt{N}$. This Recrypt algorithm is enough to construct a fully homomorphic scheme out of the somewhat homomorphic one! In particular, before we Add or Mult E(a) and E(b), we can apply Recrypt to E(a) and E(b) to ensure that their noise parameters are small enough so that the noise parameter of E(a*b) is less than N, and so on recursively.

In our construction, we give a somewhat homomorphic encryption scheme. We then show how to modify it so that its decryption circuit has multiplicative depth at most log log N−log log n−1—i.e., less depth than what the scheme can handle. It turns out that a somewhat homomorphic encryption scheme that has this self-referential property of being able to handle circuits that are deeper than its own decryption circuit—in which case we say the somewhat homomorphic encryption scheme is "bootstrappable"—is enough to obtain the Recrypt algorithm, and thereby fully homomorphic encryption! In Section 1.3 and Section 4, we give more details on why bootstrappability is enough.

Our embodiment of our somewhat homomorphic encryption scheme, described in Sections 5 and 7, uses "ideal lattices". However, in our exposition, we try to defer the need for technical details about lattices for as long as possible and we first describe it abstractly to clarify the high-level idea and show that other embodiments are possible. For now, we mention that we looked to ideal lattices as a way to construct a bootstrappable encryption scheme for two reasons. First, the circuit complexity of the decryption algorithms in typical lattice based encryption schemes is very low, especially compared to schemes like RSA or ElGamal, which rely on exponentiation, an operation that we do not know how to parallelize well. Second, since ideal lattices correspond to ideals in polynomial rings, they inherit natural Add and Mult operations from the ring. (Additionally, ideal lattices are also appealing since we can base security on standard "hard" problems over ideal lattices, which, as far as we know, are typically just as hard as problems over general lattices.)

However, it takes some work to make our somewhat homomorphic scheme bootstrappable—i.e., to make the depth of decryption circuit shallower than what the scheme can handle. In Sections 8 and 10, we describe how to modify the scheme to make the decryption circuit sufficiently shallow. Conceptually, our techniques here are similar to those used in server-aided cryptography, where (for example) a user with a slow device wants to delegate most of the decryption work to a server without allowing the server to completely decrypt on its own. In our modification, we place a "hint" about the secret key inside the public key. This hint is not enough to decrypt a ciphertext output by the original scheme, but it can be used to "process" the ciphertext—i.e., construct a new ciphertext (that encrypts the same thing) that can be decrypted by a very shallow circuit. To prove that this hint is not too revealing, we require a second computational hardness assumption, similar to ones that have been studied in the context of server-aided cryptography.

Just to leave you with a flavor of what our somewhat homomorphic encryption scheme looks like, consider the following secret key encryption scheme which merely uses integers. The key is an odd integer p>2N. An encryption of a bit b is simply a random multiple of p, plus a random integer B with the same parity as b—i.e., B is even if b=0 and is odd if b=1. A bit more concretely, the ciphertext is c=b+2x+kp, where x is a random integer in (−n/2, n/2), and k is an integer chosen from some range. You decrypt by setting b←(c mod p) mod 2, where (c mod p) is the number in (−p/2,p/2) that equals c modulo p. Actually, (c mod p), which is the "noise parameter" in this scheme, will be in [−n, n], since b+2x is in that range. However, decryption would have worked correctly as long as b+2x ∈[−N, N] ⊂ (−p/2,p/2). (As an aside relevant to bootstrapping, we mention that computing c mod p can be done by a very shallow circuit, with depth logarithmic in the bit-lengths of c and p.)

Now consider what happens when you add two ciphertexts. You get a ciphertext that has a similar format to the original ones. Specifically, $$c \leftarrow c_1 + c_2 = b_1 + b_2 + 2(x_1 + x_2) + (k_1 + k_2)p = b_1 \oplus b_2 + 2x + kp$$

for some integers x and k. Decryption recovers $b_1 \oplus b_2$ as long as $(b_1+2x_1)+(b_2+2x_2) \in [-N, N]$. Multiplication also gives ciphertexts with a similar format.

$$c \leftarrow c_1 * c_2 = b_1 * b_2 + 2(b_1 x_2 + b_2 x_1 + 2x_1 x_2) + kp = b_1 * b_2 + 2x + kp$$

for some integers x and k. Decryption works whenever $(b_1+2x_1)*(b_2+2x_2) \in [-N, N]$.

A crucial advantage of replacing integers in the scheme above with ideal lattices is that an ideal lattice has many representations or "bases". Some bases are "good" and can be used as the secret key, while some are "bad" and can be used as the public key—i.e., they are good enough to be used for encryption, but not decryption. So, ideal lattices give us a public key scheme. On the other hand, it is unclear whether the integer p in the toy scheme above can be represented in a way that is useful for encryption but not decryption (nor is security clear even for the secret key version of the scheme).

But, for a moment, imagine that there are good and bad representations of p, such the bad representation can be used in encryption but cannot be used to distinguish whether an integer is close to a multiple of p or is uniform modulo p. How would we prove security? If there is an adversary $\mathcal{A}$ that can break semantic security, $\mathcal{B}$ uses $\mathcal{A}$ to decide which distribution an integer m comes from as follows: give $\mathcal{A}$ the challenge ciphertext c=b+2m+kp for random k. If m is close to a multiple of p, then so is 2m, and the closest p-multiple is an even distance away; in particular, b+2m∈[−N, N] mod p and b+2m mod p=b, the challenge ciphertext decrypts correctly to b, and $\mathcal{A}$ should guess b with non-negligible advantage. But if m is uniform modulo p, then so is 2m (since p is odd), c is independent of b, and $\mathcal{A}$ has no advantage. Basically, $\mathcal{B}$ can distinguish the distribution that m came from by observing whether $\mathcal{A}$ guesses correctly with non-negligible advantage. In Section 5, we provide a conceptually similar proof of our ideal lattice scheme based on the ideal coset problem (ICP).

Over the next few Subsections, we provide more details about our construction, its security and applications, but still somewhat informally.

1.2 What is Fully Homomorphic Encryption?

Our ultimate goal is to construct a fully homomorphic encryption scheme $\epsilon$. First, let us discuss what it means to be fully homomorphic.

At a high-level, the essence of fully homomorphic encryption is simple: given ciphertexts that encrypt $\pi_1, \ldots, \pi_t$, fully homomorphic encryption should allow anyone (not just the key-holder) to output a ciphertext that encrypts $f(\pi_1, \ldots, \pi_t)$ for any desired function $f$, as long as that function can be efficiently computed. No information about $\pi_1, \ldots, \pi_t$ or $f(\pi_1, \ldots, \pi_t)$, or any intermediate plaintext values, should leak; the inputs, output and intermediate values are always encrypted.

Formally, there are different ways of defining what it means for the final ciphertext to "encrypt" $f(\pi_1, \ldots, \pi_t)$. The minimal requirement is correctness. A fully homomorphic encryption scheme $\epsilon$ should have an efficient algorithm Evaluate$_\epsilon$ that, for any valid $\epsilon$ key pair (sk, pk), any circuit C, and any ciphertexts $\psi_i \leftarrow \text{Encrypt}_\epsilon(pk, \pi_i)$, outputs $$\psi \leftarrow \text{Evaluate}_\epsilon(pk, C, \psi_1, \ldots, \psi_t) \text{ such that Decrypt}_\epsilon(sk, \psi) = C(\pi_1, \ldots, \pi_t)$$

This minimal requirement does not seem to be sufficient, however, since it permits the trivial solution, where $\psi$ simply consists of (C, $\psi_1, \ldots, \psi_t$)—i.e., where the Evaluate$_\epsilon$ algorithm does not "process" the input ciphertexts at all.

There are a couple of different ways of excluding the trivial solution. One way is to require circuit privacy—i.e., (roughly) that the output of Evaluate$_\epsilon$ reveals nothing (at least computationally) about the circuit C that it took as input. If circuit privacy is the only additional requirement, then fully homomorphic encryption (under this definition) can easily be achieved by using a two-flow oblivious transfer (OT) protocol in combination with Yao's garbled circuit (A. C. Yao, "Protocols for secure computations (extended abstract)", FOCS '82, pages 80-91). Typically two-flow OT protocols use an additively homomorphic encryption scheme, and the OT query consists of a ciphertext $\psi$ in this encryption scheme. In the fully homomorphic scheme, Evaluate(pk, C, $\psi_1, \ldots, \psi_t$) constructs a Yao garbling $C^\dagger$ of C, uses the OT queries $\psi_1, \ldots, \psi_t$ to construct OT responses $\psi^*_1, \ldots, \psi^*_t$ designed to obliviously transfer Yao keys associated to the t input wires in $C^\dagger$, and outputs ($C^\dagger, \psi^*_1, \ldots, \psi^*_t$). To decrypt this ciphertext, the key holder "decrypts" the OT responses $\psi^*_1, \ldots, \psi^*_t$ to recover Yao keys for the input wires, and then evaluates the garbled circuit. Sanders, Young and Yung (T. Sander, A. Young, and M. Yung, "Non-interactive cryptocomputing for NC1", in *Proc. of FOCS '99*, pages 554-567, 1999) and Beaver (D. Beaver, "Minimal-latency secure function evaluation", in *Proc. of Eurocrypt '00*, pages 335350, Springer, 2000) show how to achieve statistical circuit privacy, but only for limited classes of circuits—namely, NC1 and NLOGSPACE.

The more interesting way of excluding the trivial solution is to require (roughly) that the ciphertext encrypting $C(\pi_1, \ldots, \pi_t)$ should "look like" an "ordinary" ciphertext, as long as $C(\pi_1, \ldots, \pi_t)$ is a single bit (or element of the same plaintext space that contains $\{\pi_i\}$). For example, the size of the ciphertext output by Evaluate(pk, C, $\pi_1, \ldots, \pi_t$) should not depend on C. We focus on this definition. Actually, we use a stronger requirement: that Decrypt$_\epsilon$ be expressible by a circuit $D_\epsilon$, which takes a (formatted) secret key and (formatted) ciphertext as input, and whose size is (a fixed) polynomial in the security parameter. Of course, this implies that there is an upper bound on the ciphertext size that depends only on the security parameter, and is independent of C. After describing a scheme that meets this definition, we will also describe how to achieve (statistical) circuit privacy (Section 13).

To some, it is surprising that such a thing as fully homomorphic encryption is possible even in principle. To see that it is possible, it may be helpful to understand fully homomorphic encryption in terms of a physical analogy—e.g., a photograph developer's darkroom. The developer applies a particular function $f$ to Alice's film when he develops it—i.e., the sequence of steps to develop the film. In principle, he does not need to see anything to apply this procedure, though in practice darkrooms are typically not completely dark. Of course, this analogy is inadequate in that one may ask: why can't the developer walk out of the darkroom and look at the finished product? Imagine that the developer is blind. Then, one may ask: why can't someone else look at the finished product? Imagine that everyone in the world besides Alice is blind. "Sight" is Alice's secret key, and (in this world) it is impossible for anyone else to simulate vision. Although imagining physical analogies should convince you that the notion of fully homomorphic encryption is not a logical fallacy, it seems difficult to construct a perfect physical analogue of fully homomorphic encryption that is not rather far-fetched.

To try another physical analogy, suppose that the owner of a jewelry store (Alice) wants her employees to assemble raw precious materials (diamonds, gold, etc.) into finished products, but she is worried about theft. She addresses the problem by constructing glove boxes for which only she has the key, and she puts the raw materials inside. Using the gloves, an employee can manipulate the items inside the box. Moreover, an employee can put things inside the box—e.g., a soldering iron to use on the raw materials—even though he cannot take anything out. Also, the box is transparent, so that an employee can see what he is doing. (In this analogy, encryption means that the employee is unable to take something out of the box, not that he is unable to see it.) After the employee is done, Alice can recover the finished product at her leisure by using her key. This analogy is inadequate in the sense that the glove box might become quite cluttered, whereas in the fully homomorphic encryption scheme only the final product need remain. In other words, to improve the analogy, imagine that the employee has some way to make any item in the glove box (of his choosing) disappear (even though he still cannot extract the item).

1.3 Bootstrapping a Scheme that can Evaluate its Own Decryption Circuit

Now that we have clarified our goal (fully homomorphic encryption), let us try to find a stepping-stone. Suppose that, a priori, we have a scheme $\epsilon$ that is only guaranteed to be correct for some subset $\mathcal{C}_\epsilon$ of circuits—i.e., $$\text{Decrypt}_\epsilon(sk, \text{Evaluate}_\epsilon(pk, C, \psi_1, \ldots, \psi_t)) = C(\pi_1, \ldots, \pi_t)$$

is guaranteed to hold only if $C \in \mathcal{C}_\epsilon$ (and, as before, $\psi_i \leftarrow \text{Encrypt}_\epsilon(pk, \pi_i)$). Can we use $\epsilon$ to construct a scheme $\epsilon^*$ that is fully homomorphic?

In Section 4, we show that the answer is yes. Suppose that $\mathcal{C}_\epsilon$ contains just two circuits: $D_\epsilon$ and the augmentation of $D_\epsilon$ by NAND (i.e., a NAND gate connecting two copies of $D_\epsilon$), where $D_\epsilon$ is the circuit associated to the decryption algorithm.[1] If $\epsilon$ has this self-referential property of

[1] We use NAND because any circuit can be expressed in terms of NAND gates. We could instead augment the decryption circuit by a different set of universal gates. being able to evaluate its own (augmented) decryption circuit, we say that $\epsilon$ bootstrappable. We show that bootstrappable encryption implies leveled fully homomorphic encryption—i.e., that $D_\epsilon$ plus the NAND-augmentation of $D_\epsilon$ constitute a "complete" set of circuits:

Theorem 1.1 (Informal). If $\epsilon$ is bootstrappable, then, for any integer d, one can construct a scheme $\epsilon^{(d)}$ that can evaluate any circuit (consisting of NAND gates) of depth d. The decryption circuit for $\epsilon^{(d)}$ is the same as for $\epsilon$, and the complexity of encryption is also the same. $\epsilon^{(d)}$'s public key size is O(d) times that of $\epsilon$'s. The complexity of $\text{Evaluate}_{\epsilon^{(d)}}$ is polynomial in the security parameter and linear in the circuit size. If $\epsilon$ is semantically secure against chosen plaintext attacks, then so is $\text{Evaluate}_{\epsilon^{(d)}}$.

One drawback of $\epsilon^{(d)}$ is that its public key is O(d) times that of $\epsilon$'s public key. Since $\epsilon^{(d)}$ has this unwanted dependence on d, we say that it is merely leveled fully homomorphic. Under certain assumptions, we can make the $\epsilon^{(d)}$ public key size be independent of d, in which case we say the derived scheme is fully homomorphic.

Why should the fact that $\epsilon$ can evaluate (augmentations of) $D_\epsilon$ be so powerful? Suppose that the distributions of $\text{Evaluate}_\epsilon$ (pk, C, $\psi_1, \ldots, \psi_t$) and $\text{Encrypt}_\epsilon(\text{Pk}, C(\pi_1, \ldots, \pi_t))$ are different. In particular, suppose that there is an "error" associated with each ciphertext, that ciphertexts output by $\text{Encrypt}_\epsilon$ have small error, that ciphertexts output by $\text{Evaluate}_\epsilon$ have larger error that increases with the depth of the circuit being evaluated, and that eventually (as the depth of the circuit being evaluated increases) the "error" becomes so large that applying $\text{Decrypt}_\epsilon$ to the ciphertext results in a decryption error. (In fact, this is the case in our initial ideal lattice construction.) Intuitively, as we are evaluating a circuit and the implicit "error" becomes large, we would like to "refresh" the ciphertext so that the error becomes small again. Obviously, we could refresh a ciphertext if we could completely decrypt it, simply by generating an entirely new and fresh ciphertext that encrypts the same thing, but we want a way to refresh that does not require the secret key. This is the idea behind bootstrapping: we do decrypt the ciphertext, but homomorphically!

Specifically, suppose $\epsilon$ is bootstrappable, with plaintext space $\mathcal{P} = \{0, 1\}$, and that circuits are boolean. Suppose we have a ciphertext $\psi_1$ that encrypts $\pi$ under $pk_1$, which we want to refresh. So that we can decrypt it homomorphically, suppose we also have $sk_1$, the secret key for $pk_1$, encrypted under a second public key $pk_2$: let $\overline{sk_{1j}}$ be the encryption of the jth bit of $sk_1$. Consider the following algorithm.

$\text{Recrypt}_\epsilon(pk_2, D_\epsilon, \langle \overline{sk_{1j}} \rangle, \psi_1)$.

Set $\overline{\psi_{1j}} \xleftarrow{R} \text{Encrypt}_\epsilon(pk_2, \psi_{1j})$ Output $\psi_2 \leftarrow \text{Evaluate}_\epsilon(pk_2, D_\epsilon, \langle \overline{sk_{1j}} \rangle, \langle \overline{\psi_{1j}} \rangle)$ Above, Evaluate takes in the bits of $sk_1$ and $\psi_1$, each encrypted under $pk_2$. Then, $\epsilon$ is used to evaluate the decryption circuit homomorphically. The output $\psi_2$ is thus an encryption under $pk_2$ of $\text{Decrypt}_\epsilon(sk_1, \psi_1) = \pi$.[2] In other words, Recrypt decrypts homomorphically using the encrypted secret key, thus obtaining a new ciphertext that encrypts the same thing as the original one.

[2] Recrypt implies a one-way multi-use proxy re-encryption scheme. (See M. Blaze, G. Bleumer, and M. Strauss, "Divertible protocols and atomic proxy cryptography", in Eurocrypt '98, LNCS 1403, pages 127-144.) We discuss this in more detail in Subsection 1.8.

Notice how $\pi$ is doubly encrypted at one point, and we use $\text{Evaluate}_\epsilon$ to remove the inner encryption. Applying the decryption circuit $D_\epsilon$ removes the "error" associated to the first ciphertext under $pk_1$, but $\text{Evaluate}_\epsilon$ simultaneously introduces a new "error" while evaluating the ciphertexts under $pk_2$. Intuitively, we have made progress as long as the second error is shorter. Note that revealing the encrypted secret key bits $\langle \overline{sk_{1j}} \rangle$ does not compromise semantic security; these encrypted secret key bits are indistinguishable from encryptions of 0 as long as $\epsilon$ is semantically secure by a standard hybrid argument. This hybrid argument breaks down if $pk_1 = pk_2$. However, if $\epsilon$ securely encrypts key-dependent messages (is KDM-secure)—i.e., roughly, if providing a ciphertext that encrypts a function of the secret key does not hurt security—then Recrypt can have a "self-loop" of encrypted secret keys. (See D. Boneh, S. Halevi, M. Hamburg, and R. Ostrovsky, "Circular-Secure Encryption from Decision Diffie-Hellman", in Proc. of Crypto '08, LNCS 5157, pages 108-125, and references therein, for more information on KDM security.)

Of course, our goal is to perform nontrivial homomorphic operations on underlying plaintexts, not merely to obtain refreshed encryptions of the same plaintext. If we can also evaluate a NAND augmentation of the decryption circuit, then we can generate an encryption of ($\pi_1$ NAND $\pi_2$) under $pk_2$ using the encrypted secret key ($sk_1$ under $pk_2$) together with the two ciphertexts encrypting $\pi_1$ and $\pi_2$, respectively, under $pk_1$. By recursively performing this type of operation on all ciphertexts at a given level in the circuit, we can evaluate a d-depth circuit of NANDs. If $\epsilon$ is KDM-secure, the derived scheme is fully homomorphic (rather than leveled fully homomorphic). In the random oracle model, we show that a bootstrappable encryption scheme implies a scheme that is both bootstrappable and KDM-secure, and thus implies a fully homomorphic encryption scheme.

Again, it may be helpful to view bootstrapping in terms of a physical analogy, although it will, of course, be even more far-fetched. Recall Alice, our jewelry store owner. Imagine that Alice's glove boxes are defective; after an employee uses the gloves for 1 minute, the gloves stiffen and become unusable. Unfortunately for Alice, even her fastest employee cannot assemble some of the more intricate designs in under a minute. But Alice is not only paranoid, but also smart. To an employee that is assembling an intricate design, she gives him (like before) a glove box containing the raw materials, but also several additional glove boxes. Each of these additional glove boxes holds a copy of her master key. To assemble the intricate design, the employee manipulates the materials in box #1 until the gloves stiffen. Then, he places box #1 inside box #2, where the latter box already contains a master key. Using the gloves for box #2, he opens box #1 with the master key, extracts the partially assembled trinket, and continues the assembly within box #2 until its gloves stiffen. He then places box #2 inside box #3, and so on. When the employee finally finishes his assembly inside box #n, he hands the box to Alice. Of course, this trick will not work unless the employee can open box #i within box #(i+1), and have time to make a little bit of progress on the assembly, all before the gloves of box #(i+1) stiffen. This is analogous to the requirement for a bootstrappable encryption scheme ε—that the complexity of ε's (augmented) decryption circuit is less than what ε can homomorphically evaluate.

We assumed that it was safe to use a single master key that opens all boxes. But maybe it is not safe; maybe an employee could use the gloves for box #2, together with master key inside that box, to open the box from the inside, extract the key, and use it to open box #1 and steal the jewels. However, Alice can avoid this circumstance by using distinct keys for the boxes, and placing the key for box #1 inside box #2, the key for box #2 inside box #3, and so on. This is analogous to the question of whether the encryption scheme is KDM-secure.

As before, the physical analogy only goes so far. In the physical case, box #i would grow as i increases, and consequently the extraction time would also grow, but our encryption scheme does not have analogous deficiencies. And, again, in our physical analogy, encryption corresponds to being unable to physically access the contents of the box. So, it is not a valid attack for the employee to copy the master key based on what he can see through the transparent box. Accordingly, it might be helpful to think of each key as having a certain secret chemical composition which cannot be readily ascertained while the key is inside the box, and that a key opens its associated box through a chemical reaction.

1.4 Ideal Lattices: Ideally Suited to Construct Bootstrappable Encryption

The notion of bootstrappability gives us a new angle on constructing fully homomorphic encryption: it suggests we should look at encryption schemes whose decryption algorithms have low circuit complexity. Within the bootstrappability framework, it does not make much sense to look at exponentiation-based schemes, since exponentiation (as used in RSA, for example) is not even known to be in NC. On the other hand, encryption schemes using lattices or linear codes have very simple decryption algorithms typically dominated by a matrix-vector multiplication, an operation in NC1. In this paper, we focus on constructing a lattice-based scheme (though we view, say, a code-based construction as an interesting possibility).

Of course, it is not enough to minimize the circuit complexity of decryption; we also must maximize the evaluative capacity of the scheme, so that the scheme can evaluate its own (augmented) decryption circuit. While one can easily construct an additively homomorphic scheme from ordinary lattices, we need a scheme with both additive and multiplicative homomorphisms to evaluate general circuits. This consideration leads us to focus on ideal lattices.

In Section 7, we describe an initial homomorphic encryption scheme based on ideal lattices. However, one can understand the scheme reasonably well just in terms of rings and ideals (no lattices). Rings and ideals are simple algebraic objects. Examples of rings are $\mathbb{Z}$ (the integers) and the polynomial ring $\mathbb{Z}[x]/(f(x))$, consisting of the residues of integer polynomials modulo a monic polynomial $f(x)$. Rings are closed under addition '+', multiplication '×,' and additive inverse, and have an additive identity '0' and multiplicative identity '1.' An ideal I of a ring R is a subset $I \subset R$ such that $\Sigma_{j=1}^{t} i_j \times r_j \in I$ for any $i_1, \ldots, i_t \in I$ and $r_1, \ldots, r_t \in R$. For example, (2) is an ideal of $\mathbb{Z}$ consisting of the set of even numbers. An example ideal in $\mathbb{Z}[x]/(f(x))$ is $(a(x))$, the set of multiples of $a(x)$ (reduced modulo $f(x)$). However, by these examples, we do not mean to imply that ideals are necessarily principal; they may not be generated by a single element. If I is a proper subset of R, we can talk about a coset of I within R; e.g., 1+(2) is a coset consisting of the odd numbers. The element $x \in R$ is in the coset $y+I$ if $x-y \in I$. Many of the previous constructions of (partially) homomorphic encryption use rings and ideals, at least implicitly; see Section 3.

As a first approximation, here is how a fully homomorphic encryption scheme based on rings and ideals might work. The public key pk contains an ideal I and a plaintext space $\mathcal{P}$, where the latter basically consists of a set of "distinguished representatives" of the cosets of I; the secret key sk consists of some "secret knowledge" concerning I. To encrypt $\pi \in \mathcal{P}$, the encrypter sends $$\psi \xleftarrow{R} \pi + I,$$

a "random" member of the coset π+I. The decrypter uses its secret knowledge to recover the "distinguished representative" π (distinguished with respect to $\mathcal{P}$) of the coset π+I. To add and multiply ciphertexts, we simply use the ring operations '+' and '×':

$$\text{Add}(pk, \psi_1, \psi_2) = \psi_1 + \psi_2 \in (\pi_1 + \pi_2) + I$$

$$\text{Mult}(pk, \psi_1, \psi_2) = \psi_1 \times \psi_2 \in (\psi_1 \times \psi_2) + I$$

Ring operations on ciphertexts induce mod-I operations on the underlying plaintexts. In general, for an arithmetized mod-I circuit C, we would have $$\text{Evaluate}_\epsilon(pk, C, \psi_1, \ldots, \psi_t) \in C(\pi_1, \ldots, \pi_t) + I$$

The semantic security of this scheme relies on the hardness of an ideal membership problem—i.e., given π' and ψ, is ψ−π'∈I? This is the approach of the Polly Cracker scheme by Fellows and Koblitz, described in Section 3.

The first approximation above does not work for ideal lattices, unfortunately, since the ideal membership problem is not hard. An ideal lattice, as used in this paper, is simply an ideal in $\mathbb{Z}[x]/(f(x))$, $f(x)$ of degree n; each such ideal I can be represented by a lattice generated by the columns of a lattice basis $B_I$, an n×n matrix. It so happens that, for any basis $B_I$ of any lattice (not just an ideal lattice) I and any $v \in \mathbb{Z}^n$, there is a unique, efficiently-computable distinguished representative v mod $B_I$. In particular, it holds that v mod $B_I = v - B_I \lfloor B_I^{-1} \cdot v \rceil$, where $B_I^{-1}$ is the matrix inverse of $B_I$ and $\lfloor \cdot \rceil$ rounds to the nearest integer vector. To find the distinguished representative for $r \in R$ modulo $B_I$, one computes r mod $B_I$ where r is the coefficient vector of r. To test whether r is a member of I, one simply tests whether r mod $B_I = 0$ mod $B_I$. Thus, the ideal membership problem is easy.

So, we use a different approach that involves two ideals. Everybody can use a common ideal I, represented by basis $B_I$. Then, each user generates their own ideal J, with secret and public bases $B_J^{sk}$ and $B_J^{pk}$, that is relatively prime to I (i.e., I+J=R). As before, the plaintext space $\mathcal{P}$ consists of distinguished representatives of the cosets of I. The public key pk also includes the description of a distribution D. To encrypt $\pi \in \mathcal{P}$, the encrypter sets $$\pi^* \xleftarrow{D} \pi + I,$$

and sends ψ←π*mod $B_J^{pk}$. In other words, the ciphertext has the form ψ=π+i+j for i∈I and j∈J, where π+i comes from the specified distribution D. The decrypter sets $$\pi \leftarrow (\psi \bmod B_J^{sk}) \bmod B_I.$$

For decryption to work, the secret key $B_J^{sk}$ should be chosen so as to be compatible with the distribution D, so that π+i is always the distinguished representative of π+i+J with respect to $B_J^{sk}$. In this case, the mod-$B_J^{sk}$ operation returns $\pi+i$, after which $\pi$ is recovered easily. This decryption criterion becomes more complicated as we add and multiply ciphertexts using the basic ring operations. For arithmetized circuit C that uses addition and multiplication modulo I (w.r.t. basis $B_J$), we have:

$$\text{Evaluate}_\epsilon(pk, C, \psi_1, \ldots, \psi_t) = C(\psi_1, \ldots, \psi_t) \in C(\pi_1+i_1, \ldots, \pi_t+i_t) + J$$

where $i_1, \ldots, i_t \in I$. (The above is an abuse of notation, since on the left C consists of gates that add and multiply the underlying plaintexts modulo I, while in the middle and on the right C uses the ring operations '+' and '×', but we will use this for now.) In this case, for decryption to work, we need $C(\pi_1+i_1, \ldots, \pi_t+i_t)$ to be the distinguished representative of $C(\pi_1+i_1, \ldots, \pi_t+i_t)+J$ w.r.t. $B_J^{sk}$. We can reverse this statement, and say that the set $\mathcal{C}_\mathcal{P}$ of circuits that the scheme $\epsilon$ evaluates correctly consists of those circuits for which $C(\pi_1+i_1, \ldots, \pi_t+i_t)$ is always the distinguished representative of $C(\pi_1+i_1, \ldots, \pi_t+i_t)+J$ w.r.t. $B_J^{sk}$ when $B_J^{sk}$ is generated according to KeyGen$_\epsilon$ and $\pi_k$ and $i_k$ are chosen according to Encrypt$_\epsilon$. In this case, the mod-$B_J^{sk}$ operation recovers $C(\pi_1+i_1, \ldots, \pi_t+i_t)$, after which the decrypter easily recovers $C(\pi_1, \ldots, \pi_t)$ by reducing modulo $B_I$.

This characterization of $\mathcal{C}_\epsilon$ becomes less nebulous when, in the context of lattices, we give a geometric interpretation to $C(\pi_1+i_1, \ldots, \pi_t+i_t)$ as a vector indicating the ciphertext vector's "error" or "offset" from the lattice J. In this setting, the distinguished representatives of the cosets of J w.r.t. the basis $B_J^{sk}$ are precisely the points in $\mathbb{Z}^n$ that are contained inside the parallelepiped $\mathcal{P}(B_J^{sk}) = \{x \in \mathbb{R}^n : x = \Sigma x_i \cdot b_i, x_i \in [-\frac{1}{2}, \frac{1}{2})\}$ associated to the basis $B_J^{sk} = \{b^i\}$. Decryption works as long as the "error vector" is never so long that it falls outside of $\mathcal{P}(B_J^{sk})$.[3] Once we specify

[3]If the error vector does fall outside $\mathcal{P}(B_J^{sk})$, the mod-$B_J^{sk}$ operation in decryption returns $C(\pi_1+i_1, \ldots, \pi_t+i_t)+j$ for some nonzero $j \in J$, and the subsequent reduction modulo I is unlikely to return $C(\pi_1, \ldots, \pi_t)$, since J is relatively prime to I. We note that the NTRU encryption scheme employs relatively prime ideals in a somewhat similar way, but of course without the homomorphisms). See J. Hoffstein, J. Pipher and J. Silverman, "NTRU: A Ring Based Public Key Cryptosystem", in *Proc. of ANTS* '98, LNCS 1423, pages 267-288.

some radius $r_{Dec}$ such that the parallelepiped $\mathcal{P}(B_J^{sk})$ always contains a ball of radius $r_{Dec}$ inside it (for any J generated according to KeyGen), and also specify a radius $r_{Enc}$ such that (in Encrypt$_\epsilon$) the vector $$\pi^* \xleftarrow{D} \pi + I$$

always fall within a ball of radius $r_{Enc}$, the bootstrappability question becomes: is $C(x_1, \ldots, x_t) \in \mathcal{B}(r_{Dec})$ whenever $x_i \in \mathcal{B}(r_{Enc})$ for all i and C is an (augmented) decryption circuit?

We can upper-bound the length of $C(x_1, \ldots, x_t)$ for arithmetic circuit C recursively by upperbounding the "expansion" caused by additions and multiplications. Roughly speaking, we can say that Add operations do not increase the length of the error vector much: if $\psi_1 \in x_1+J$ and $\psi_2 \in x_2+J$, then Add(pk, $\psi_1, \psi_2) \in (x_1+x_2)+J$, where $\|x_1+x_2\| \leq \|x_1\| + \|x_2\|$ by the triangle inequality. Mult operations are more expensive; we can show that, for any polynomial ring R, there is a parameter $\gamma_{Mult}(R)$ such that $\|x_1 \times x_2\| \leq \gamma_{Mult}(R) \cdot \|x_1\| \cdot \|x_2\|$; $\gamma_{Mult}(R)$ may be, e.g., polynomial in n. (For the Mult operation, vector $x_i$ is interpreted as the polynomial in R whose coefficient vector is $x_i$.) Essentially, constant-fan-in Mult gates cause at least as much expansion as polynomial-fan-in Add gates. In the worst case, Mult gates cause the length of the error vector essentially to square with each additional level of the circuit, limiting the circuit depth that the scheme can evaluate to (roughly) log log $r_{Dec}$.

Theorem 1.2 (Informal). Suppose $X \subset \mathcal{B}(r_x)$ and $Y \supset \mathcal{B}(r_Y)$, $r_X \geq 1$. Then, $C(x_1, \ldots, x_t) \in Y$ for all $x_1, \ldots, x_t \in \overline{X}$ and all arithmetic (over R) circuits with multiplicative fan-in of 2, additive fan-in of up to $\gamma_{Mult}(R)$, and depth up to $$\log \log r_Y - \log \log(\gamma_{Mult}(R) \cdot r_X)$$

I.e., $\epsilon$ correctly evaluates all such circuits of depth up to log log $r_{Dec}$ – log log($\gamma_{Mult}(R) \cdot r_{Enc}$).

So, can we express the (augmented) decryption circuit with depth at most (roughly) log log $r_{Dec}$? Unfortunately, the answer appears to be 'no,' though it is a close call. Specifically, the dominant computation in decryption is $\lfloor (B_J^{sk})^{-1} \cdot \psi \rfloor$, which occurs within the computation of $\psi$ mod $B_J^{sk}$. Roughly speaking, to ensure that the rounding is correct, one must use a sufficient number of bits of precision. Then, the high precision of each number-number multiplication that occurs within the matrix-vector multiplication forces us to use a high-depth circuit. Specifically, two k-bit numbers can be multiplied together using a O(log k)-depth circuit (with constant fan-in). The precision we seem to need is roughly log det(J)>n·log $r_{Dec}$ bits, and therefore we need about a O(log n+log log $r_{Dec}$)-depth circuit.

Unfortunately, for this initial scheme, it seems that no matter how the parameters are set, the decryption circuit is always slightly too complex for the scheme to evaluate.[4] This problem is

[4]However, we do not prove this. It remains possible that the decryption circuit of this initial scheme can be expressed in a way that makes the scheme bootstrappable. difficult to fix post hoc, in part due to the self-referential nature of the bootstrapability property: intuitively, if one expands the set of circuits that $\epsilon$ can "handle" in an effort to include $D_\epsilon$, one seemingly must increase the complexity of Decrypt$_\epsilon$ to accommodate, thereby making the circuit $D_\epsilon$ more complex, possibly such that $D_\epsilon$ always elusively falls outside of the expanded set. To obtain a bootstrappable encryption scheme, it seems necessary to change the decryption algorithm fundamentally.

1.5 Squashing the Decryption Circuit: The Encrypter Starts Decryption!

To reduce the decryption complexity without affecting the "evaluative capacity" of the scheme at all, our approach, given in Section 10, is to enable the encrypter to start decryption, thereby easing the burden on the decrypter. Interestingly, the setting is similar to server-aided cryptography, where a user offloads some portion of a computationally intensive cryptographic task, such as decryption, onto an untrusted server; in our case, the encrypter itself plays the server's role.

Abstractly, if $\epsilon^*$ is our original homomorphic encryption scheme, with public and secret keys (pk*, sk*), the modified scheme $\epsilon$ uses an algorithm that we call SplitKey to generate a "hint" $\tau$ about sk*, which it puts in the $\epsilon$ public key. Also, $\epsilon$ uses a new algorithm ExpandCT. The encrypter uses this algorithm, in combination with the hint $\tau$, to transform a preliminary ciphertext $\psi^*$ output by $\epsilon^*$ into an "expanded ciphertext" that can be decrypted by a shallower circuit. Here is the abstract transformation in detail; since it is abstract, it is obviously not explained at this point why the expanded ciphertext is easier to decrypt.

KeyGen$_\epsilon(\lambda)$. Runs $$(pk^*, sk^*) \xleftarrow{R} KeyGen_{\epsilon^*}(\lambda)$$

and $$(sk, \tau) \xleftarrow{R} SplitKey_\epsilon(sk^*, pk^*).$$

The secret key is sk. The public key pk is $(pk^*, \tau)$.

Encrypt$_\epsilon$(pk, $\pi$). Runs $\psi^* \leftarrow$ Encrypt$_\epsilon^*$(pk*, $\pi$). It then set $\psi$ to include $\psi^*$ and the output of ExpandCT$_\epsilon$(pk, $\psi^*$). (ExpandCT$_\epsilon$ makes heavy use of $\tau$.)

Decrypt$_\epsilon$(sk, $\psi$). Uses sk and expanded ciphertext to decrypt more efficiently. Decrypt$_\epsilon$(sk, $\psi$) should work whenever Decrypt$_\epsilon^*$(sk*, $\psi^*$) works.

Add$_\epsilon$(pk, $\psi_1$, $\psi_2$). Extracts ($\psi^*_1$, $\psi^*_2$) from ($\psi_1$, $\psi_2$), computes $\psi^* \leftarrow$ Add$_{\epsilon^*}$(pk*, $\psi^*_1$, $\psi^*_2$), and sets $\psi$ to include $\psi^*$ and the output of ExpandCT$_\epsilon$(pk, $\psi^*$). Mult$_\epsilon$(pk, $\psi_1$, $\psi_2$) is analogous.

We (half facetiously) say that the "encrypter starts decryption" because it uses the secret-key-related value $\tau$ to expand the ciphertext in a way that helps reduce the decrypter's circuit complexity. The introduction of $\tau$ into the public key provides a "hint" about the secret key sk of the original scheme $\epsilon^*$. However, it is easy to see that $\epsilon$ is semantically secure as long as $\epsilon^*$ is, as long as the following SplitKey distinguishing problem is hard: given (pk*, sk*, $\tau$), distinguish whether $\tau$ was generated as the output of SplitKey$_\epsilon$(sk*, pk*) (as it should be), or as the output of SplitKey$_\epsilon$($\perp$, pk*), where $\perp$ is some distinguished symbol that is independent of sk*. In the latter case, $\tau$ gives no additional information about sk* that could weaken security.

Theorem 1.3 (Informal). If there is an algorithm $\mathcal{A}$ that breaks the squashed scheme with non-negligible probability, then there is either an algorithm $\mathcal{B}_1$ that breaks the original scheme or an algorithm $\mathcal{B}_2$ that solves the SplitKey distinguishing problem with non-negligible advantage.

Concretely, we actually apply a couple of technical "tweaks" to our original ideal-lattice-based construction before we apply the above transformation. In one tweak, we show how to simplify the decryption equation in the original scheme from $(\psi^* \mod B_J^{sk}) \mod B_I = (\psi^* - B_J^{sk} \cdot \lfloor (B_J^{sk})^{-1} \cdot \psi^* \rceil) \mod B_I$ to $(\psi^* - \lfloor v_J^{sk} \times \psi^* \rceil) \mod B_I$ where 'x' is ring multiplication and $v_J^{sk} \in Q^n$. The new secret key $v_J^{sk}$ is slightly weaker than the original one, which forces us to reduce $r_{Dec}$ by a polynomial factor (which is insignificant if $r_{Dec}$ is super-polynomial anyway, as it is required to be to obtain our fully homomorphic scheme). Other than that, the modification has no effect on the correctness or security of the scheme. The purpose of the tweak is merely to reduce the size of the tag $\tau$ introduced by the above transformation. (We will discuss what $\tau$ is in concrete terms momentarily.) The second tweak is to limit the set of "permitted circuits" to those for which the length of the "error" vector never exceeds $r_{Dec}/2$, rather than $r_{Dec}$. The purpose of this tweak is to ensure that the coefficients of the vector $v_J^{sk} \times \psi^*$ are bounded away from half-integers when $\psi^*$ is a valid ciphertext. In particular, all of the coefficients will be within ¼ of an integer; this allows us to simplify the decryption circuit while still ensuring that the rounding operation $\lfloor v_J^{sk} \times \psi^* \rceil$ yields the correct answer. Aside from very slightly reducing the evaluative capacity of the scheme, this tweak also has no negative effect.

Now, in our concrete instantiation of SplitKey$_\epsilon$, $\tau$ is a random set S (with w(n), but poly(n), members) of vectors $\{u_i\}$ that has a sparse subset T (with w(1), but o(n), members) whose sum is $v_J^{sk}$ modulo I; the new secret key sk is the subset T, encoded as a 0/1-vector in $\{0, 1\}^{|S|}$. Distinguishing whether or not the vectors in S are completely uniform and independent of sk* is a lattice-related problem, whose search version (actually finding the subset) has been studied in the context of server-aided cryptography. We discuss this problem a bit more in the next Subsection.

In the modified scheme, ExpandCT$_\epsilon$ outputs $\{c_i \leftarrow u_i \times \psi^* \mod B_I : u_i \in S\}$. To oversimplify, Decrypt$_\epsilon$ sums up the values $c_i$ that correspond to elements of T, thereby obtaining $v_J^{sk} \times \psi^* \mod B_I$, and then rounds to the nearest integer vector. This summation can be performed in depth (roughly) log |T|, regardless of what n is. By choosing |T| small enough, smaller than the depth of the circuits that the scheme can evaluate (which is unaffected by this transformation), the scheme becomes bootstrappable.

The previous paragraph oversimplifies some details. First, the summation of the |T| vectors and the rounding are performed together; the fact that the ultimate result is rounded and taken modulo I allows us to maintain fewer bits of precision in the intermediate computations. The fact that we are promised that the final result is close to an integer vector (due to one of our tweaks), ensures that the rounded result is correct despite the limited precision. Also, we actually still add |S| vectors together, but with the promise that only |T| of them are nonzero. (We have this promise because, after when we multiply in the secret key sk$\in \{0, 1\}^{|S|}$, which has Hamming weight |T|, it zeroizes all but |T| of the ciphertext components). Why can we add |T| vectors in only (roughly) log |T| depth, regardless of the size of when we have the promise that only |T| of the |S| vectors are nonzero (and the other promises, like the fact that we only need the result rounded, and then modulo I)? Essentially, the reason is that summing |S| numbers basically reduces (in terms of circuit depth) to computing the Hamming weight of a vector in $x \in \{0, 1\}^{|S|}$ and expressing the final result in binary—i.e., in $\{0, 1\}^{s+1}$ for $s = \lfloor \log |S| \rfloor$. The binary expression of the Hamming weight of x turns out to be simply $(e_{2^s}(x_1, \ldots, x_{|S|}) \mod 2, e_{2^{s-1}}(x_1, \ldots, x_{|S|}) \mod 2, \ldots, e_{2^0}(x_1, \ldots, x_{|S|}) \mod 2)$, where $e_i$ is the ith elementary symmetric polynomial. If the Hamming weight is guaranteed to be at most |T|, we need not bother computing the polynomials of degree higher than $2^{\lfloor \log |T| \rfloor}$, and consequently need less depth.

Theorem 1.4 (Informal). The decryption circuit of $\epsilon$ with the tweaks followed by the above trans-formation can be expressed as a circuit of depth $c \cdot (\log |T|)^{1+o(1)}$ for some constant c. The scheme becomes bootstrappable when this value is less than $\log \log(r_{Dec}/2) - \log \log(\gamma_{Mult}(R) \cdot r_{Enc})$.

For example, suppose $r_{Dec} = 2^{n^{c'}}$ for some $c' < 1$ and $\gamma_{Mult}(R) \cdot r_{Enc} = $ poly(n). In this case, the scheme becomes bootstrappable when $|T| \leq n^{(c'/c) - o(1)}$.

Devising a physical analogy for our technique for squashing the decryption circuit is rather difficult, but suppose that, in Alice's jewelry store, a key opens a glove box through a chemical reaction. To unlock a box, the employee uses the gloves to rub the key against the inner box until the box dissolves. However, the reaction is too slow; the gloves stiffen before the box dissolves. To address this situation, Alice gives the employee some accelerants, a different one for each box, that the employee can apply to the outside of box #i right before placing it inside box #(i+1). The accelerants speed up the chemical reaction between the key and the box, so that the reaction finishes before the gloves stiffen. The chemical composition of the accelerant provides some information about the chemical composition of her key, but not enough information for an employee to construct a key on his own. Notice that the employee should apply the accelerant to box #i while it is still outside of box #(i+1); to apply it while box #i is inside box #(i+1) would pointlessly waste the usability of the gloves for box #(i+1).

1.6 Security

The semantic security of our scheme against chosen plaintext attacks relies on the hardness of two problems; the first underlies the original somewhat homomorphic scheme (before the squashing), and the second arises from the addition of the secret key "hint" $\tau$ to the public key. CCA1 security for fully homomorphic encryption remains an open problem, while CCA2 security is impossible due to the extreme malleability of ciphertexts.

We prove the security of our somewhat homomorphic construction via a simple reduction. Specifically, in Section 5 (and more concretely in Section 7), we provide a succinct reduction to a fairly natural problem that may be viewed as a decisional version of the closest vector problem (CVP) or bounded distance decoding problem (BDDP). Roughly, the problem is as follows: given an ideal lattice J and a vector t, decide whether (1) t is unusually close to the lattice or (2) t is in a uniformly random coset of the lattice, given the promise that one of these is the case. The idea is that if t is in the first category, the simulator can use t to construct a valid ciphertext vector (which is also quite close to the lattice, but a little bit further away than t), but if t is in the second category, the ciphertext will be completely independent of the challenge plaintext; the latter case makes use of the fact that I and J are relatively prime.

The introduction of $\tau$ into the public key induces a second problem that we must assume is hard, an instance of the SplitKey distinguishing problem: roughly, given $v_j^{sk}$, distinguish whether S is entirely random, or has a sparse |T|-member subset of vectors that sums to $v_j^{sk}$. We will refer to this as a sparse vector subset sum problem (SVSSP). If |T| is too small, there are obvious brute force attacks on the SVSSP, along with some more sophisticated time-space tradeoffs, that take time essentially exponential in |T|. Also, if |S| is so small that the subset sum solution is unique, then one can apply lattice reduction attacks similar to those used against low-density knapsacks. However, if |T|=w(1) and |S| is sufficiently large (but still polynomial in n), the brute force attacks take super-polynomial time; also, the lattice reduction attacks break down, since there will be an exponential number of subset sum solutions, and lattice reduction has trouble extracting the sparse solution from the non-sparse ones.

Interestingly, our two assumptions counterbalance each other: basically, if one adjusts the scheme's parameters to make one problem harder, the other problem becomes easier. Using a crude analysis, the breaking time for the second problem using known attacks is roughly $2^{|T|}$. (Here we ignore constants and logarithmic factors in the exponent.) Also, to enable the somewhat homomorphic ideal lattice scheme to evaluate circuits of depth O(log |T|) as needed to permit bootstrappability, we need the approximation factor for the first problem to be roughly $2^{|T|}$. Using the rule of thumb that a lattice problem for approximation factor $2^k$ takes time about $2^{n/k}$, the breaking time for the first problem is roughly $2^{n/|T|}$. Setting $|T| \leftarrow \sqrt{n}$ ensures that it takes time at least $2^{\sqrt{n}}$ to break either problem using known attacks. To make this breaking time truly exponential in the security parameter $\lambda$, we need the lattice dimension to be n≈$\lambda^2$. Of course, this analysis does not apply to the somewhat homomorphic scheme, which does not use bootstrapping and relies only on the first assumption, and therefore can use lattices of smaller dimension.

Even this counterbalancing of our assumptions can be viewed through the prism of our physical analogy (Alice's jewelry store) if one squints sufficiently hard. One way that Alice's employees might try to extract a key from a box is simply by cutting through the gloves. To prevent this attack, one would like the gloves to be stiffer. On the other hand, making the gloves stiffer reduces their usability, and so we need a faster chemical reaction between keys and boxes. This forces Alice to give her employees a better accelerant, which provides more precise information about the chemical composition of her keys, and therefore makes it easier for her employees to duplicate a key chemically. By making one attack more difficult, she is forced to make the other easier.

1.7 Performance

When we run Evaluate(pk, C, $\Psi$) over a circuit C and ciphertexts $\Psi$, the computational complexity of this algorithm is exactly the complexity of computing C non-homomorphically times a factor that is polynomial in the security parameter $\lambda$. The degree of this polynomial is rather high. If one wants $2^\lambda$ security against known attacks on the two problems that underlie the security of our scheme, the required computation per gate is quasi-linear in $\lambda^6$. While high, this does not seem entirely unreasonable when one considers that, to get $2^\lambda$ security against the number field sieve, one should use an RSA modulus whose bit-length is quasi-linear in $\lambda^3$, in which case a full exponentiation takes time quasi-linear in $\lambda^6$, even when one uses fast FFT multiplication. See Section 12 for more details.

The story is very different if we only require super-polynomial security: in this case, n can be quasi-linear in the security parameter $\lambda$, |T| can be polylogarithmic in n, S quasi-linear in n, and ciphertexts can be represented by a quasi-linear (in n) number of bits. In this case, the complexity of Recrypt (and hence the computation per gate) can be quasi-linear in $\lambda^3$.

Also, for relatively shallow circuits, where bootstrapping (and hence homomorphically evaluating the decryption circuit is unnecessary), the scheme is very practical: one obtains exponential security and, there is a constant c such that one can evaluate circuits of multiplicative depth c·log $\lambda$ with computation per gate that is quasi-linear in $\lambda^{1+c}$. The computation is quasi-linear in $\lambda$ for constant depth circuits.

1.8 Applications

The most natural applications of fully homomorphic encryption are in the two-party setting. A simple example is making encrypted queries to search engines. To perform an encrypted search, Alice generates a public key pk for the fully homomorphic encryption scheme, and generates ciphertexts $\psi_1, \ldots, \psi_t$ that encrypt her query $\pi_1, \ldots, \pi_t$ under pk. (For example, each $\pi_i$ could be a bit of her query.) Now, let the circuit C express the server's search function. The server sets $\psi^*_i \leftarrow$Evaluate(pk, $C_i, \psi_1, \ldots, \psi_t$), where $C_i$ is the sub-circuit of C that computes the ith bit of the output. (We note that, in practice, the evaluation of $C^*_i$ and $C^*_j$ may share intermediate results, in which case it would be needlessly inefficient to run independent instances of the Evaluate algorithm.) The server sends these ciphertexts to Alice. We know, by the correctness requirement, that Decrypt(sk, $\psi^*_i$)=$C_i(\pi_1, \ldots, \pi_t)$. These latter values constitute precisely the answer to Alice's query, which she recovers through decryption.

Another natural application is searching over encrypted data. In this scenario, Alice stores her files on a server (e.g., on the Internet), so that she can conveniently access her files without needing her own computer. However, she encrypts her files, because otherwise the server could read or leak her private data. Let bits $\pi_1, \ldots, \pi_t$ represent the files, which are encrypted in the ciphertexts $\psi_1, \ldots, \pi_t$. Suppose that later Alice wants to download all of her encrypted files that satisfy a query—e.g., all files containing the 'homomorphic' within 5 words of 'encryption', but not the word 'evoting'. She sends her query to the server, which expresses it as a circuit C. The server sets $\psi^*_i \leftarrow$Evaluate(pk, $C_i, \psi_1, \ldots, \psi_t$) and sends these ciphertexts to Alice. Alice decrypts them to recover $C(\pi_1, \ldots, \pi_t)$, the (bits of the) files that satisfy her query. (In this application, as in the encrypted search application, Alice needs to provide an upper bound on the number of bits that the response should have, and the server's encrypted response will be padded or truncated to that upper bound.)

Let us compare fully homomorphic encryption to a previous general solution for secure two-party computation—namely, "Yao's garbled circuit". The problem with Yao's protocol is that the communication complexity is proportional to the size of the circuit C. This makes the protocol rather unattractive in both of the scenarios discussed above (encrypted search and searching encrypted data). In the encrypted search scenario, the search engine would need to send Alice a huge garbled circuit whose size is proportional to the data being searched. In the scenario of searching on encrypted data, Alice would need to send a circuit whose size is proportional to the size of her data; if such communication complexity could be tolerated, then the server might as well just transmit all of Alice's encrypted files to her without "processing" those files at all, and let Alice figure out which files she wants. With fully homomorphic encryption, the communication complexity is much less. In particular, the communication needed, other than pk, is simply the number of bits need to express Alice's (cleartext) query and the server's (cleartext) response, each multiplied by the size of the security parameter, since each cleartext bit becomes a ciphertext. Actually, for the inputs to the circuit—e.g., Alice's query—we can do even better; the scheme's communication overhead here can be only additive, rather than multiplicative. Yao's protocol has the advantage of hiding the circuit, but it easy to tweak our fully homomorphic encryption scheme so that it provides unconditional circuit privacy.

Despite nearly minimal communication efficiency, our fully homomorphic encryption scheme does add a fair amount of computational overhead, so asynchronous application scenarios may be more appropriate in practice. An asynchronous example is spam filtering of encrypted emails: given an email encrypted using our scheme under Alice's public key, Alice's email server can homomorphically apply its spam filter to the email to obtain an encryption of '0' (indicating the email is not spam) or '1' (indicating that it is). Later, Alice decrypts this single ciphertext to recover a bit b, and only decrypts the rest of the email if b=0.

Regarding multiparty computation, we already know that we can securely compute any function. More specifically, one can construct efficient secure protocols for any multiparty computation in which there is an honest majority, assuming only the existence of trapdoor permutations (see O. Goldreich, S. Micali, and A. Wigderson, "How to play any mental game—a completeness theorem for protocols with honest majority", J. of the ACM, vol. 38, no. 1, pp. 691-729, 1991). By "efficient," we do not mean that these protocols are necessarily practical. We mean only that the communication and computational complexity of the secure protocol equals the computational complexity of the insecure protocol times some factor that is polynomial in the security parameter and number of parties.

But why should the communication complexity of secure multiparty computation depend at all on computational complexity of the function being computed? Naor and Nissim (see M. Naor and K. Nissim, "Communication preserving protocols for secure function evaluation", in Proc. of STOC '01, pages 590-599, 2001) showed that, as one would expect, it is possible to construct a secure protocol whose communication complexity is polynomial in the security parameter and communication complexity of the insecure protocol, but their method has a severe shortcoming: the computational complexity of their scheme is exponential (in the worst case) in the communication complexity. In eliminating one type of unwanted dependence, it introduces another.

Previous work leaves a fundamental question unanswered: can we make a protocol secure while leaving both the communication and the computational complexity unchanged, up to a factor polynomial in the security parameter? With fully homomorphic encryption, the answer is essentially 'yes.' More precisely, the answer is 'yes' if we relax the definition of communication complexity to include the bit-lengths of the output functions (which normally would not necessarily be included, since they are not communicated).

Extending our application of fully homomorphic encryption from the two-party setting to the multiparty setting is not entirely trivial, since, in the two-party setting, Bob prevented Alice from seeing any intermediate values encrypted under Alice's key simply by finishing the computation himself, and sending back the final encrypted value to Alice; in the multiparty setting, it is less clear how one prevents Alice from seeing intermediate value encrypted under her key. So, we use an approach initially proposed by Franklin and Haber (see M. Franklin and S. Haber, "Joint encryption and message-efficient secure computation", Journal of Cryptology, 9(4):217-232, 1996), and further developed by Cramer, Damgard and Nielsen (see R. Cramer, I. Damgaard, and J. B. Nielsen, "Multiparty computation from threshold homomorphic encryption", in Proc. of Crypto '01, LNCS 2045, pages 280-300)—namely, basing secure multiparty computation on threshold homomorphic encryption. The idea is simple. The parties must use some (other) scheme for secure computation to set up a public key for the fully homomorphic encryption scheme and distribute shares of the secret key; this introduces additive communication and computational overhead that is independent of the insecure protocol. After setup, they perform exactly the communications and computations that they would in the insecure protocol, except on encrypted data; fully homomorphic encryption ensures that, if a party was able to perform computations locally in the insecure protocol, it is also able to in the secure protocol. Afterwards, they use some scheme for secure computation to perform threshold decryption on the encrypted outputs; again, this overhead is independent of the insecure protocol, except insofar as it depends on the bit-lengths of the function outputs. Cramer et al.'s scheme is dependent on the number of multiplication gates in the circuit because these could not be performed homomorphically. With a fully homomorphic encryption scheme, we avoid this problem, and fully realize their high-level concept of an "arithmetic black box."

To handle malicious parties, we can use Naor and Nissim's transformation from a protocol for multiparty SFE with semi-honest parties to a protocol for malicious ones via a compiler that is communication-preserving—i.e., the transformation adds communication polynomial in the security parameter and polylogarithmic in the inputs. (The security parameter should be at least logarithmic in the size of the inputs anyway; otherwise, the work needed to break the scheme would be less than the work needed to process the inputs.) The essential ideas of this transformation come from Kilian's construction of zero-knowledge arguments. See J. Kilian, "A Note on Efficient Zero-Knowledge Proofs and Arguments", in Proc. of STOC '92, pages 723-732, and J. Kilian, "Improved Efficient Arguments", in Proc. of Crypto '95, LNCS 963, pages 311-324, and S. Arora, C. Lund, R. Motwani, M. Sudan, and M. Szegedy, "Proof verification and the hardness of approximation problems", J. of the ACM, vol. 45, no. 3, 1998, pages 501-555.

The literature mentions numerous other applications where fully homomorphic encryption would be useful. For example, Goldreich and Ostrovsky (O. Goldreich and R. Ostrovsky, "Software protection and simulation by oblivious RAMs", JACM, 1996) consider software protection, show that any program can be converted to a pair consisting of an encrypted program and a CPU with λ bits of "shielded" memory, where λ is the security parameter, which defeats "experiments" by an adversary that might either attempt the determine the values that are stored and retrieved from memory, or try to determine the program's "access pattern"—i.e., its attempts to change the values. In their scheme, there is only a logarithmic blow-up in the computation time; however, the shielded CPU needs to be accessed for any nontrivial computation. With a fully homomorphic encryption scheme, the program and values can remain encrypted throughout the computation until the end. The shielded CPU only needs to be accessed to perform the decryption of the final output.

Goldwasser, Kalai and Rothblum (S. Goldwasser, Y. T. Kalai, and G. Rothblum, "One-Time Programs", in *Proc. of Crypto '08*, LNCS 5157, pages 39-56, Springer, 2008) introduce the concept of one-time programs, in which they make minimal use of hardware to ensure that a program is used only once. Their approach is essentially to encrypt the program using Yao's garbled circuit, and have a secure device perform the decryption (a toggle bit is used to ensure that this decryption happens only once). One shortcoming of their approach is that the size of the encrypted program is proportional to the maximal running time of the program. With a fully homomorphic encryption scheme, one can construct an (encrypted) one-time program whose size is proportional to the original program. Essentially, one simply encrypts the program using the fully homomorphic encryption scheme, and runs it homomorphically, using the device to perform the final decryption. The party running the program also needs to generate a NIZK, verifiable by the device, that proves that the final ciphertext was validly constructed by running the encrypted program P on permitted inputs; again, we can use Kilian's communication-efficient zero-knowledge arguments here (see above).

Ostrovsky and Skeith (R. Ostrovsky and W. E. Skeith, "Private Searching on Streaming Data", in *Proc. of Crypto '05*, LNCS 3621, pp. 223-240) propose the notion of public-key obfuscation—i.e., where a sort of obfuscation is achieved simply by encrypting the program; somehow, one then runs the encrypted program, and afterwards decrypts the output. With a fully homomorphic encryption scheme, running the encrypted program is straightforward. Currently, there is a lot of excitement about applications such as web services and cloud computing, where fully homomorphic encryption would permit remote computations on encrypted data with complete privacy.

We have already mentioned the notion of proxy re-encryption in Section 1.3. In a proxy reencryption scheme, the idea is that Alice wants to publish a tag τ that will permit anyone to convert a ciphertext encrypted under her public key $pk_A$ into an encryption of the same message under Bob's public key $pk_B$. Previous proxy re-encryption schemes have some shortcomings. They either are not unidirectional (i.e., Alice's tag can also be used to convert ciphertexts under $pk_B$ to ciphertexts under $pk_A$, and Alice and Bob must cooperate to produce τ), or they are not multi-use (i.e., it is impossible to construct a sequence of tags $\tau_1, \tau_2, \ldots$ that allows anyone to convert ciphertexts under $pk_A$ to $pk_B$, $pk_B$ to $pk_C$, and so on indefinitely, without the ciphertexts growing in size). Recursive application of our Recrypt algorithm gives the first unidirectional multi-use proxy re-encryption scheme.

With fully homomorphic encryption, one can construct non-interactive zero knowledge proofs (NIZKs) of small size. For example, suppose that Alice wants to prove that $\pi_1, \ldots, \pi_t$ is a satisfying assignment of a boolean circuit C. Alice generates a public key pk for the fully homomorphic encryption scheme, the input ciphertexts $\{\psi_i \leftarrow \text{Encrypt}(pk, \pi_i)\}$, and the output ciphertext $\psi^* \leftarrow \text{Evaluate}(pk, C, \psi_1, \ldots, \psi_t)$. The NIZK that her assignment is satisfying consists of NIZK proofs, under any NIZK scheme, that pk, $\{\psi_i\}$ and $\psi^*$ are well-formed, where well-formedness for the ciphertexts means that each $\psi_i$ is a valid encryption of '0' or '1', and $\psi^*$ is a valid encryption of '1'. The verifier checks the NIZKs for well-formedness, and confirms that $\psi^*=\text{Evaluate}(pk, C, \psi_1, \ldots, \psi_t)$. Intuitively, the NIZK proof works because, if the verifier believes that pk and the input ciphertexts are well-formed, then the correctness of the encryption scheme implies that the output ciphertext can encrypt '1' only if $C(\pi_1, \ldots, \pi_t)=1$. The size of this NIZK proof is proportional to the number of inputs to the circuit, but is otherwise independent of the size of the circuit.

For many interesting applications, we do not need the full power of our scheme; rather, a simpler, more efficient version of our scheme that evaluates circuits of logarithmic multiplicative depth suffices. For example, consider private information retrieval from an m-bit database. The querier can simply encrypt the index that it wants using log m ciphertexts. The database's response corresponds to a (log m)-degree formula evaluated over these ciphertexts, which (essentially) can be computed using a (log log m)-depth circuit. We can evaluate such shallow circuits using the somewhat homomorphic scheme that we sketched in Section 1.4, without requiring either bootstrapping or "squashing the decryption circuit." This basic scheme compares well with the pairing-based scheme of Boneh-Goh-Nissim, which can essentially evaluate quadratic formulas; our basic scheme can also do essentially an arbitrary number of additions, but with greater multiplicative depth. In general, when the function to be evaluated is highly parallel, the bootstrapping step may be unnecessary, permitting better efficiency.

Clearly, several of these applications relate to obfuscation, but the precise relationship between fully homomorphic encryption and obfuscation is unclear. We know that general obfuscation is impossible under a certain definition of obfuscation (see B. Barak, O. Goldreich, R. Impagliazzo, S. Rudich, A. Sahai, S. Vadhan, K. Yang, "On the (Im)possibility of Obfuscating Programs", in *Proc. of Crypto '01*, LNCS 2139, pages 1-18), but obfuscation may be possible under a weaker, but still meaningful, definition. We also know that general obfuscation (under essentially any reasonable definition) would imply fully homomorphic encryption: it would suffice to obfuscate circuits that take ciphertexts encrypting $\pi_1$ and $\pi_2$ and output appropriately distributed ciphertexts encrypting $\pi_1+\pi_2$ and $\pi_1 \times \pi_2$. Since general obfuscation would imply fully homomorphic encryption, it seems reasonable to guess that a general obfuscation technique (if one exists) would employ some of the techniques (bootstrapping, etc.) that we use here to construct fully homomorphic encryption. Unlike a fully homomorphic encryption scheme, however, an obfuscated circuit should allow one to compute an unencrypted output. If one is to build a general obfuscation scheme from fully homomorphic encryption, the question becomes: how can one provide, as part of the obfuscated circuit, some sort of decryption key that allows recovery of the final output, in such a way that this decryption key does not permit decryption of interior nodes of the circuit, thereby unraveling the entire obfuscation.

2 Definitions Related to Homomorphic Encryption

2.1 Basic Definitions

A conventional public-key encryption scheme $\epsilon$ consists of three algorithms: $\text{KeyGen}_\epsilon$, $\text{Encrypt}_\epsilon$, and $\text{Decrypt}_\epsilon$. $\text{KeyGen}_\epsilon$ is a randomized algorithm that takes a security parameter $\lambda$ as input, and outputs a secret key sk and public key pk; pk defines a plaintext space $\mathcal{P}$ and ciphertext space $\mathcal{C}$. $\text{Encrypt}_\epsilon$ is a randomized algorithm that takes pk and a plaintext $\pi \in \mathcal{P}$ as input, and outputs a ciphertext $\psi \in \mathcal{C}$. $\text{Decrypt}_\epsilon$ takes sk and $\psi$ as input, and outputs the plaintext $\pi$. The computational complexity of all of these algorithms must be polynomial in $\lambda$. Correctness is defined as follows: if $$(sk, pk) \xleftarrow{R} KeyGen_\epsilon, \pi \in \mathcal{P},$$

and $$\psi \xleftarrow{R} Encrypt_\epsilon(pk, \pi),$$

then $\text{Decrypt}_\epsilon(sk, \psi) \to \pi$.

It will be obvious to one well-versed in the art that any public key encryption scheme (homomorphic or not) can easily be converted into a secret key or "symmetric" encryption scheme simply by setting pk=sk.

In addition to the three conventional algorithms, a homomorphic encryption scheme $\epsilon$ has a (possibly randomized) efficient algorithm $\text{Evaluate}_\epsilon$, which takes as input the public key pk, a circuit C from a permitted set $\mathcal{C}_\epsilon$ of circuits, and a tuple of ciphertexts $\Psi = \langle \psi_1, \ldots, \psi_t \rangle$ for the input wires of C; it outputs a ciphertext $\psi \in \mathcal{C}$. Informally, the functionality that we want from $\text{Evaluate}_\epsilon$ is that, if $\psi_i$ "encrypts $\pi_i$" under pk, then $\psi \leftarrow \text{Evaluate}_\epsilon(pk, C, \Psi)$ "encrypts $C(\pi_1, \ldots, \pi_t)$" under pk, where $C(\pi_1, \ldots, \pi_t)$ is the output of C on inputs $\pi_1, \ldots, \pi_t$.

There are different ways of formalizing the functionality "encrypts $C(\pi_1, \ldots, \pi_t)$." A minimal requirement is correctness.

Definition 2.1 (Correctness of Homomorphic Encryption). We say that a homomorphic encryption scheme $\epsilon$ is correct for circuits in $\mathcal{C}_\epsilon$ if, for any key-pair (sk, pk) output by $\text{KeyGen}_\epsilon(\lambda)$, any circuit $C \in \mathcal{C}_\epsilon$, any plaintexts $\pi_1, \ldots, \pi_t$, and any ciphertexts $\Psi = \langle \psi_1, \ldots, \psi_t \rangle$ with $\text{Encrypt}_\epsilon(pk, \pi_i)$, it is the case that:

if $\psi \leftarrow \text{Evaluate}_\epsilon(pk, C, \Psi)$, then $\text{Decrypt}_\epsilon(sk, \psi) \to C(\pi_1, \ldots, \pi_t)$ except with negligible probability over the random coins in $\text{Evaluate}_\epsilon$.

By itself, mere correctness fails to exclude trivial schemes. In particular, suppose we define $\text{Evaluate}_\epsilon(pk, C, \Psi)$ to just output $(C, \Psi)$ without "processing" the circuit or ciphertexts at all, and $\text{Decrypt}_\epsilon$ to decrypt the component ciphertexts and apply C to results. This scheme is correct, but uninteresting. We can address this shortcoming by upper-bounding the length of ciphertexts output by $\text{Evaluate}_\epsilon$. One way to do this is by placing an upper bound on the size of the decryption circuit $D_\epsilon$ for the scheme $\epsilon$ that depends only on the security parameter, as in the following definition.

Definition 2.2 (Compact Homomorphic Encryption). We say that a homomorphic encryption scheme $\epsilon$ is compact if there is a polynomial $f$ such that, for every value of the security parameter $\lambda$, $\epsilon$'s decryption algorithm can be expressed as a circuit $D_\epsilon$ of size at most $f(\lambda)$.

Definition 2.3 ("Compactly Evaluates"). We say that a homomorphic encryption scheme $\epsilon$ "compactly evaluates" circuits in $\mathcal{C}_\epsilon$ if $\epsilon$ is compact and also correct for circuits in $\mathcal{C}_\epsilon$.

We can consider various relaxations of compactness, since homomorphic encryption schemes in which the ciphertext size grows sub-linearly with the size of the circuit are still interesting for many applications. For example, we could permit the sizes of the secret key and ciphertexts to grow polynomially with the depth of the circuit. We will informally call such schemes "quasi-compact." Now, we define fully homomorphic encryption as follows.

Definition 2.4 (Fully Homomorphic Encryption). We say that a homomorphic encryption scheme $\epsilon$ is fully homomorphic if it compactly evaluates all circuits.

One may consider this definition to be too strong, because, as mentioned above, quasi-compactness could suffice; we avoid using quasi-compactness in our definition both because it is tedious to formalize, and we will rarely use the notion anyway. A second reason that it is too strong is because it excludes leveled schemes, which only evaluate circuits of depth up to some d, and whose public key length may be poly(d); hence, the following relaxation.

Definition 2.5 (Leveled Fully Homomorphic Encryption). We say that a family of homomorphic encryption schemes $\{\epsilon^{(d)} : d \in \mathbb{Z}^+\}$ is leveled fully homomorphic if, for all $d \in \mathbb{Z}^+$, they all use the same decryption circuit, $\epsilon^{(d)}$ compactly evaluates all circuits of depth at most d (that use some specified set of gates), and the computational complexity of $\epsilon^{(d)}$'s algorithms is polynomial in $\lambda$, d, and (in the case of $\text{Evaluate}_\epsilon$) the size of the circuit C.

(We assume the set of gates that compose the circuit is understood.)

While fully homomorphic encryption, as we have defined it, seems highly nontrivial to achieve, one still might consider our definition to be too weak, since it does not require circuit privacy.

Definition 2.6 ((Statistical) Circuit Private Homomorphic Encryption). We say that a homomorphic encryption scheme $\epsilon$ is circuit-private for circuits in $\mathcal{C}_\epsilon$ if, for any key-pair (sk, pk) output by $\text{KeyGen}_\epsilon(\lambda)$, any circuit $C \in \mathcal{C}_\epsilon$, and any fixed ciphertexts $\Psi = \langle \psi_1, \ldots, \psi_t \rangle$ that are in the image of $\text{Encrypt}_\epsilon$ for plaintexts $\pi_1, \ldots, \pi_t$, the following distributions (over the random coins in $\text{Encrypt}_\epsilon$, $\text{Evaluate}_\epsilon$) are (statistically) indistinguishable:

$$\text{Encrypt}_\epsilon(pk, C(\pi_1, \ldots, \pi_t)) \approx \text{Evaluate}_\epsilon(pk, C, \Psi)$$

The obvious correctness condition must still hold.

We prefer to consider circuit privacy to be a property that is separate from, and complementary to, full homomorphism. However, we will eventually show how to make our lattice-based fully homomorphic encryption scheme circuit private. Our technique will be to use a public (i.e., not using the secret key) algorithm $\text{RandomizeCT}_\epsilon$ that, applied post hoc, induces the same distribution (statistically) to ciphertexts output by $\text{Encrypt}_\epsilon$ and $\text{Evaluate}_\epsilon$, while preserving correctness. (See Section 13.)

The motivating setting for statistical circuit privacy is two-party computation in the honest-but-curious setting, where Alice holds a circuit, and Bob holds sk. Alice may want her output ciphertext to reveal nothing about her circuit, even though Bob chooses the input ciphertexts. She can hide her circuit by applying $\text{RandomizeCT}_\epsilon$ to the ciphertext output by $\text{Evaluate}_\epsilon$ before sending result to Bob. When sk is shared, one may also define a computational version of circuit privacy, but this is covered by the semantic security of encryption scheme, defined in the next Subsection.

For most applications, it is acceptable to reveal some limited information about the circuit, such as an upper bound on the number of levels. (Since any circuit is a directed acyclic graph, its gates can be topologically sorted and partitioned into levels, such that each wire extends from one gate to a gate with a higher level number.) Accordingly, we define the following slight relaxation of circuit privacy.

Definition 2.7 (Leveled Circuit Private Homomorphic Encryption). Like circuit private homomorphic encryption, except that there can be a different distribution associated to each level, and the distributions only need to be equivalent if they are associated to the same level (in the circuit).

Unlike circuit privacy, leveled circuit privacy, by itself, does not imply compactness. That is, in a leveled circuit private homomorphic encryption scheme, it is possible for the ciphertext size to grow exponentially with the number of levels. In fact, this is precisely the case in some previous circuit-private schemes, such as SYY (T. Sander, A. Young, and M. Yung, "Non-interactive cryptocomputing for NC1", in Proc. of FOCS '99, pages 554-567, 1999).

An interesting open question is the extent to which fully homomorphic encryption, as we have defined it, already implies circuit-private fully homomorphic encryption. Intuitively, given a ciphertext $\psi$ that encrypts $\pi$, we can "randomize" using the homomorphism—e.g., by repeatedly adding encryptions of '0'—to obtain new encryptions of $\pi$. Since the fully homomorphic encryption scheme is compact, this randomization occurs within a non-expanding ciphertext space. One may hope that these randomizations induce a nice, connected, expander-like graph, and that therefore a small number of randomizations results in a statistically random encryption of $\pi$. However, the definition of fully homomorphic encryption does not seem even to imply that this graph is connected. It would be nice to state some natural minimal generic property, in addition to full homomorphism, that would imply circuit privacy. (Certainly, the property that adding an encryption of '0,' or multiplying in an encryption of '1,' completely "randomizes" the ciphertext would be sufficient, but in this case circuit privacy is an uninteresting tautology.)

In the definitions above, we have focused on circuits, but one may also consider programs that use other representation models. For example, one may consider weaker models—e.g., formulas, branching programs, OBDDs, finite automata, decision trees, and truth tables—and consider the efficiency of a homomorphic encryption scheme with respect to one of these models. For example, although an encryption scheme that is additively homomorphic will not be able to evaluate general circuits efficiently, such a scheme can be used to construct a single-server private information retrieval (PIR) scheme with sub-linear communication; such a PIR scheme, in turn, can be viewed as homomorphic encryption scheme that permits the (efficient) evaluation of a truth table with an output ciphertext that is sub-linear in the size of the table. Ishai and Paskin (Y. Ishai and A. Paskin, "Evaluating Branching Programs on Encrypted Data", in Proc. of TCC '07) describe a scheme in which Evaluate takes a branching program (BP) P as input; finite automata, decision trees, and OBDDs can be efficiently represented as BPs. The ciphertext output by their Evaluate algorithm depends polynomially on the number of input ciphertexts and on the depth of the BP, but not on its size. On the other hand, since a program may allow loops, it may permit a more compact representation of the circuit.

2.2 Computational Security Definitions

For an ordinary public key encryption scheme, security against adaptive chosen-ciphertext attacks (CCA2) is captured in the following game.

Setup. The challenger runs $$(sk, pk) \xleftarrow{R} KeyGen_\varepsilon(\lambda)$$

and gives pk to the adversary $\mathcal{A}$. It sets $\psi^* \leftarrow \perp$.

Queries. $\mathcal{A}$ issues decryption queries on ciphertexts $\psi_i \neq \psi^*$. The challenger responds with the output of $Decrypt_\varepsilon(sk, \psi_i)$. Queries can occur before or after the challenge.

Challenge. $\mathcal{A}$ generates two plaintexts $\pi^*_0, \pi^*_1 \in \mathcal{P}$ and sends these to the challenger. The challenger sets $$b \xleftarrow{R} \{0, 1\}$$

and $$\psi^* \xleftarrow{R} Encrypt_\varepsilon(pk, \pi^*_b).$$

It sends $\psi^*$ to $\mathcal{A}$.

Guess. $\mathcal{A}$ sends $b' \in \{0, 1\}$ to the challenger. $\mathcal{A}$ wins the game if $b'=b$.

Security against "lunchtime attacks"—i.e., CCA1 security—is modeled by a game similar to above, except that $\mathcal{A}$ may make queries only before the challenge. In the game for semantic security, $\mathcal{A}$ is not permitted to make any queries.

In each case, we define $\mathcal{A}$'s advantage in attacking the scheme $\epsilon$ as $$Adv(A, \varepsilon, \lambda) = \left| Pr[b = b'] - \frac{1}{2} \right|$$

The probability is over the random bits used by the challenger and the adversary.

Definition 2.8 (Semantic Security against (CPA, CCA1, CCA2) attacks). We say E is semantically secure against (CPA, CCA1, CCA2) attacks if no polynomial time (CPA, CCA1, CCA2)-adversary $\mathcal{A}$ breaks $\epsilon$ with advantage non-negligible in the security parameter $\lambda$.

When referring simply to "semantic security," we mean semantic security against chosen plaintext attacks.

We define the CCA2, CCA1, and semantic security games for a homomorphic encryption scheme as being identical to the original games, except that now the ciphertext space is potentially larger—i.e., the support of $Evaluate_\varepsilon$ rather the support of $Encrypt_\varepsilon$; $\mathcal{A}$ can draw its queries from this larger space. Also, $\mathcal{A}$ has more freedom in requesting its challenge. The natural way to define the Challenge phase is that $\mathcal{A}$ sends the challenger some circuit $C \in \mathcal{C}_\varepsilon$ with some number $k=poly(\lambda)$ of inputs, and two sets of plaintexts, $(\pi_{01}, \ldots, \pi_{0k}), (\pi_{11}, \ldots, \pi_{1k}) \in \mathcal{P}^k$; the challenger sets $$b \xleftarrow{R} \{0, 1\}$$

and outputs $$\psi^* \xleftarrow{R} \text{Evaluate}_\varepsilon(pk, C, \psi_{b1}, \ldots, \psi_{bk})$$

where $$\psi_{bi} \xleftarrow{R} \text{Encrypt}_\varepsilon(pk, \pi_{bi}).$$

However, since the adversary can run Evaluate$_\varepsilon$ itself, we can simplify the Challenge phase by having the adversary just request the input ciphertexts $\psi_{b1}, \ldots, \psi_{bk}$.

Clearly, the only difference between the semantic security games for ordinary public key encryption and homomorphic encryption is that, in the latter, the adversary can request more ciphertexts in the Challenge phase. By a hybrid argument (see M. Bellare, A. Boldyreva, and S. Micali, "Public-Key Encryption in a Multi-user Setting: Security Proofs and Improvements", in *Proc. of Eurocrypt '00*, pages 259-274, Springer, 2000), an algorithm $\mathcal{A}$ that that breaks the semantic security in the game above with advantage $\in$ can be used to construct an algorithm $\mathcal{B}$ that breaks the semantic security in the original game with advantage $\in$/k; $\mathcal{B}$'s is roughly k times that of $\mathcal{A}$. Thus, to prove semantic security of a homomorphic encryption scheme, we can just use the semantic security game for ordinary public key encryption.

The same is true for CCA1 and CCA2 security, as long as the scheme is circuit-private. (Circuit privacy ensures that the ciphertext space is the same in both games, thus allowing $\mathcal{B}$ to forward $\mathcal{A}$'s decryption queries to the challenger, and forward the responses back to $\mathcal{A}$.)

Unfortunately, a scheme that has nontrivial homomorphisms cannot be CCA2 secure, because it is malleable. Benign malleability (see J. H. An, Y. Dodis, and T. Rabin, "On the security of joint signature and encryption", in *Proc. of Eurocrypt '02*, LNCS 2332, pages 83-107, Springer, 2002) and replayable CCA (see R. Canetti, H. Krawczyk, and J. B. Nielsen, "Relaxing chosen-ciphertext security", in *Proc. of Crypto '03*, pages 565-582, Springer, 2003), which are two relaxed notions of CCA2 security, permit only transformations that preserve the underlying plaintext. Prabhakaran and Rosulek (M. Prabhakaran and M. Rosulek, "Homomorphic Encryption with CCA Security," in *Proc. of ICALP '08*, Springer, 2008) formalize a notion of "homomorphic-CCA security," which permits certain nontrivial operations on a plaintext while remaining nonmalleable with respect to other operations; they present a construction based on pairings. However, their approach does not extend (in fact, they provide some impossibility results) to schemes that permit certain operations on multiple ciphertexts. Finding meaningful relaxations of CCA2 security in this domain, and particularly for fully homomorphic encryption, is an open area.

There do not seem to be inherent reasons why a homomorphic encryption scheme cannot have semantic or CCA1 security. In particular, "Cramer-Shoup lite" (see R. Cramer and V. Shoup, "A Practical Public Key Cryptosystem Provably Secure Against Adaptive Chosen Ciphertext Attack", *Crypto '98*, LNCS 1462, pp. 13-25) is CCA1 and homomorphic (for one operation). However, we restrict our focus to semantic security, and leave finding a CCA1-secure fully homomorphic encryption scheme as an interesting open problem.

3 Other Homomorphic Encryption Schemes

Basic RSA was the first homomorphic encryption scheme: given ciphertexts $\psi_1 = \pi_1^e \mod N$ and $\psi_2 = \pi_2^e \mod N$, one can compute a ciphertext $\psi \leftarrow \psi_1 \cdot \psi_2 = (\pi_1 \cdot \pi_2)^e \mod N$ that encrypts the product of the original plaintexts. However, basic RSA is deterministic, and therefore not even semantically secure. Despite the lack of semantic security, RSA's multiplicative homomorphism is still useful for many applications. (See R. Rivest, A. Shamir, and L. Adleman, "A method for obtaining digital signatures and public-key cryptosystems", in *Comm. of the ACM*, 21:2, pages 120-126, 1978.)

Rivest, Adleman, and Dertouzos were the first to explore the possibilities of fully homomorphic encryption, which they called a "privacy homomorphism", and they proposed several candidate schemes. However, these early candidates have been broken (see E. Brickell and Y. Yacobi, "On Privacy Homomorphisms", in *Proc. of Eurocrypt '87*, LNCS 304, pages 117-125, Springer, 1988). Their early schemes did not have a proof of security based on an established hard problem, so breaking the schemes did not require any new algorithm to break such a hard problem.

Homomorphic encryption schemes that are not semantically secure, like textbook RSA and some proposals by Rivest, Adleman and Dertouzos, may also have stronger attacks on their one-wayness. In particular, Boneh and Lipton proved that any algebraic privacy homomorphism over a ring $Z_n$, can be broken in sub-exponential time under a (reasonable) number theoretic assumption, if the scheme is deterministic or offers an equality oracle. In the quantum setting, the situation is even worse. van Dam, Hallgen and Ip proved that, with quantum computation, any deterministic algebraic privacy homomorphism with an equality oracle can be broken in polynomial time. (See D. Boneh and R. Lipton, "Searching for Elements in Black-Box Fields and Applications", in *Proc of Crypto '96*, LNCS 1109, pages 283-297, Springer, 1996.) (See W. van Dam, S. Hallgren, and L. Ip, "Quantum algorithms for some hidden shift problems", in *Proc. of SODA '03*, pages 489-498.)

The first scheme with a proof of semantic security based on a well-defined assumption was proposed by Goldwasser-Micali in the paper that introduced the notion of semantic security. (See S. Goldwasser and S. Micali, "Probabilistic encryption and how to play mental poker keeping secret all partial information", in *Proc of STOC '82*, pages 365-377, 1982.) Some other additively homomorphic encryption schemes with proofs of semantically security are Benaloh, Naccache-Stern, Okamoto-Uchiyama, Paillier, and Damgard-Jurik. ElGamal (T. ElGamal, "A Public-Key Cryptosystem and a Signature Scheme Based on Discrete Logarithms", *Crypto '84*, pp. 469-472) is multiplicatively homomorphic. Some semantically secure schemes that allow both addition and multiplication include Boneh-Goh-Nissim (D. Boneh, E.-J. Goh, and K. Nissim, "Evaluating 2-DNF formulas on ciphertexts", *TCC '05*, LNCS 3378, pp. 325-341), which permits computation of quadratic formulas (e.g., 2-DNFs) over ciphertexts, and "Polly Cracker" (M. Fellows and N. Koblitz, "Combinatorial cryptosystems galore!", in *Contemporary Mathematics*, volume 168 of *Finite Fields Theory, Applications, and Algorithms*, FQ2, pages 51-61, 1993), which permits computation of arbitrary circuits over ciphertexts, but where the ciphertext size blows up exponentially with the depth of the circuit. For expository purposes, and since one can easily find other surveys of homomorphic encryption, we characterize these "conventional" homomorphic encryption schemes (although perhaps Polly Cracker is less conventional) as all falling within a certain abstract framework, with security abstractly based on an ideal membership problem. We will review these schemes in more detail momentarily.

This description will help highlight how our construction is fundamentally different, abstractly relying on an ideal coset problem that we define in Section 7.

It is also known that one can construct additively homomorphic encryption schemes from lattices or linear codes. The lattice-based scheme (C. A. Melchor, P. Gaborit, and J. Herranz, "Additive Homomorphic Encryption with t-Operand Multiplications", available at http://eprint.iacr.org/cgi-bin/getfile.pl?entry=2008/378&version=20090326: 145338&file=378.pdf) and the Reed-Solomon-code-based scheme by Armknecht and Sadeghi (F. Armknecht and A.-R. Sadeghi, "A New Approach for Algebraically Homomorphic Encryption", Cryptology ePrint Archive: Report 2008/422) also allow multiplications, though with exponential expansion in ciphertext size. Such schemes have a different flavor from the more "conventional" schemes above, because ciphertexts implicitly contain an "error" that grows as ciphertexts are added together. Thus, ciphertexts output by Evaluate do not have the same distribution as ciphertexts output by Encrypt, and at some point the error may become large enough to cause incorrect decryption. For this reason, the homomorphism is sometimes referred to as a "pseudohomomorphism" or a "bounded homomorphism". (We use different terminology; see Section 2.) We will not discuss these schemes in detail here, since the main technical complication—managing the size of the "error"—is also central to our scheme, where it will require an even closer analysis because our multiplicative homomorphism using ideal lattices expands the "error" quite rapidly.

van Dijk describes a technique that he calls "interval obfuscation" which can be viewed as a symmetric homomorphic encryption scheme. It uses a secret integer modulus M and a secret integer s that is relatively prime to M. A '0' is encrypted as $s \cdot x \mod M$ for some $x \in [1, a]$, where a is a "small" integer, while a '1' is encrypted as $s \cdot x \mod M$ for some $x \in [b+1, b+a]$, where b is a "large" integer (but still small in comparison to M). One can cryptocompute a homogeneous polynomial of degree d logarithmic in the security parameter by simply adding or multiplying the ciphertexts modulo M. The recipient decrypts c by setting $c' \leftarrow c/s^d \mod M$ (to remove the blinding factor) and then outputting $\lfloor c'/b^d \rfloor$; the idea is that each monomial which is a product of 1's will be represented by some integer that approximately equals $b^d$ after the blinding factor is removed, while the monomials for which the product is 0 will be represented by much smaller integers that can be ignored. One can view their scheme as using a one-dimensional ideal lattice—namely, the ideal (M) in the integers—while our somewhat homomorphic construction in Section 7 is conceptually somewhat similar but uses an n-dimensional ideal lattice. At a high level, the reason M must be kept private in their scheme (while we can reveal a basis for the lattice in our scheme) is that lattice problems over one-dimensional lattices are not hard. An initial version of van Dijk's scheme succumbed to attacks that used lattice reduction to recover M. It is an open question as to whether the security of a variant of van Dijk's scheme can be based on a natural hard problem.

Finally, there are schemes that use a singly homomorphic encryption scheme to construct a scheme that can perform more complicated homomorphic operations. Sanders, Young and Yung (SYY) show that one can use a circuit-private additively homomorphic encryption scheme to construct a circuit-private scheme that can handle arbitrary circuits, where the ciphertext size increases exponentially with the depth of the circuit. Their scheme can therefore feasibly evaluate NC1 circuits. (See T. Sander, A. Young, and M. Yung, "Non-interactive cryptocomputing for NC1", in *Proc. of FOCS '99*, pages 554-567, 1999.)

Ishai and Paskin show how to evaluate branching programs, and with much smaller ciphertexts than SYY. In their scheme Evaluate outputs a ciphertext whose length is proportional to the length of the branching program. This remains true even if the size of the branching program is very large—e.g., super-polynomial. However, the computational complexity of their scheme is proportional to the size; Barrington tells us that bounded-width polynomial-size branching programs recognize exactly those languages in NC1. (See Y. Ishai and A. Paskin, "Evaluating Branching Programs on Encrypted Data", in *Proc. of TCC '07*.)

In more detail, Ishai and Paskin use a "leveled" approach to evaluate a branching program, like we will use a leveled approach to evaluate circuits (see Section 4), though the details are very different. A (deterministic) branching program (BP) P is defined by a DAG from a distinguished initial node in which each nonterminal node has two outgoing edges labeled 0 and 1, and where the terminal nodes also have labels. To compute P(x) where the binary representation of x is $x_1 \ldots x_l$, one starts at the distinguished node, and traverses the DAG in the natural way dictated by $x_1 \ldots x_l$ to reach a terminal node, and outputs that node's label as P(x). The size of the BP is the number of nodes; the length is the length of the longest path. One can topologically arrange the nodes into levels, such that the number of levels is at most one more than the length of the BP, and the edges are all directed downward. BPs are relatively powerful; finite automata, decision trees, and ordered binary decision diagrams all have polynomial-size BPs.

To evaluate a BP, Ishai and Paskin essentially use 1-out-of-2 string OT recursively. Specifically, suppose Alice has a BP with l levels, and Bob has an input $x=x_1 \ldots x_l \in \{0, 1\}^l$ for which he wants to obtain P(x). Bob constructs l 1-out-of-2 string OT queries $q_i$, which respectively correspond to his bits $x_i$. Using Bob's queries, Alice evaluates her BP from the bottom-up. In particular, suppose N is a node at level l−1 with children N0 and N1 with labels $L_0$ and $L_1$. Alice uses $q_l$, $L_0$ and $L_1$ to construct a string-OT response R that implicitly "encrypts" label $L_{x_l}$; she then sets R to be the label of N. In this fashion, she gives labels to all of the nodes at level l−1, and then (recursively) to nodes at higher levels using Bob's other OT queries. Alice's ultimate response is the label associated to the distinguished node. This final label looks something like a multiple encryption in onion routing, and Bob "decrypts" it as such—using his secret knowledge to recover the label for $x_1$, then $x_1 x_2$, and so on. The length of Alice's response grows (at least) linearly with l for essentially the same reason that this happens in onion-routing: each layer of "encryption" has additive communication overhead. Using a communication-efficient string-OT scheme—e.g., one built from the length-flexible additively homomorphic Damgard-Jurik encryption scheme (see I. Damgard and M. Jurik, "A Length-Flexible Threshold Cryptosystem with Applications", *ACISP '03*, LNCS 2727, pages 350-356)—the ciphertext expansion per level is exactly linear. On the other hand, Alice's computation is proportional to the size of the BP, since she must construct OT responses even for "irrelevant" nodes in the BP.

To summarize to other approaches as far we know, in terms of schemes that offer more than a single homomorphism and offer a proof of semantic security, we have the schemes by Fellow and Koblitz, Melchor et al., Armknecht and Sadeghi, and Sanders et al., and related work (see D. Beaver, "Minimal-latency secure function evaluation", in *Proc. of Euroc-*

*rypt* '00, pages 335350, Springer, 2000, and F. Levy-dit-Vehel and L. Perret, "A Polly Cracker system based on satisfiability", in *Coding, Crypt. and Comb., Prog. in Comp. Sci. and App. Logic*, v. 23, pp. 177-192, and L. Ly, "A public-key cryptosystem based on Polly Cracker", Ph.D. thesis, Ruhr-Universitat Bochum, Bochum, Germany 2002, and L. Ly, "Polly two—a new algebraic polynomial-based public-key scheme", AAECC, 17(3-4), 2006) where ciphertext size grows exponentially with the multiplicative (and sometimes also additive) depth of the circuit. In Boneh-Goh-Nissim and Ishai-Paskin, Evaluate outputs small ciphertexts but handles a limited class of circuits—quadratic formulas, or circuits which correspond to branching programs of manageable size.

Now, we review the more "conventional" homomorphic encryption schemes whose semantic security can be based on a natural problem, like Goldwasser-Micali and Paillier. Since our scheme will rely heavily on properties of algebraic rings and ideals, we explain how these other homomorphic encryption schemes implicitly use these objects. By describing other homomorphic encryption schemes using these abstractions, we will see how the semantic security of most of these schemes relies on the hardness of an ideal membership problem—i.e., determining whether a member of the ring is also a member of the ideal.

Basically, a ring is a mathematical object like a field, except that not every element has a multiplicative inverse. Examples include the integers $\mathbb{Z}$, or the integers modulo a composite integer N: $\mathbb{Z}/N\mathbb{Z}$. Rings have an additive identity '0', a multiplicative identity '1', allow additive inverses, and are closed under addition and multiplication. An ideal I of a ring R is a subset of R that is closed under addition, and is also closed under multiplication with elements of R. An example is the ideal (2) of $\mathbb{Z}$, the set of even numbers; multiplying an element of (2) with an element of $\mathbb{Z}$ gives an element in (2). For ideal $I \subset R$, R/I is the ring of cosets of I in R; e.g., if R=$\mathbb{Z}$ and I=(2), R/I consists of the cosets 0+(2) (the even integers, the additive identity of R/I) and 1+(2) (the odd integers, the multiplicative identity of R/I).

With these abstractions, we can say that many other homomorphic encryption schemes fall within the following framework. (Essentially, this abstract framework is explicit in Fellows' and Koblitz's description of Polly Cracker.)

KeyGen($\lambda$). Generates some representation of a finite ring R with an efficient '+' operation, and possibly an efficient '×' operation. It also fixes an ideal I of R. The plaintext space $\mathcal{P}$ is a set of distinguished representatives of R/I. The secret key is a function $f: R \to \mathcal{P}$ such that $f(r)$ is the distinguished representative of r+I. The public key pk includes the encoding of R and an algorithm Samp$_I$ to sample (efficiently) from I.

Encrypt(pk, $\pi$). Set $$i \xleftarrow{R} Samp_I(R)$$

and $\psi \leftarrow \pi+2$.

Decrypt(sk, $\psi$). Output $f(\psi)$.

Add($\psi_1, \psi_2$). Output $\psi_1 + \psi_2$.

Mult($\psi_1, \psi_2$). Output $\psi_1 \times \psi_2$.

For example, in Goldwasser-Micali, KeyGen generates a modulus N=pq for p=2p'+1 and q=2q'+1, and a number $x \in (\mathbb{Z}/N\mathbb{Z})^*$ whose Legendre symbols are $$\left(\frac{x}{p}\right) = \left(\frac{x}{q}\right) = -1.$$

In terms of the abstract framework, the underlying ring R is $\mathbb{Z}/(2p'q')$, which corresponds to the powers of x modulo N. The underlying ideal I is (2), the set of quadratic residues, even powers of x. The plaintext space is $\{0, 1\}$, represented as $\{x^0, x^1\}$. The function $f: R \to \mathcal{P}$ on input $r \in R$ (i.e., $x^r$) is given by outputting the distinguished representative of r+(2). Sampling from I is efficient. Also, the '+' operation is efficient, though the '×' operation is not; hence, the scheme is only additively homomorphic.

Remark 3.1. The abstract framework hides some issues regarding how plaintexts are represented. For example, as applied to Goldwasser-Micali, the framework would say plaintext space is $\{x^0, x^1\}$, versus the usual $\{0, 1\}$. For Goldwasser-Micali, this is fine since the encrypter can easily map the latter representation to the former. This is the case with the other schemes as well.

Remark 3.2. Of course, a lot of complexity is hidden in the function $f$. Goldwasser-Micali uses Legendre symbols. Paillier uses a more elaborate approach. Some schemes, such as Boneh-Goh-Nissim (described below) can use only a small (polynomial-sized) subset of the potential plaintext space because the function $f$ involves an otherwise infeasible computation—e.g., discrete logarithm.

It is easy to see that the abstract scheme is semantically secure assuming the following ideal membership problem is hard.

Definition 3.3 (Ideal Membership Problem (IMP)). According to a prescribed distribution, the challenger generates an encoding of R, an ideal I, and an algorithm Sampr that samples from I. It sets a bit $$b \xleftarrow{R} \{0, 1\}.$$

If b=0, it sets $$x \xleftarrow{R} Samp_I(R).$$

If b=1, it sets $$x \xleftarrow{R} R.$$

The problem is to guess b given (x, R, Samp$_I$)—i.e., essentially to decide whether or not x is a member of I.

Theorem 3.4. If there is an algorithm $\mathcal{A}$ that breaks the semantically security of the abstract scheme with advantage $\in$, then there is an algorithm $\mathcal{B}$ that solves the IMP with advantage $\in/2$.

Proof. Given instance (x, R, Sam$_I$) of IMP, $\mathcal{B}$ includes (R, Sam$_I$) in pk, which it sends to $\mathcal{A}$. $\mathcal{A}$ requests a challenge ciphertext on one of $\pi_0, \pi_1 \in \mathcal{P}$. $\mathcal{B}$ sets $$\beta \xleftarrow{R} \{0, 1\},$$

and sends the challenge
$\psi \leftarrow \pi_\beta + x$ to $\mathcal{A}$. $\mathcal{A}$ sends guess and $\beta'$, and $\mathcal{B}$ sends guess b'$\leftarrow\beta\oplus\beta'$ to the challenger.

If b=0, then $\mathcal{B}$'s simulation is perfect; in particular, the challenge is a valid encryption of $\pi_\beta$. In this case, $\mathcal{A}$ should guess $\beta$ with advantage $\in$, and thus b'=b with advantage $\in$. If b=1, x is random in R, and thus the challenge ciphertext is a random element of R, independent of $\beta$. In this case, $\beta'$ is independent of $\beta$, and so b' is independent of b, so that $\mathcal{B}$'s advantage is 0. Overall, $\mathcal{B}$'s advantage is $\in/2$.

Obviously, Goldwasser-Micali uses quadratic residuosity as its version of the IMP. Benaloh is similar to Goldwasser-Micali, but uses ideals of the form (m) for m≠2 where m divides $\varphi(N)$. In Paillier, the ring is $\mathbb{Z}/(p'q'N)$, the ideal is (N), and it is based on the N-th residuosity problem. Damgard-Jurik extends Paillier to the ring is $\mathbb{Z}/(p'q'N^k)$ and uses the ideal is ($N^k$). Okamoto-Uchiyama uses a modulus of the form $N=p^2q$, and uses the ring $\mathbb{Z}/(pp'q')$ and the ideal $\mathbb{Z}/(p)$.

The above schemes can all be said to be based on a subgroup (or subset) membership problem, since only one operation (namely addition, which is instantiated as group multiplication) is actually being used. Two schemes that make more use of the ring structure are Polly Cracker and Boneh-Goh-Nissim (BGN).

The Polly Cracker scheme was proposed by Fellows and Koblitz. They state essentially the abstract framework above and propose an instantiation of it using the polynomial ring $R=\mathbb{F}_q[x_1, \ldots, x_n]$. The ideal I is presented as a set of generating polynomials $\mathcal{P}=\{p_i(x_1, \ldots, x_n)\}$ having a common (secret) root $(a_1, \ldots, a_n)$; the ideal I is the set of all polynomials of the form $\Sigma p_i(x) \cdot r_i(x)$ for $r_i(x) \in R$. To sample from I, one uses the generators, though there is plenty of freedom here in setting the sampling distribution since R and I are infinite. The plaintext space is $\mathbb{F}_q$. The abstract function $f$ is instantiated as evaluation of the ciphertext polynomial at $(a_1, \ldots, a_n)$, a homomorphism whose kernel contains I.

The security of Polly Cracker in practice still seems to be an open question. Various efficient attacks have been proposed for various sets of parameters. (See R. Endsuleit, W. Geiselmann, and R. Steinwandt, "Attacking a polynomial-based cryptosystem: Polly Cracker" *Int. Jour. Information Security*, (1):143-148, 2002, and W. Geiselmann and R. Steinwandt, "Cryptanalysis of Polly Cracker", *IEEE Trans. Information Theory*, (48):2990-2991, 2002.) Roughly speaking, parameters for which the underlying IMP is not hard because it is possible to recover the common root using Groebner bases. Modified versions of Polly Cracker have been proposed by Levy-dit-Vehel and Perret, and also by Ly (see above), but also with attacks (see R. Steinwandt, "A ciphertext-only attack on Polly Two, 2006"). See F. Levy-dit-Vehel, M. G. Marinari, L. Perret, and C. Traverso, "A Survey On Polly Cracker Systems", for a survey of Polly Cracker cryptanalysis.

Ciphertext expansion in Polly Cracker is a serious problem. Add simply adds two ciphertext polynomials, and Mult multiplies them. In the worst-case, Mult operations are extremely expensive: the ciphertext length grows doubly-exponentially in the multiplicative depth of the circuit, since each Mult operation can square the number of monomials. Even with respect to the additive depth, the ciphertext size can grow exponentially. It is certainly conceivable that some incarnation of Polly Cracker could escape this deficiency and still be secure, but so far no such scheme is known.

BGN is a practical scheme that permits homomorphic evaluation of quadratic formulas—i.e., it allows one level of multiplication and an arbitrary number of additions. It is an interesting case because it uses multiple different representations of its underlying ring R. Specifically, KeyGen generates a modulus N=pq, two groups $\mathbb{G}, \mathbb{G}_1$ of order N with an efficiently computable non-degenerate bilinear map e: $\mathbb{G} \times \mathbb{G} \to \mathbb{G}_1$ (where typically $\mathbb{G}$ is an elliptic curve group and $\mathbb{G}_1$ is a multiplicative subgroup of a finite field), a generator g of $\mathbb{G}$, and an element $h=g^p$. In terms of the abstract framework, the underlying ring R is $\mathbb{Z}/(N)$, which is represented in the public key both by $(\mathbb{G}, g)$ and implicitly $((\mathbb{G}_1, e(g, g));$ we will call these the $\mathbb{G}$-representation and the $\mathbb{G}_1$-representation. The ideal I is (p), the p-residues; it can be sampled efficiently using h. Essentially, the underlying IMP is, given the representations of R, the map e, and the generator of I, to decide whether an element x∈R, given in $\mathbb{G}$-representation, is in I. (The BGN paper states its underlying hard problem in a different way, without the generator of I, that is equivalent up to a factor of 2 in the adversary's advantage.)

Adding two ciphertexts in BGN is done in the usual way, but the Mult operation is more interesting. Mult uses the pairing operation, meaning that it can only be applied to two ciphertexts in $\mathbb{G}$-representation, and the output has a $\mathbb{G}_1$-representation: i.e., for $\psi_1 \in \pi_1 + (p)$ and $\psi_2 \in \pi_2 + (p)$, Mult$(\psi_1, \psi_2) = \psi_1 \times \psi_2 \in \pi_1 \times \pi_2 + (p)$, but the latter ciphertext represents the ring element differently (in $\mathbb{G}_1$-representation); concretely, this multiplication in the exponent occurs by computing $e(g^x, g^y) \to e(g, g)^{xy}$. Since there is no known way to efficiently map from the $\mathbb{G}_1$-representation back to the $\mathbb{G}$-representation, the scheme is limited to one level of multiplication.

To decrypt a ciphertext $g^{\pi+tp}$ in $\mathbb{G}$ in BGN, the decrypter computes $(g^{\pi+tp})^q=g^{\pi q}$, and then $DL_{g^q} y(g^{\pi q})=\pi$; it decrypts ciphertexts in $\mathbb{G}_1$ similarly. For the discrete logarithm computation to be feasible, $\pi$ must be from a set of polynomial size—say, a polynomial-sized interval centered at 0. However, subject this constraint on the input ciphertexts $\{\psi_i\}$ from $\mathbb{G}$, the scheme can homomorphically compute arbitrary polynomial-sized quadratic formulas on $\{\psi_i\}$, and still be able to decrypt the result in polynomial time.

In principle, one can also squeeze ElGamal into the above framework. One can view R as $GL(2, \mathbb{F}_p)$, the general linear group of 2×2 matrices over $\mathbb{F}_p$, and an ideal $I_b \subset R$ as the subset of matrices whose second row is b times the first column. Basically, $I_b$ corresponds to the set of valid DDH tuples $(g, g^a, g^b, g^{ab})$ involving b. We can define addition in R as simply adding the matrices together entry-wise; $I_b$ is closed under addition. This operation is efficient even if matrix is represented "in the exponent," as in ElGamal, permitting the additive homomorphishm. Multiplication in R is right-multiplication; one can see that right-multiplying a term in $I_b$ with a term in R gives a term in $I_b$. However, obviously right-multiplication cannot be efficient if the Diffie-Hellman problem is hard.

Strictly speaking, however, since none of these schemes aside from Polly Cracker actually makes full use of the ring homomorphism, their dependence on an IMP may be more coincidental than essential. For example, one can modify BGN in a way that preserves the ability to evaluate quadratic formulas, while dispensing with the need to use a composite modulus N, and without using an ideal membership problem; instead, it is based on a "rank" problem similar to the linear assumption. On the other hand, this modification would become exponentially inefficient if extended to handle n-degree polynomials over ciphertexts with a hypothetical n-lin-

4 Bootstrappable Encryption

4.1 Leveled Fully Homomorphic Encryption from Bootstrappable Encryption, Generically Assume we have an encryption scheme $\epsilon$ that compactly evaluates some set of circuits $\mathcal{C}_\epsilon$. We want to use $\epsilon$ to construct a homomorphic encryption scheme that can handle arbitrary circuits. In this Section we prove a fundamental result: that if $\mathcal{C}_\epsilon$ contains (slight augmentations of) $\epsilon$'s own decryption circuit $D_\epsilon$—i.e., if $\epsilon$ "compactly evaluates" its (augmented) decryption circuit—then we can use $\epsilon$ to construct an efficient scheme that handles circuits of arbitrary depth.

A bit more specifically, for any integer d, we use $\epsilon$ to construct a scheme $\epsilon^{(d)}$ that can compactly evaluate circuits of depth up to d. The decryption circuit for $\epsilon^{(d)}$ is still $D_\epsilon$; the secret key and ciphertexts are the same size as in $\epsilon$. The public key in $\epsilon^{(d)}$ consists of d+1 public keys from $\epsilon$, together with a chain of encrypted $\epsilon$ secret keys—the first $\epsilon$ secret key encrypted under the second $\epsilon$ public key, and so on. In short, the family of schemes $\{\epsilon^{(d)}\}$ is leveled fully homomorphic. We base the semantic security of $\epsilon^{(d)}$ on that of $\epsilon$ using a hybrid argument; as usual with hybrid arguments, the reduction loses a factor linear in d. In Section 4.3, we describe how one can obtain a fully homomorphic encryption scheme (where the public key size does not depend on the maximum number of levels we want to evaluate) by assuming key-dependent-message (KDM) security, specifically circular-security—i.e., that one can safely encrypt a $\epsilon$ secret key under its associated public key.

Since this critical property of $\epsilon$—that it can compactly evaluate (slight augmentations of) its own decryption circuit—is self-referential and universal, we give it the obvious name: bootstrappability. Why should bootstrappability be such a powerful feature? At a high level, the reason is that bootstrappability allows us periodically to "refresh" ciphertexts associated to interior nodes in a circuit; we can refresh for an arbitrary number of levels in the circuit, and thus can evaluate circuits of arbitrary depth. To "refresh" a ciphertext that encrypts a plaintext $\pi$ under $\epsilon$ public key $pk_i$, we re-encrypt it under $pk_{i+1}$ and then homomorphically apply the decryption circuit to the result, using the secret key $sk_i$ that is encrypted under $pk_{i+1}$, thereby obtaining an encryption of $\pi$ under $pk_{i+1}$. Homomorphically evaluating the decryption circuit decrypts the inner ciphertext under $pk_i$, but within homomorphic encryption under $pk_{i+1}$. The implicit decryption "refreshes" the ciphertext, but the plaintext is never revealed; the plaintext is always covered by at least one layer of encryption. Now that the ciphertext is refreshed, we can "continue" correctly evaluating the circuit.

To see how this works mathematically, begin by considering the following algorithm, called Recrypt. For simplicity, suppose the plaintext space $\mathcal{P}$ is $\{0, 1\}$ and $D_\epsilon$ is a boolean circuit in $\mathcal{C}_\epsilon$. Let $(sk_1, pk_1)$ and $(sk_2, pk_2)$ be two $\epsilon$ key-pairs. Let $\phi_1$ be an encryption of $\pi \in \mathcal{P}$ under $pk_1$. Let $\overline{sk_{1j}}$ be an encryption of the j-th bit of the first secret key $sk_1$ under the second public key $pk_2$. Recrypt takes as these things as input, and outputs an encryption of $\pi$ under $pk_2$.

Recrypt($pk_2, D_\epsilon, \langle \overline{sk_{1j}} \rangle, \psi_1$).

Set $\overline{\psi_{1j}} \xleftarrow{R} \text{Encrypt}_\epsilon(pk_2, \psi_{1j})$ where $\psi_{1j}$ is the j-th bit of $\psi_1$
Set $\psi_2 \leftarrow \text{Evaluate}_\epsilon(pk_2, D_\epsilon, \langle \langle \overline{sk_{1j}} \rangle, \langle \overline{\psi_{1j}} \rangle \rangle)$
Output $\psi_2$ Above, the Evaluate algorithm takes in all of the bits of $sk_1$ and all of the bits of $\psi_1$, each encrypted under $pk_2$. Then, $\epsilon$ is used to evaluate the decryption circuit homomorphically. The output $\psi_2$ is thus an encryption under $pk_2$ of $\text{Decrypt}_\epsilon(sk_1, \psi_1) \to \pi$.

Remark 4.1. The Recrypt algorithm implies a proxy one-way re-encryption scheme. (See M. Blaze, G. Bleumer, and M. Strauss, "Divertible protocols and atomic proxy cryptography", *Eurocrypt '98*, LNCS 1403, pp. 127-144.) Roughly speaking, a one-way proxy re-encryption scheme allows the owner of $sk_1$ to generate a tag that enables an untrusted proxy to convert an encryption of $\pi$ under $pk_1$ to an encryption of $\pi$ under $pk_2$, but not the reverse. In our case, the tag is $\langle sk_{1j} \rangle$, the encrypted secret key. Strictly speaking, the security model for proxy re-encryption typically requires the security of the delegator's secret key, even against a collusion of delegatee's who also get to see the delegating tags. However, this requirement seems unnecessary, since a delegatee will be able to decrypt ciphertexts directed to the delegator anyway.

In the Recrypt algorithm above, the plaintext $\pi$ is doubly encrypted at one point—under both $pk_1$ and $pk_2$. Depending on the encryption scheme $\epsilon$, however, this double encryption might be overkill. Suppose $\text{WeakEncrypt}_\epsilon$ is an algorithm such that the image of $\text{WeakEncrypt}_\epsilon(pk, \pi)$ is always a subset of the image of $\text{Encrypt}_\epsilon(pk, \pi)$. Then we can replace the first step of $\text{Recrypt}_\epsilon$ with:
Set $$\overline{\psi_{1j}} \xleftarrow{R} \text{WeakEncrypt}_\epsilon(pk_2, \psi_{1j})$$

Set where $\psi_{1j}$ is the j-th bit of $\psi_1$
Let us call this relaxation $\text{Recrypt}'_\epsilon$. The main point of this relaxation is that WeakEncrypt does not need to be semantically secure for $\text{Recrypt}'_\epsilon$ to be a secure one-way proxy re-encryption scheme, or for $\text{Recrypt}'_\epsilon$ to be useful toward bootstrapping (as we will see below). Thus, depending on $\epsilon$, $\text{WeakEncrypt}_\epsilon$ can be very simple—e.g., for some schemes, and in particular for the ideal-lattice-based scheme that we describe later, $\text{WeakEncrypt}_\epsilon$ might leave the input "bits" entirely unmodified. This will unfortunately not help us much in terms of making the encryption scheme bootstrappable; essentially, it will add one circuit level to what $\epsilon$ can evaluate. However, it will affect the eventual computational complexity of our scheme, since it will require less computation to apply the decryption circuit homomorphically to ciphertexts in which the outer encryption is weak. Another way of viewing this relaxation is that we only need to be able to evaluate non-uniform decryption circuits, where the ciphertext is "hard-wired" into the circuit (making this circuit simpler than the "normal" decryption circuit that takes the ciphertext (and secret key) as input.

To be bootstrappable, $\epsilon$ needs to be able to compactly evaluate not only its decryption circuit, which merely allows recryptions of the same plaintext, but also slightly augmented versions of it, so that we can perform binary operations on plaintexts and make actual progress through a circuit.

Definition 4.2 (Augmented Decryption Circuit). Let $D_\epsilon$ be $\epsilon$'s decryption circuit, which takes a secret key and ciphertext as input, each formatted as an element of $\mathcal{P}^{l(\lambda)}$, where $\mathcal{P}$ is the plaintext space. Let $\Gamma$ be a set of gates with inputs and output in $\mathcal{P}$, which includes the trivial gate (input and output are the same). We call a circuit composed of multiple copies of $D_\epsilon$ connected by a single g gate (the number of copies equals the number of inputs to g) a "g-augmented decryption circuit." We denote the set of g-augmented decryption circuits, $g \in \Gamma$, by $D_\epsilon(\Gamma)$.

Definition 4.3 (Bootstrappable Encryption Scheme). As before, let $\mathcal{C}_\epsilon$ denote the set of circuits that $\epsilon$ can compactly evaluate. We say that $\epsilon$ is bootstrappable with respect to $\Gamma$ if $$D_\epsilon(\Gamma) \subseteq \mathcal{C}_\epsilon.$$

$\epsilon$ is simply bootstrappable if $\epsilon$ is bootstrappable with respect to $\Gamma$ for some complete set of gates $\Gamma$.

For example, if $\Gamma$ includes the trivial gate and NAND, $\epsilon$ is bootstrappable with respect to $\Gamma$ if $\mathcal{C}_\epsilon$ contains $D_\epsilon$ and the circuit formed by joining two copies of $D_\epsilon$ with a NAND gate. Remarkably, as we will show, if there is a scheme $\epsilon$ that can compactly evaluate only these two circuits, then there is a scheme that is leveled fully homomorphic.

Remark 4.4. We could relax the bootstrappability definition slightly to say that $\epsilon$ only needs to be able to homomorphically evaluate its (augmented) decryption circuit when the input ciphertext is weakly encrypted, similar to the relaxation Recrypt'$_\epsilon$ above. The reason that we did not state the definition this way is that it makes the definition of bootstrappable more cumbersome. Below, we will continue with the definition above, and remind the reader occasionally that the relaxation can be used. However, it will be understood that "bootstrappable" in the broader sense will include the case of when the input ciphertext is weakly encrypted.

From the informal description above, it should already be somewhat clear how to use a bootstrappable encryption scheme to construct a leveled fully homomorphic one; below, we give a more formal description. Let $\epsilon$ be bootstrappable with respect to a set of gates $\Gamma$. For any integer $d \geq 1$, we use $\epsilon$ to construct a scheme $\epsilon^{(d)} = (\text{KeyGen}_{\epsilon^{(d)}}, \text{Encrypt}_{\epsilon^{(d)}}, \text{Evaluate}_{\epsilon^{(d)}}, \text{Decrypt}_{\epsilon^{(d)}})$ that can handle all circuits of depth d with gates in F. Note that in the description below we encrypt the secret keys in reverse order; the only reason is that this ordering simplifies our description of the recursion in Evaluate. When we refer to the level of a wire in C, we mean the level of the gate for which the wire is an input. We use the notation $D_\epsilon(\Gamma, \delta)$ to refer to the set of circuits that equal a $\delta$-depth circuit with gates in $\Gamma$ augmented by $D_\epsilon$(copies of $D_\epsilon$ become inputs to the $\delta$-depth circuit).

KeyGen$_{\epsilon^{(d)}}(\lambda, d)$. Takes as input a security parameter $\lambda$ and a positive integer d. For $l = l(\lambda)$ as in Definition 4.2, it sets $$(sk_i, pk_i) \stackrel{R}{\leftarrow} KeyGen_\epsilon(\lambda) \quad \text{for } i \in [0, d]$$

$$sk_{ij} \stackrel{R}{\leftarrow} Encrypt_\epsilon(pk_{i-1}, sk_{ij}) \quad \text{for } i \in [1, d], j \in [1, l]$$

where $sk_{i1}, \ldots, sk_{il}$ is the representation of $sk_i$ as elements of $\mathcal{P}$. It outputs the secret key $sk^{(d)} \leftarrow sk_0$ and the public key $pk^{(d)} \leftarrow (\langle pk_i \rangle, \langle \overline{sk_{ij}} \rangle)$. Let $\epsilon^{(\delta)}$ refer to the sub-system that uses $sk^{(\delta)} \leftarrow sk_0$ and $pk^{(\delta)} \leftarrow (\langle pk_i \rangle_{i \in [0, \delta]}, \langle \overline{sk_{ij}} \rangle_{i \in [1, \delta]})$ for $\delta \leq d$.

Encrypt$_{\epsilon^{(d)}}(pk^{(d)}, \pi)$. Takes as input a public key $pk^{(d)}$ and a plaintext $\pi \in \mathcal{P}$. It outputs a ciphertext $$\psi \stackrel{R}{\leftarrow} Encrypt_\epsilon(pk_d, \pi).$$

Decrypt$_{\epsilon^{(d)}}(sk^{(d)}, \psi)$. Takes as input a secret key $sk^{(d)}$ and a ciphertext $\psi$ (which should be an encryption under $pk_0$). It outputs Decrypt$_\epsilon(sk_0, \psi)$.

Evaluate$_{\epsilon^{(\delta)}}(pk^{(\delta)}, C_\delta, \Psi_\delta)$. Takes as input a public key $pk^{(\delta)}$, a circuit $C_\delta$ of depth at most $\delta$ with gates in $\Gamma$, and a tuple of input ciphertexts $\Psi_\delta$ (where each input ciphertext should be under $pk_\delta$). We assume that each wire in $C_\delta$ connects gates at consecutive levels; if not, add trivial gates to make it so. If $\delta = 0$, it outputs $\Psi_0$ and terminates. Otherwise, it does the following:
  Sets $(C_{\delta-1}^\dagger, \Psi_{\delta-1}^\dagger) \leftarrow \text{Augment}_{\epsilon^{(\delta)}}(pk^{(\delta)}, C_\delta, \Psi_\delta)$.
  Sets $(C_{\delta-1}, \Psi_{\delta-1}) \leftarrow \text{Reduce}_{\epsilon^{(\delta-1)}}(pk^{(\delta-1)}, C_{\delta-1}, \Psi_{\delta-1})$.
  Runs Evaluate$_{\epsilon^{(\delta-1)}}(pk^{(\delta-1)}, C_{\delta-1}, \Psi_{\delta-1})$.

Augment$_{\epsilon^{(\delta)}}(pk^{(\delta)}, C_\delta, \Psi_\delta)$. Takes as input a public key $pk^{(\delta)}$, a circuit $\Psi_\delta$ of depth at most $\delta$ with gates in $\Gamma$, and a tuple of input ciphertexts $\Psi_\delta$ (where each input ciphertext should be under $pk_\delta$). It augments $C_\delta$ with $D_\epsilon$; call the resulting circuit $C_{\delta-1}^\dagger$. Let $\Psi_{\delta-1}^\dagger$ be the tuple of ciphertexts formed by replacing each input ciphertext $\psi \in \Psi_\delta$ by the tuple $\langle \langle \overline{sk_{\delta j}} \rangle, \langle \overline{\psi_j} \rangle \rangle$, where $\overline{\psi_j} \leftarrow \text{WeakEncrypt}_{\epsilon^{(\delta-1)}}(pk^{(\delta-1)}, \psi_j)$ and the $\psi_j$'s form the properly-formatted representation of $\psi$ as elements of $\mathcal{P}$. It outputs $(C_{\delta-1}^\dagger, \Psi_{\delta-1}^\dagger)$.

Reduce$_{\epsilon^{(\delta)}}(pk^{(\delta)}, C_\delta^\dagger, \Psi_\delta^\dagger)$. Takes as input a public key $pk^{(\delta)}$, a tuple of input ciphertexts $\Psi_\delta^\dagger$ (where each input ciphertext should be in the image of Encrypt$_{\epsilon^{(\delta)}}$), and a circuit $C_\delta^\dagger \in D_\epsilon(\Gamma, \delta+1)$. It sets $C_\delta$ to be the sub-circuit of $C_\delta^\dagger$ consisting of the first $\delta$ levels. It sets $\Psi_\delta$ to be the induced input ciphertexts of $C_\delta$, where the ciphertext $\psi_\delta^{(w)}$ associated to wire w at level $\delta$ is set to Evaluate$_\epsilon(pk_\delta, C_\delta^{(w)}, \Psi_\delta^{(w)})$, where $C_\delta^{(w)}$ is the sub-circuit of $C_\delta^\dagger$ with output wire w, and $\Psi^{\delta(w)}$ are the input ciphertexts for $C_\delta^{(w)}$. It outputs $(C_\delta, \Psi_\delta)$.

High-level review of the Evaluate algorithm. We are given a circuit $C_d$ of, say, d levels with gates in $\Gamma$. For each input wire w of $C_d$, there is an associated input ciphertext $\psi_w$ encrypted under $pk_d$. We are also given an encryption scheme $\epsilon$ that compactly evaluates circuits in $D_\epsilon(\Gamma)$.

Note that we have not assumed that $\epsilon$ can evaluate gates in $\Gamma$; we have only assumed it can evaluate gates in $\Gamma$ that are augmented by the decryption circuit. So, our first step is to augment $C_d$ by placing copies of $D_\epsilon$ at the leaves of $C_d$ (as in Augment), thereby constructing $C_{d-1}^\dagger$. Now, what are the input ciphertexts for our new circuit $C_{d-1}^\dagger$?

Reconsider the algorithm Recrypt'$_\epsilon$. In Recrypt'$_\epsilon$, we begin with a ciphertext $\psi_1$ encrypting $\pi$ under $pk_1$ for the single wire w, and an "empty" circuit $C_1$ (since Recrypt'$_\epsilon$ doesn't actually evaluate any gates, it just generates a new encryption of the same plaintext). Our next step was to augment $C_1$ with the decryption circuit $D_\epsilon$ to obtain $C_2 \leftarrow D_\epsilon$. The input ciphertexts $\Psi_2$ to $C_2$ included the encrypted secret key bits, and the weakly encrypted bits of $\psi_1$. We then showed that the ciphertext generated by $\psi_2 \leftarrow \text{Evaluate}_\epsilon(pk_2, C_2, \Psi_2)$, which is also associated to wire w, also encrypts $\pi$, but now under $pk_2$.

In the full scheme above, the ciphertexts that we associate to the decryption circuit that was attached to wire w are analogous to the ones we used in Recrypt'$_\epsilon$: the encrypted secret key ($sk_d$ under $pk_{d-1}$), and the re-encryption ciphertexts of $\psi_w$ under $pk_{d-1}$. By the correctness of Recrypt, the ciphertext now associated to w (after performing Evaluate$_\epsilon$) should encrypt the same plaintext as $\psi_w$, but now under $pk_{d-1}$.

The Reduce step simply performs this Evaluate up to the wire w, and one level beyond. We know that Evaluate can correctly continue one level beyond the wire w, because (by assumption) $\epsilon$ can evaluate not just the decryption circuit attached to w, but can evaluate a circuit containing one Γ-gate above w. Reduce outputs $C_{d-1}$ and ciphertexts associated to $C_{d-1}$'s input wires. We have made progress, since $C_{d-1}$ is one level shallower than $C_d$. We perform this entire process d−1 more times to obtain the final output ciphertexts.

Remark 4.5. Previously, we said that Evaluate takes as input ciphertexts that are "fresh" outputs of Encrypt. However, we note Evaluate$_{\epsilon^{(\delta)}}$ also operates correctly on ciphertexts output by Evaluate. (For δ<d above, this is precisely what Evaluate$_{\epsilon^{(\delta)}}$ does.)

4.2 Correctness, Computational Complexity and Security of the Generic Construction Here we state and prove some theorems regarding the generic construction. Regarding correctness, we have the following theorem.

Theorem 4.6. Let ε be bootstrappable with respect to a set of gates Γ. Then $\epsilon^{(d)}$ compactly evaluates all circuits of depth d with gates in Γ—i.e., if Γ is a universal set of gates, the family $\epsilon^{(d)}$ is leveled fully homomorphic.

Proof. (Theorem 4.6) First, we define a convenient notation: let D(δ, w, C, Ψ) denote the plaintext value for wire w in circuit C induced by the decryptions (under sk$_\delta$) of the ciphertexts Ψ associated to C's input wires. If C is empty (has no gates), then the input wires are the same as the output wires, and D(δ, w, C, Ψ) just denotes the decryption of the single ciphertext ψ∈Ψ associated to w. To prove correctness, it suffices to show that $$D(d, w_{out}, C_d, \Psi_d) = D(0, w_{out}, C_0, \Psi_0) \quad (1)$$

for every output wire $w_{out}$ of $C_0$ (at level 0).

First, when $(C_{\delta-1}^\dagger, \Psi_{\delta-1}^\dagger) \leftarrow \text{Augment}_{\epsilon^{(\delta)}}(pk^{(\delta)}, C_\delta, \Psi_\delta)$, we claim that $D(\delta, w, C_\delta, \Psi_\delta) = D(\delta-1, w, C_{\delta-1}^\dagger, \Psi_{\delta-1}^\dagger)$ for any wire w at level at most δ−1. This follows from the correctness of Recrypt (generalized beyond a boolean plaintext space and boolean circuits), and the fact that circuits $C_\delta$ and $C_{\delta-1}^\dagger$ are identical up to level δ−1.

Next, when $(C_\delta, \Psi_\delta) \leftarrow \text{Reduce}_{\epsilon^{(\delta)}}(pk^{(\delta)}, C_\delta^\dagger, \Psi_\delta^\dagger)$, we have $D(\delta, w, C_\delta^\dagger, \Psi_\delta^\dagger) = D(\delta, w, C_\delta, \Psi_\delta)$ for any wire at level at most δ. This follows from the correctness of Evaluate$_\epsilon$ over circuits in $D_\epsilon(\Gamma)$, and the fact that circuits $C_\delta^\dagger$ and $C_\delta$ are identical up to level δ.

From these two claims, Equation 1 follows.

Note that Γ is arbitrary. For example, each gate in Γ could be a circuit of (ANDs, ORs, NOTs) of depth m and fan-in 2; for this value of Γ, Theorem 4.6 implies the scheme correctly evaluates boolean circuits up to depth d·m.

We need to check that the computational complexity of Evaluate$_{\epsilon^{(d)}}$ is reasonable—e.g., that recursive applications of Augment do not increase the effective circuit size exponentially.

Theorem 4.7. For a circuit C of depth at most d and size s (defined here as the number of wires), the computational complexity of applying Evaluate$_{\epsilon^{(d)}}$ to C is dominated by at most s·l·d applications of WeakEncrypt$_\epsilon$ and at most s·d applications of Evaluate$_\epsilon$ to circuits in $D_\epsilon(\Gamma)$, where l is as in Definition 4.2.

Proof. (Theorem 4.7) There is a pre-processing step to ensure that all wires in the circuit connect gates at consecutive levels; clearly, this step increases the number of wires in the circuit by at most a multiplicative factor of d. It remains to prove that, for the pre-processed circuit, the computational complexity is dominated by at most s'·l applications of Encrypt and at most s' applications of Evaluate$_\epsilon$ to circuits in $D_\epsilon(\Gamma)$, where s' is the size of the pre-processed circuit.

The complexity of Augment$_{\epsilon^{(\delta)}}(pk^{(\delta)}, C_\delta, \Psi_\delta)$ is dominated by replacing each ciphertext ψ∈Ψ$_\delta$ by the ciphertexts $\langle \langle \overline{sk_{\delta j}} \rangle, \langle \overline{\psi_j} \rangle \rangle$; generating the $\langle \overline{\psi_j} \rangle$'s involves $|W_\delta|$·l applications of WeakEncrypt$_\epsilon$, where $W_\delta$ is the set of wires at level δ. Summing over all δ, there are at most s'·l applications of WeakEncrypt$_\epsilon$.

The complexity of Reduce$_{\epsilon^{(\delta)}}(pk^{(\delta)}, C_\delta^\dagger, \Psi_\delta^\dagger)$ is dominated by the evaluation of $C_\delta^{(w)}$ for each w∈$W_\delta$, which involves $|W_\delta|$ applications of Evaluate$_\epsilon$ to circuits in $D_\epsilon(\Gamma)$. Summing over all δ, there are at most s' such applications. The theorem follows.

Finally, assuming the semantic security of ε, we prove the semantic security of $\epsilon^{(d)}$.

Theorem 4.8. Let $\mathcal{A}$ be an algorithm that (t, ∈)-breaks the semantic security of $\epsilon^{(d)}$. Then, there is an algorithm $\mathcal{B}$ that (t', ∈')-breaks the semantic security of ε for t'≈t·l and ∈'≧∈/l(d+1), for l as in Definition 4.2.

Proof. (Theorem 4.8) Let $(\epsilon)^l$ be equivalent to ε, but with plaintext space $\mathcal{P}^{\leq l}$, where Encrypt$_{(\epsilon)^l}$ involves up to l invocations of ε and a concatenation of the results. We use a hybrid argument to show that $\mathcal{B}$ (t", ∈")-breaks the semantic security of $(\epsilon)^l$ for t"≈t and ∈"≧∈/(d+1), from which the result follows.

For k∈[0, d], let Game k denote a game against $\epsilon^{(d)}$ in which everything is exactly as in the real-world game, except that for all i∈[1, k] the challenger sets $$(sk'_i, pk'_i) \xleftarrow{R} KeyGen_\epsilon(\lambda) \text{ and } \overline{sk_{ij}} \xleftarrow{R} \text{Encrypt}_\epsilon(pk_{i-1}, sk'_{ij})$$

In other words, for i∈[1, k], $\overline{sk_{ij}}$ is the encryption (under $pk_{i-1}$) of the j-th bit of a random secret key sk'$_i$ unrelated to sk$_i$. Game d+1 is identical to Game d, except that the challenger ignores b and $(\pi_0, \pi_1)$, generates a random plaintext π of the appropriate length, and encrypts π to construct the challenge ciphertext. Let ∈$_k$ denote the adversary's advantage in Game k.

Since Game 0 is identical to the real world attack, the adversary's advantage is ∈ by assumption. Also, ∈$_{d+1}$=0, since the challenge is independent of b. Consequently, for some k∈[0, d], it must hold that |∈$_k$−∈$_{k+1}$|≧∈/(d+1); fix this value of k.

$\mathcal{B}$ uses $\mathcal{A}$ to break $(\epsilon)^l$ as follows. $\mathcal{B}$ receives from the challenger a public key pk. $\mathcal{B}$ generates the secret and public values exactly as in Game k, except that it replaces its original value of pk$_k$ with pk. Also, if k<d, it generates a dummy key pair $$(sk'_{k+1}, pk'_{k+1}) \xleftarrow{R} KeyGen_\epsilon(\lambda),$$

sets $\pi_0 \leftarrow sk_{k+1}$ and $\pi_1 \leftarrow sk'_{k+1}$, and requests a challenge ciphertext (under pk) encrypting either $\pi_0, \pi_1 \in \mathcal{P}^l$. The challenger generates $$\beta \xleftarrow{R} \{0, 1\}$$

and sends a tuple of ciphertexts $\langle \psi_j \rangle$ encrypting the bits $\langle \pi_{\beta j} \rangle$. $\mathcal{B}$ replaces its original tuple $\langle \overline{sk_{(k+1)j}} \rangle$ with the tuple $\langle \psi_j \rangle$. One can verify that the public values are generated exactly as in Game k+β. $\mathcal{B}$ sends the public values to $\mathcal{A}$.

Eventually, $\mathcal{A}$ requests a challenge ciphertext on $\pi_0$ or $\pi_1$. $\mathcal{B}$ sets $$b \xleftarrow{R} \{0, 1\}.$$

If k<d, $\mathcal{B}$ sends the values $$\psi_j \xleftarrow{R} \text{Encrypt}_\varepsilon(\text{pk}_d, \pi_{bj}).$$

If k=d, $\mathcal{B}$ generates random $$\pi \xleftarrow{R} p$$

and asks the challenger for a challenge ciphertext on $\pi_b$ or $\pi$. The challenger generates $$\beta \xleftarrow{R} \{0, 1\}$$

and encrypts $\pi_b$ or $\pi$ accordingly, and $\mathcal{B}$ forwards the challenge to $\mathcal{A}$. $\mathcal{A}$ sends a bit b'. $\mathcal{A}$ sends bit $\beta' \leftarrow b \oplus b'$ to the challenger. One can verify that the challenge is generated as in Game k+β.

Since $\mathcal{B}$'s simulation has the same distribution as Game k+β, and the probability that $\mathcal{B}$ outputs 0 is $\in_{k+\beta}$. The result follows.

4.3 Fully Homomorphic Encryption from KDM-Secure Bootstrappable Encryption

The length of the public key in $\epsilon^{(d)}$ is proportional to d (the depth of the circuits that can be evaluated). It would be preferable to have a construction $\epsilon^*$ where the public key size is completely independent of the circuit depth, a construction that is fully homomorphic rather than merely leveled fully homomorphic. Here is the obvious way to make the public key pk* of $\epsilon^*$ short: for $\epsilon$ key pair (sk, pk), pk* includes only pk and (the "bits" of) sk encrypted under pk. In other words, we have a cycle (in fact, a self-loop in this example) of encrypted secret keys rather than an acyclic chain. It is clear that $\epsilon^*$ is correct: the recursive algorithm Evaluate$_{\epsilon^*}$ works as before, except that the implicit recryptions generate "refreshed" ciphertexts under the same public key.

Why didn't we present this construction in the first place? Using an acyclic chain of encrypted secret keys allowed us to base the security of $\epsilon^{(d)}$ on $\epsilon$ using a hybrid argument; this hybrid argument breaks down when there is a cycle. In general, a semantically secure encryption scheme is not guaranteed to be KDM-secure—i.e., secure when the adversary can request the encryptions of key-dependent messages, such as the secret key itself. Typically, when we prove an encryption scheme semantically secure, there is not an obvious attack when the adversary is given the encryption of a key-dependent message. However, KDM-security is highly nontrivial to prove. The problem is precisely that the usual hybrid argument breaks down.

Remark 4.9. Canetti proposed the acyclic, leveled approach as a way to remove the need for KDM-security. Our initial approach had actually been to use $\epsilon^*$ (with the self-loop), and assume, or try to prove, KDM-security.

Let us review (a restriction of) the definition of KDM-security. We will say a scheme $\epsilon$ is KDM-secure if all polynomial-time adversaries $\mathcal{A}$ have negligible advantage in the following KDM-security game.

KDM-Security Game.

Setup(λ,n). The challenger sets $$(\text{sk}_i, \text{pk}_i) \xleftarrow{R} \text{KeyGen}(\lambda)$$

for $e \in [0, n-1]$ for integer $n = \text{poly}(\lambda)$. It chooses a random bit $$b \xleftarrow{R} \{0, 1\}.$$

If b=0, then for $i \in [0, n-1]$ and $j \in [1,l]$, it sets $$\overline{\text{sk}_{ij}} \xleftarrow{R} \text{Encrypt}_\varepsilon(\text{pk}_{(i-1) \bmod n}, \text{sk}_{ij}),$$

where $\text{sk}_{ij}$ is the jth "bit" of $\text{sk}_i$. If b=1, it generates the $\overline{\text{sk}_{ij}}$ values as encryptions of random secret keys, unrelated to $\text{pk}_0, \ldots, \text{pk}_{n-1}$. It sends the public keys and encrypted secret keys to $\mathcal{A}$.

Challenge and Guess. Basically as in the semantic security game.

This definition of KDM-security is a restriction of the general setting, where $\mathcal{A}$ can select multiple functions $f$, and request the encryption of $f(\text{sk}_0, \ldots, \text{sk}_{n-1})$. However, when $\epsilon$ is a bootstrappable encryption scheme, $\mathcal{A}$ can use the cycle of encrypted secret keys in our game to generate the encryption of $f(\text{sk}_0, \ldots, \text{sk}_{n-1})$ under any $\text{pk}_i$, as long as $f$ can be computed in polynomial time. Hence, we only need to consider our restricted setting. We have the following theorem.

Theorem 4.10. Suppose $\epsilon$ is KDM-secure and also bootstrappable with respect to a universal set of gates Γ. Then, $\epsilon^*$, obtained from $\epsilon$ as described above (with the self-loop), is semantically secure (and fully homomorphic).

The theorem is a straightforward consequence of the fact that, from any loop of public keys and encrypted secret keys that includes $(\text{pk}_0, \text{sk}_0)$, one can compute an encryption of $\text{sk}_0$ under $\text{pk}_0$. There does not seem to be any advantage in having pk* contain any cycle of encrypted secret keys other than a self-loop.

Absent proof of KDM-security in the plain model, one way to obtain fully homomorphic encryption from bootstrappable encryption is simply to assume that the underlying bootstrappable encryption scheme is also KDM-secure. This assumption, though unsatisfying, does not seem completely outlandish. While an encrypted secret key is very useful in a bootstrappable encryption scheme—indeed, one may view this as the essence of bootstrappability—we do not see any actual attack on a bootstrappable encryption scheme that provides a self-encrypted key.

4.4 Fully Homomorphic Encryption from Bootstrappable Encryption in the Random Oracle Model Above, we constructed a fully homomorphic encryption $\epsilon^*$ from a bootstrappable encryption scheme $\epsilon$ basically by adding a "self-loop"—a $\epsilon$ secret key sk encrypted under its corresponding public key pk—to the $\epsilon^*$ public key pk*. We showed that $\epsilon^*$ should inherit the semantic security of $\epsilon$, under the assumption that $\epsilon$ is KDM-secure—in particular, under the assumption that it is "safe" to reveal a direct encryption of a secret key under its own public key (as opposed to some possibly-less-revealing non-identity function of the secret key). Can we provide any evidence that $\epsilon^*$ is semantically secure without this assumption?

Here we provide some evidence in the random oracle model. First, given a leveled fully homomorphic scheme $\epsilon^{(d)}$ and a hash function, we define an intermediate scheme $\epsilon^{(d)\dagger}$. $\epsilon^{(d)\dagger}$ the same as $\epsilon^{(d)}$, except for the following. The public key includes a hash function H: $\mathcal{P}^h \to \mathcal{P}^l$. Also, in KeyGen, one generates $$r \xleftarrow{R} \mathcal{P}^{l'},$$

sets $$\overline{r_j} \xleftarrow{R} \text{Encrypt}_{\epsilon^{(d)}}(pk^{(d)}, r_j)$$

for $j \in [1, l']$, sets $\sigma \leftarrow H(r)^*, sk_0$, and includes $(\langle \overline{r_j} \rangle, \sigma)$ in the public key. (Assume *, is some invertible operation such that a* b would completely hide $b \in \mathcal{P}^l$ if $a \in \mathcal{P}^l$ were a one-time pad.) In other words, the $\epsilon^{(d)\dagger}$ public key includes some additional information: an encryption of the secret key $sk_0$, where the encryption uses a hash function that will be treated as a random oracle in the security analysis. Next, we prove the following theorems.

Theorem 4.11. If $\epsilon^{(d)}$ is semantically secure, then $\epsilon^{(d)\dagger}$ is semantically secure in the random oracle model.

Theorem 4.12. Suppose $\epsilon$ is leveled circuit-private (in addition to being bootstrappable) and let $\epsilon^{(d)\dagger}$ and $\epsilon^*$ be constructed from $\epsilon$ as described above. Then, if $\epsilon^{(d)\dagger}$ is semantically secure (in the plain model), and the circuit required to compute the hash function H and invert the * operation is at most d levels, then $\epsilon^*$ is semantically secure.

The result here should be quite surprising. The scheme $\epsilon^*$ does not even contain a hash function, and yet we are basically claiming that it is secure in the random oracle model! This is the first instance that we are aware of where one scheme is proven secure in the random oracle model, and then a second scheme's security is based on the first scheme, even though the second scheme does not use a hash function.

How is this possible? First, let us consider Theorem 4.11. This theorem basically just states the previously known result that it is easy to construct a KDM-secure encryption scheme in the random oracle model. This is because the random oracle allows the reduction to construct a "fake" ciphertext purportedly encrypting the secret key, such that the adversary finds out that it was fake only after it has queried the random oracle; this query gives the reduction all of the information that it needs to solve the underlying problem. In our particular case, $\epsilon^{(d)\dagger}$ has a loop among $(sk_0, pk_0), \ldots, (sk_d, pk_d)$, because $\epsilon^{(d)}$ reveals direct encryptions of $sk_i$ under $pk_{i-1}$ for $i \in [1, d]$, and $\epsilon^{(d)\dagger}$ also reveals an indirect encryption $(\langle \overline{r_j} \rangle, \sigma)$ of $sk_0$ under $pk_d$ ("indirect," because encryption in $\epsilon$ does not normally use a hash function). However, the reduction algorithm in the proof of Theorem 4.11 will construct a simply as a random string—i.e., it does not actually need to know anything about $sk_0$.

Theorem 4.12 is perhaps the more surprising result. But the result is actually a simple consequence of the fact that: given a correctly constructed $\epsilon^{(d)\dagger}$ public key, the reduction algorithm can generate an $\epsilon$-encryption of $sk_0$ under $pk_0$, as needed for the $\epsilon^*$ public key. How do we generate the latter ciphertext? The reduction algorithm is given $\langle \overline{r_j} \rangle$, an encryption of r under $pk_d$. It simply uses the leveled homomorphism and the circuit corresponding to the hash function H to compute a ciphertext that encrypts H(r) from the ciphertext that encrypts r. Then, given that ciphertext and the value of $\sigma = H(r)^* sk_0$, it computes a ciphertext that encrypts $sk_0$ in the natural way—i.e., directly, rather than with the hash function. We assumed that the hash function H and the * operation can be computed with a circuit of depth at most d; therefore, our leveled homomorphic scheme $\epsilon^{(d)}$ has enough levels to evaluate this circuit. Consequently, we obtain a "natural" encryption of $sk_0$ (i.e., under $\epsilon$) under some public key $pk_i$ for $i \geq 0$, and we can use Recrypt operations to obtain a natural encryption of $sk_0$ under $pk_0$. This ciphertext is an output of Evaluate$_\epsilon$, but circuit privacy guarantees that the ciphertext is distributed as if it were output directly by Encrypt$_\epsilon$.

Remark 4.13. Although one can view $(\langle \overline{r_j} \rangle, \sigma)$ as an "encryption" of $sk_0$, this "encryption" function is not the usual encryption function and it might have a very complex decryption circuit, much more complex than $D_\epsilon$. In particular, we cannot assume that its decryption circuit is in $\mathcal{C}_\epsilon$. This why we needed many (d) levels in the leveled scheme to recover $sk_0$, and could not immediately use a self-loop from the outset.

So, if $\epsilon^*$ is secure in the random oracle model despite not using a hash function, does that imply that it is secure in the plain model? Certainly not. The obstacle to this conclusion is obviously that random oracles cannot be instantiated in general. (See R. Canetti, O. Goldreich, and S. Halevi, "The random oracle methodology, revisited", in *Proc. of STOC '98*, pages 209-218, ACM, 1998.) A bit more specifically, however, the obstacle is that the proof of Theorem 4.12 depends crucially on the correctness of the ciphertext $(\langle \overline{r_j} \rangle, \sigma)$ in $\epsilon^{(d)\dagger}$ to construct (homomorphically) an encryption of $sk_0$ under $pk_0$ as needed for the $\epsilon^*$ public key; however, in the proof of Theorem 4.11 the ciphertext is not correct (except with negligible probability): the adversary finds out that it was fake only after it has queried r to the random oracle, giving the reduction all the information it needs.

Proof. (Theorem 4.11) Let $\mathcal{A}$ be an algorithm that attacks the semantic security of $\epsilon^{(d)\dagger}$; from $\mathcal{A}$, we construct an algorithm $\mathcal{B}$ that attacks the semantic security of $\epsilon^{(d)}$. $\mathcal{B}$ will actually request l'+1 challenge ciphertexts; thus, the reduction loses a factor of l'+1 under the usual hybrid argument.

The challenger gives $\mathcal{B}$ a $\epsilon^{(d)}$ public key. It also sets a bit $$b \xleftarrow{R} \{0, 1\}.$$

$\mathcal{B}$ selects two messages $r^{(0)}, r^{(1)} \in \mathcal{P}^h$ and sends them to the challenger. The challenger sets $$\Psi \xleftarrow{R} \{\text{Encrypt}(pk_d, r_j^{(b)}); j \in [1, l']\}$$

and sends back $\Psi$. The following is included in the public key that $\mathcal{B}$ sends to $\mathcal{A}$: the public key for $\epsilon^{(d)}$ sent by the challenger, the set of ciphertexts $\Psi$, and $$\sigma \xleftarrow{R} \mathcal{P}^l.$$

$\mathcal{A}$ requests a challenge ciphertext on one $\pi_0, \pi_1 \in \mathcal{P}$. $\mathcal{B}$ forwards the query to the challenger, who responds with a ciphertext encrypting $\pi_b$, which $\mathcal{B}$ forwards to $\mathcal{A}$.

Eventually, either $\mathcal{A}$ queries some $r' \in \{r^{(0)}, r^{(1)}\}$ to the random oracle, or $\mathcal{A}$ finishes with a guess b'. In the former case, $\mathcal{B}$ sets b' so that $r'=r^{(b')}$. In either case, $\mathcal{B}$ sends b' as its guess to the challenger.

Let p be the probability that $\mathcal{A}$ queries some $r' \in \{r^{(0)}, r^{(1)}\}$ to the random oracle. $\mathcal{B}$'s simulation appears perfect to $\mathcal{A}$ if it does not query some $r' \in \{r^{(0)}, r^{(1)}\}$; in this case, which occurs with probability 1−p, $\mathcal{A}$'s advantage is at least $\in$. Since $\mathcal{A}$'s view is independent of $r^{(1-b)}$, the probability that it queries $r^{(b)}$ to the random oracle is at least $p - q_H / |\mathcal{P}|^{l'}$, where $q_H$ is the number of random oracle queries make by $\mathcal{A}$. Overall $\mathcal{B}$'s advantage in guessing b' is at least $(1-p) \in + p - q_H / |\mathcal{P}|^{l'} \geq \in - q_H / |\mathcal{P}|^{l'}$.

Proof. (Theorem 4.12) The proof is essentially a simple consequence of the fact that, given a public key for $\epsilon^{(d)^\dagger}$, it is easy to generate the public key for $\epsilon^*$ homomorphically.

Let $\mathcal{A}$ be an algorithm that breaks the semantic security of $\epsilon^*$. We use $\mathcal{A}$ to construct an algorithm $\mathcal{B}$ that breaks the semantic security of $\epsilon^{(d)^\dagger}$.

$\mathcal{B}$ receives a $\epsilon^{(d)^\dagger}$ public key from the challenger. This public key consists of $\langle pk_i \rangle_{i \in [0, \in]}$, $\langle \overline{sk}_{ij} \rangle_{i \in [1, \delta]}$, $\langle \overline{r}_j \rangle_{j \in [1, l']}$, and $\sigma = H(r) * sk_0$. From $\langle \overline{r}_j \rangle$, $\mathcal{B}$ uses the homomorphism of $\epsilon^{(d)}$ to compute ciphertexts $\Psi$ that encrypt H(r). It encrypts $\sigma$, and then uses the homomorphism to recover to obtain an encryption of $sk_0$ from the encryptions of H(r) and $\sigma$ (inverting the * operation). By assumption, these homomorphic operations take at most d levels. If it takes only $\delta < d$ levels, and we obtain an encryption of $sk_0$ under $pk_{d-\delta}$, then we can perform Recrypt operations until we have the desired encryption of $sk_0$ under $pk_0$. By circuit privacy, this ciphertext is distributed properly. $\mathcal{B}$ includes the encryption of $sk_0$ under $pk_0$ as the encrypted secret key contained in the public key for $\epsilon^*$ that it provides to $\mathcal{A}$.

$\mathcal{A}$ requests a challenge ciphertext on one $\pi_0$, $\pi_1 \in \mathcal{P}$. $\mathcal{B}$ forwards the query to the challenger, who responds with a ciphertext encrypting $\pi_b$. $\mathcal{B}$ uses Recrypt operations to obtain an encryption of $\pi_b$ under $pk_0$ and forwards the result to $\mathcal{A}$. $\mathcal{A}$ sends a guess b', which $\mathcal{B}$ forwards to the challenger.

Clearly, $\mathcal{B}$'s advantage is the same as $\mathcal{A}$'s.

5 An Abstract Scheme Based on the Ideal Coset Problem

Our goal now is to construct a bootstrappable encryption scheme, a scheme that can homomorphically evaluate a rich set of circuits that includes its own decryption circuit, "plus some." In the past, attempts to construct fully homomorphic encryption have focused solely on maximizing the complexity of the circuits that the scheme can evaluate. Our notion of bootstrapability gives us a different way of attacking the problem—by minimizing the complexity of the scheme's decryption circuit.

Our strategy for minimizing the circuit complexity of decryption is to avoid schemes like RSA and Diffie-Hellman, where decryption uses a complex high-nonparallelizable exponentiation operation. Instead, we give an embodiment of our scheme that uses ideal lattices. Decryption in lattice-based cryptosystems is typically dominated by a simple operation, such as an easily parallelizable matrix-vector multiplication. We begin describing the ideal-lattice-based scheme in Section 7, after providing some basic background on ideal lattices in Section 6.

In this Section, we describe our strategy for maximizing the "evaluative capacity" of the scheme abstractly, without reference to lattices. Generally speaking, our exposition strategy throughout the paper is to defer technical lattice details for as long as possible. One reason is to make the presentation more modular, and therefore easier to understand. Another reason is that some of our techniques—e.g., bootstrapping, and using techniques from server-aided cryptography to "squash the decryption circuit"—are general and can apply to schemes that use different underlying mathematics—e.g., linear codes, or something less similar to lattices.

5.1 The Ideal Coset Problem

We saw in Section 3 that many previous homomorphic encryption schemes base security on some ideal membership problem (IMP). For example, in the "Polly Cracker" scheme by Fellows and Koblitz, the public key consists of some multivariate polynomials that generate the ideal I of polynomials having a common root x, and $\pi$ is encrypted by outputting a number $$\psi \xleftarrow{R} \pi + I.$$

One can easily see that this is semantically secure if it is hard to distinguish membership in I—in particular, deciding whether $\psi - \pi \in I$. Unfortunately, one can also see that homomorphic operations, especially multiplication, expand the ciphertext size potentially exponentially in the depth.

For our embodiment using lattices, we apparently need a different abstract approach, since it is easy to distinguish membership in a lattice L: given a basis B of L and $t \in \mathbb{R}^n$, one simply determines whether t mod B=0 mod B. Instead, we base security on an ideal coset problem (ICP), which we will state abstractly in terms of rings and ideals. Recall that a ring R is an algebraic object that is closed under addition '+' and multiplication '×' and additive inverse, with an additive identity '0' and multiplicative identity '1'. An ideal I of a ring R is a subset satisfying $a+b \in I$ and $r \times a \in I$ for all a, $b \in I$ and $r \in R$. The sum and product of two ideals I and J are, respectively, $\{i+j : i \in I, j \in J\}$ and the additive closure of $\{i \times j : i \in I, j \in J\}$. Two ideals I and J are relatively prime if I+J=R. For example, if R= $\mathbb{Z}$, the ideals (2) (the even integers) and (5) (the integers divisible by 5) are relatively prime: (2)+(5)=(1).

Now, the ideal coset problem (ICP) is as follows.

Definition 5.1 (Ideal Coset Problem (ICP)). Fix R, $B_I$, algorithm IdealGen, and an algorithm $Samp_1$ that efficiently samples R. The challenger sets $$b \xleftarrow{R} \{0, 1\}$$

and $$\left(B_J^{sk}, B_J^{pk}\right) \xleftarrow{R} IdealGen(R, B_I).$$

If b=0, it sets $$r \xleftarrow{R} Samp_1(R)$$

and $t \leftarrow r \bmod B_J^{pk}$. If b=1, it samples t uniformly from R mod $B_J^{pk}$. The problem: guess b given $(t, B_J^{pk})$.

Basically the ICP asks one to decide whether t is uniform modulo J, or whether it was chosen according to a known "dumpier" distribution induced by $Samp_1$. Of course, the ICP will be impossible if $Samp_1$ also samples uniformly modulo J, but the security of our encryption scheme will rely on the ICP being hard for a "dumpier" instantiation of $Samp_1$; the hardness of the problem depends on the particular instantiation of $Samp_1$. Note that it is possible for the ICP to be hard even when the IMP is easy.

5.2 An Abstract Scheme

We start by describing our initial attempt simply in terms of rings and ideals; we bring in ideal lattices later. In our initial scheme $\epsilon$, we use a fixed ring R that is set appropriately according to a security parameter $\lambda$. We also use a fixed basis $B_I$ of a ideal $I \subset R$, and an algorithm Idea $IGen(R, B_I)$ that outputs public and secret bases $B_J^{pk}$ and $B_J^{sk}$ of some (variable) ideal J, such that I+J=R—i.e., I and J are relatively prime. We assume that if $t \in R$ and $B_M$ is a basis for ideal $M \subset R$, then the value $t$ mod $B_M$ is unique and can be computed efficiently—i.e., the coset t+M has a unique, efficiently-computable "distinguished representative" with respect to the basis $B_M$. We use the notation R mod $B_M$ to denote the set of distinguished representatives of r+M over $r \in R$, with respect to the particular basis $B_M$ of M. We also use an algorithm $Samp(B_I, x)$ that samples from the coset x+I.

In the scheme, Evaluate takes as input a circuit C whose gates perform operations modulo $B_I$. For example, an $Add_{B_I}$ gate in C takes two terms in R mod $B_I$, and outputs a third term in R mod $B_I$, which equals the sum of the first two terms modulo I.

KeyGen(R, $B_I$). Takes as input a ring R and basis $B_I$ of I. It sets $$\left(B_J^{sk}, B_J^{pk}\right) \xleftarrow{R} IdealGen(R, B_I).$$

The plaintext space $\mathcal{P}$ is (a subset of) R mod $B_I$. The public key pk includes R, $B_I$, $B_J^{pk}$, and Samp. The secret key sk also includes $B_J^{sk}$.

Encrypt(pk,$\pi$). Takes as input the public key pk and plaintext $\pi \in \mathcal{P}$. It sets $\psi' \leftarrow Samp(B_I, \pi)$ and outputs $\psi \leftarrow \psi'$ mod $B_J^{pk}$.

Decrypt(sk,$\psi$). Takes as input the secret key sk and a ciphertext $\psi$. It outputs $$\pi \leftarrow (\psi \mod B_J^{sk}) \mod B_I$$

Evaluate(pk, C, $\Psi$). Takes as input the public key pk, a circuit C in some permitted set $\mathcal{C}_\epsilon$ of circuits composed of $Add_{B_I}$ and $Mult_{B_I}$ gates and a set of input ciphertexts $\Psi$. It invokes Add and Mult, given below, in the proper sequence to compute the output ciphertext $\psi$. (We will describe $\mathcal{C}_\epsilon$ when we consider correctness below. If desired, one could use different arithmetic gates.)

Add(pk, $\psi_1$, $\psi_2$). Outputs $\psi_1 + \psi_2$ mod $B_J^{pk}$.
Mult(pk, $\psi_1$, $\psi_2$). Outputs $\psi_1 \times \psi_2$ mod $B_J^{pk}$.

Remark 5.2. Concerning IdealGen, it is fine if the secret basis $B_J^{sk}$ defines a lattice $\mathcal{L}(B_J^{sk})$ for a (possibly fractional) ideal that contains J, rather than being exactly J.

Now, let us consider correctness, which is a highly nontrivial issue in this paper. The following definitions provide structure for our analysis.

To begin, we observe that the scheme is actually using two different circuits. First, Evaluate takes a mod-$B_I$ circuit C as input. This circuit is implicitly applied to plaintexts. Second, Evaluate applies a circuit related to C, which we call the generalized circuit, to the ciphertexts; this circuit uses the ring operations (not modulo I).

Definition 5.3 (Generalized Circuit). Let C be a mod-$B_I$ circuit. We say generalized circuit g(C) of C is the circuit formed by replacing C's $Add_{B_I}$ and $Mult_{B_I}$ operations with addition '+' and multiplication '×' in the ring R.

Here are a few more definitions relevant to Theorem 5.7 below, which concerns correctness.

Definition 5.4 ($X_{Enc}$ and $X_{Dec}$). Let $X_{Enc}$ be the image of Samp. Notice that all ciphertexts output by Encrypt are in $X_{Enc}$+J. Let $X_{Dec}$ equal R mod $B_J^{sk}$, the set of distinguished representatives of cosets of J wrt the secret basis $B_J^{sk}$.

Definition 5.5 (Permitted Circuits). Let $$\mathcal{C}_\epsilon' = \{C : \forall (x_1, \ldots, x_t) \in X_{Enc}^t, g(C)(x_1, \ldots, x_t) \in X_{Dec}\}$$

In other words, $\mathcal{C}_\epsilon'$ is the set of mod-$B_I$ circuits that, when generalized, the output is always in $X_{Dec}$ if the inputs are in $X_{Enc}$. (The value t will of course depend on C.) If $\mathcal{C}_\epsilon \subseteq \mathcal{C}_\epsilon'$, we say that $\mathcal{C}_\epsilon$ is a set of permitted circuits.

Definition 5.6 (Valid Ciphertext). $\psi$ is a valid ciphertext wrt $\epsilon$ public key pk and permitted circuits $\mathcal{C}_\epsilon$ if it equals Evaluate (pk, C, $\Psi$) for some $C \in \mathcal{C}_\epsilon$, where each $\psi \in \Psi$ is in the image of Encrypt. The circuit C may be the identity circuit, in which case the output of Evaluate is simply an output of Encrypt.

Finally, we prove correctness with respect to $\mathcal{C}_\epsilon$.

Theorem 5.7. Assume $\mathcal{C}_\epsilon$ is a set of permitted circuits containing the identity circuit. $\epsilon$ is correct for $\mathcal{C}_\epsilon$—i.e., Decrypt correctly decrypts valid ciphertexts.

Proof. For ciphertexts $\Psi = \{\psi_1, \ldots, \psi_t\}$, $\psi_k = \pi_k + i_k + j_k$, where $\pi_k \in \mathcal{P}$, $i_k \in I$, $j_k \in J$, and $\pi_k + i_k \in X_{Enc}$, we have $$Evaluate(pk, C, \Psi) = g(C)(\Psi) \mod B_J^{pk} \in g(C)$$
$$(\pi_1 + i_1, \ldots, \pi_t + i_t) + J$$

If $C \in \mathcal{C}_\epsilon$, we have $g(C)(X_{Enc}, \ldots, X_{Enc}) \in X_{Dec}$ and therefore $$Decrypt(sk, Evaluate(pk, C, \Psi)) = g(C)(\pi_1 + i_1, \ldots, \pi_t + i_t) \mod B_I$$
$$= g(C)(\pi_1, \ldots, \pi_t) \mod B_I$$
$$= C(\pi_1, \ldots, \pi_t)$$

as required.

The bottom line is that we have proven that $\epsilon$ is correct for permitted circuits, and our goal now is to maximize this set. The permitted circuits are defined somewhat indirectly; they are the circuits for which the "error" $g(C)(x_1, \ldots, x_t)$ of the output ciphertext is small (i.e., lies inside $X_{Dec}$) when the input ciphertexts are in the image of $Encrypt_\epsilon$. When we begin to instantiate the abstract scheme with lattices and give geometric interpretations of $X_{Enc}$ and $X_{Dec}$, the problem of maximizing $\mathcal{C}_\epsilon$ will have a geometric flavor.

Again, we note the rather confusing fact that C "automatically" reduces the result modulo $B_I$, since it uses mod-$B_I$ gates. It does not particularly matter how these mod-$B_I$ gates are implemented; in particular, it is more confusing than helpful to imagine a boolean implementation of these gates. Instead, one should just observe that the generalized circuit manages to lazily emulate these gates, reducing its output modulo $B_I$ at the end of the computation. C's mod-$B_I$ operations are never actually "implemented;" they only occur implicitly. Later, when we consider whether our scheme is bootstrappable, and analyze the depth of the decryption circuit in terms of mod-$B_I$ gates, it will again be tempting to consider how these gates are "implemented." But in fact these gates are "given" in the sense that they are emulated (without any intermediate reduction steps) by the usual ring operations.

5.3 Security of the Abstract Scheme

For the following abstract "instantiation" of Samp, and where I is a principle ideal generated by some $s \in R$ (and s is encoded in $B_I$), we provide a simple proof of semantic security based on the ICP.

Samp($B_I$,x). Run $$r \xleftarrow{R} Samp_1(R).$$

Output x+r×s.
Obviously, the output is in x+I since s∈I.
Theorem 5.8. Suppose that there is an algorithm $\mathcal{A}$ that breaks the semantic security of $\epsilon$ with advantage $\in$ when it uses Samp. Then, there is an algorithm $\mathcal{B}$, running in about the same time as $\mathcal{A}$, that solves the ICP with advantage $\in/2$. Proof. The challenger sends $\mathcal{B}$ a ICP instance (t, $B_f^{pk}$). $\mathcal{B}$ sets s, and sets the other components of pk in the obvious way using the ICP instance. When $\mathcal{A}$ requests a challenge ciphertext on one of $\pi_0, \pi_1 \in \mathcal{P}$, $\mathcal{B}$ sets a bit $$\beta \xleftarrow{R} \{0,1\}$$

and sends back $\psi \leftarrow \pi_\beta + t \times s \mod B_f^{pk}$. $\mathcal{A}$ sends back a guess $\beta'$, and $\mathcal{B}$ guesses $b' \leftarrow \beta \oplus \beta'$.

If b=0, we claim that $\mathcal{B}$'s simulation is perfect; in particular, the challenge ciphertext has the correct distribution. When b=0, we have that t=r+j, where r was chosen according to $Samp_1$ and j∈J. So, $\psi \leftarrow \pi_\beta + t \times s = \pi_\beta + r \times s \mod B_f^{pk}$; the ciphertext is thus well-formed. In this case $\mathcal{A}$ should have advantage $\in$, which translates into an advantage of $\in$ for $\mathcal{B}$.

If b=1, then t is uniformly random modulo J. Since the ideal I=(s) is relatively prime to J, t×s is uniformly random modulo J, and consequently ψ is a uniformly random element of R mod $B_f^{pk}$ that is independent of β. In this case $\mathcal{A}$'s advantage is 0. Overall, $\mathcal{B}$'s advantage is $\in/2$.

6 Background on Ideal Lattices I: The Basics

From the abstract construction in Section 5, among the objects that we need to make concrete are: the ring R, the ideals I and J, how to compute t mod $B_M$, the algorithms Samp and IdealGen, and a concrete version of the ICP. In this Section, we provide some basic background material needed to instantiate these things while using ideal lattices. Later, we will provide more background on ideal lattices as needed.

6.1 Basic Background on Lattices

Let $\mathbb{R}$ denote the real numbers, and $\mathbb{Z}$ the integers. We write vectors in column form using bold lower-case letters, e.g. v; We write matrices as bold capital letters, e.g., B; $b_i$ is the ith column. We use $\|v\|$ to denote the Euclidean length of a vector v. For matrix B, we use $\|B\|$ to denote the length of the longest column vector in B.

An n-dimensional lattice of rank k≤n is $$L = \mathcal{L}(B) = \{Bc: c \in \mathbb{Z}^k\}, B \in \mathbb{R}^{n \times k}$$

where the k columns $b_1, \ldots, b_k \in \mathbb{R}^n$ of the basis are linearly independent. All lattices in this paper are full rank—i.e., k=n. Usually lattices in this paper are sub-lattices of $\mathbb{Z}^n$—i.e., the lattice vectors have integer coefficients.

Every lattice has an infinite number of lattice bases. If $B_1$ and $B_2$ are two lattice bases of L, then there is some matrix U that is unimodular (i.e., U has integer entries and det(U)=±1) satisfying $B_1 \cdot U = B_2$. Since U is unimodular, $|\det(B_i)|$ is invariant for different bases of L. Since it is invariant, we may refer to det(L). This value is precisely the size of the quotient group $\mathbb{Z}^n/L$ if L is an integer lattice.

To basis B of lattice L we associate the half-open parallelepiped $\mathcal{P}(B) \leftarrow \{\Sigma_{i=1}^n x_i b_i : x_i \in [-½, ½)\}$. The volume of $\mathcal{P}(B)$ is precisely det(L).

Informally, we say that some bases of L are "good" and some are "bad;" a basis B of L is "good," roughly speaking, if the vectors of B are reasonably short and nearly orthogonal. Of course, for any basis $B = \{b_1, \ldots, b_n\}$, it must hold that $\Pi_{i=1}^n \|b_i\| \geq \det(L)$; roughly speaking, good bases come closer to reaching equality than bad ones.

For $t \in \mathbb{R}^n$, we use t mod B to denote the unique vector $t' \in \mathcal{P}(B)$ such that $t - t' \in L$. Given t and B, t mod B can be computed efficiently as $t - B \cdot \lfloor B^{-1} \cdot t \rceil$, where $\lfloor \cdot \rceil$ rounds the coefficients of a vector to the nearest integer. Let dist(L, t) denote $\min_{v \in L}\{\|t-v\|\}$. Clearly, for any basis B, ∥t mod B∥≥dist(L, t), though again (roughly speaking) "good" bases come closer to equality.

In some sense, the worst basis of a lattice L is its unique upper-triangular Hermite normal form HNF(L). Given any basis B of L, one can compute HNF(L) efficiently—i.e., in time poly(n, log ∥B∥). Thus, HNF(L) does not "reveal" more about L's structure than any other basis, making HNF(L) a good choice for the public lattice basis to be included in a public key. (See D. Micciancio, "Improving Lattice Based Cryptosystems Using the Hermite Normal Form", in *Proc. of CaLC '01*, LNCS 2146, pages 126-145, Springer, 2001.)

The dual lattice of L, denoted L*, is defined as $L^* = \{x \in \text{span}(L) : \forall v \in L, \langle x, v \rangle \in \mathbb{Z}\}$. It holds that det(L)·det(L*)=1. If B is a basis for the full-rank lattice L, then $(B^{-1})^T$ (the inverse transpose of B) is a basis of L*.

The ith successive minimum $\lambda_i(L)$ is the smallest radius r such that L contains at least i linearly independent vectors of norm at most r. In particular $\lambda_1(L)$ is the length of the shortest nonzero vector in L. A very good basis may have some of these very short vectors.

The two most well-known lattices problems are the shortest vector problem (SVP) and closest vector problem (CVP). Here are their approximate versions.

Definition 6.1 (γ(n)-Shortest Vector Problem (SVP)). Given a basis for a lattice L of dimension n, output a nonzero vector $v \in L$ of length at most $\gamma(n) \cdot \lambda_1(L)$.

Definition 6.2 (γ(n)-Closest Vector Problem (CVP)). Given a basis for a lattice L of dimension n and a vector $t \in \mathbb{R}^n$, output a nonzero vector $v \in L$ such that $\|t-v\| \leq \gamma(n) \cdot \text{dist}(L, t)$.

A close variant of the SVP is the shortest independent vector problem (SIVP), defined as follows.

Definition 6.3 (γ(n)-Shortest Independent Vector Problem (SIVP)). Like the SVP, except one outputs linearly independent $v_1, \ldots, v_n \in L$, all of length at most $\gamma(n) \cdot \lambda_n(L)$.

In a variant of the CVP, one is given the promise that the closest L-vector to t is much closer than any other—e.g., by a factor of γ(n).

Definition 6.4 (γ(n)-Bounded Distance Decoding Problem (BDDP)). Same as γ(n)-CVP, but with the promise that there is a unique solution—i.e., $(\gamma(n)+1) \cdot \text{dist}(L, t) < \lambda_1(L)$.

In other words, the BDDP is the CVP under the promise that t is very close to the lattice L, and that in fact the solution v is unique. The solution is unique, since if $\|t-v\| < \lambda_1(L)/(\gamma(n)+1)$, then $\|t-w\| \geq \|v-w\| - \|t-v\| > \lambda_1(L) \cdot \gamma(n)/(\gamma(n)+1) > \gamma(n) \cdot \text{dist}(L, t)$ for all $w \in L \setminus \{v\}$. This definition of the BDDP is non-standard, in the sense that in γ(n)-BDDP, γ(n) is typically defined to be an upper bound on the ratio $\text{dist}(L, t)/\lambda_1(L)$, whereas we prefer (essentially) to define it to be a lower-bound on $\lambda_1(L)/\text{dist}(L, t)$, since (in our formulation) the problem becomes easier as γ(n) becomes larger (as in γ(n)-SVP, γ(n)-CVP, and γ(n)-SIVP).

Aside from BDDP, the above problems are known to be NP-hard for very small approximation factors. For all of these problems, the best polynomial-time approximation algorithms are variants of the lattice reduction algorithm LLL by Lenstra et al. or Babai's nearest plane algorithm; these algorithms only work for essentially-exponential—e.g., $2^{o(n(\log \log n)/\log n)}$ approximation factors. (See M. Ajtai, R. Kumar, and D. Sivakumar, "A Sieve Algorithm for the Shortest Lattice Vector Problem", in *Proc. of STOC '01*, pages 601-610, 2001.) As a rough rule of thumb, approximating these lattice problems to within a factor of $2^k$ takes time about $2^{n/k}$, using known algorithms. See C. P. Schnorr, "A Hierarchy of Polynomial Time Lattice Basis Reduction Algorithms", *Theoretical Computer Science*, 53(2-3):201-224, 1987.)

6.2 Basic Background on Ideal Lattices

To our knowledge, the first use of ideal lattices in cryptography was the NTRU cryptosystem by Hoffstein et al.,[5] though NTRU's connection to lattices was made explicit later in cryptanalysis. (See J. Hoffstein, J. Pipher and J. Silverman, "NTRU: A Ring Based Public Key Cryptosystem", in *Proc. of ANTS '98*, LNCS 1423, pages 267-288.) None of this cryptanalysis has broken the core average-case problem underlying the scheme. NTRU's main selling point is efficiency; encryption and decryption very fast—much faster than RSA, for example—since the operations involved are simple (multiplications in the ring $Z[x]/(x^n-1)$ for small integer q), and since n can be reasonably small (several hundreds) since the best known lattice attacks on NTRU take time essentially exponential in n.

[5] Strictly speaking, NTRU's lattice has a 2n×2n basis, where each n×n quadrant generates an ideal lattice.

Recent cryptography involving ideal lattices is typically framed immediately with reference to Ajtai's worst-case/average-case connection. In these works, they have been used to construct, for example, hash functions and signature schemes. (See D. Micciancio, "Improved cryptographic hash functions with worst-case/average-case connection", in *Proc. of STOC '02*, pages 609-618, and C. Peikert and A. Rosen, "Efficient collision-resistant hashing from worst-case assumptions on cyclic lattices", in *Proc. of TCC '06*, pages 145166, and C. Peikert and A. Rosen, "Lattices that Admit Logarithmic Worst-Case to Average-Case Connection Factors", in *Proc. of STOC '07*, pages 478-487, and V. Lyubashevsky and D. Micciancio, "Generalized compact knapsacks are collision resistant", in *Proc. of ICALP '06*, and D. Micciancio, "Generalized compact knapsacks, cyclic lattices, and efficient one-way functions from worst-case complexity assumptions", in *Proc. of FOCS '02*, pages 356-365.)

Our construction will use the polynomial ring $R=Z[x]/(\theta(x))$, where $\theta(x)$ is a monic polynomial of degree n. We view an element $v \in R$ both as a ring element and as a vector—specifically, the coefficient vector $v \in Z^n$. The ideal (v) generated by v directly corresponds to the lattice generated by the column vectors $\{v_i \leftarrow v \times x^i \mod f(x): i \in [0, n-1]\}$; we call this the rotation basis of the ideal lattice (v). Specifically, any $w \in (v)$ is in the lattice generated by the rotation basis $\{v_i\}$, since there must be some a for which $w = v \times a$, and then $w = \Sigma_i a_i v_i$. Conversely, if w is in the lattice generated by $\{v_i\}$, then $w = \Sigma_i a_i v_i$ for some integers $\{a_i\}$, which implies that $w = v \times a$ in the ring R, where $a = \Sigma_i a_i x^i$. In general, the rotation basis for the product of two elements a, $b \in Q[x]/(f(x))$ is the rotation basis of a×b. Also the matrix-vector product of a rotation basis a with the vector b is the vector a×b.

Generally speaking, an ideal $I \subset R$ need not be principal—i.e., have a single generator—and a basis $B_I$ of I need not be a rotation basis. Suppose it is generated by v and w. In this case, the ideal is represented by the lattice generated by the columns $\{v_0, \ldots, v_{n-1}, w_0, \ldots, w_{n-1}\}$, where $w_i$ is the vector associated to $w \times x^i$. Of course, the vectors in this set will be linearly dependent. A lattice reduction algorithm, such as LLL, will find these dependencies and output a basis for the lattice associated to I that contains only linearly independent vectors.

Sometimes we will use inverses in the ring $Q[x]/(f(x))$. In this case, to avoid complications, we assume $f(x)$ is irreducible and therefore all nonzero terms have inverses. If I is an ideal in R, $I^{-1}$ is a fractional ideal. $I^{-1}$ is defined in a somewhat similar way as a dual lattice; it is the set $\{x \in Q[x]/(f(x)): \forall y \in I, x \times y \in R\}$. Aside from the fact that $I^{-1}$ is not necessarily a subset of R, it is exactly like a normal ideal—in particular, it is closed under addition and under multiplication with R-elements. We say that (possibly fractional) ideals I and J are relatively prime if $I+J \supset R$. For example, ideal (2/5) and (3/7) are relatively prime (contain (1)), but (3/5) and (3/7) are not, since (1) is not in (3/35).

For principal ideal (v), the fractional ideal $(v)^{-1}$ is generated by $1/v$, where the inverse is in $Q[x]/(f(x))$. The determinant associated to the ideal lattice for (v) (we may occasionally refer to this determinant as the norm of the ideal, denoted Nm(I)) is the inverse of the determinant of $(1/v)$. For an ideal I that has multiple generators $v_1, v_2, \ldots$, the fractional ideal $I^{-1}$ is the intersection of $(1/v_1), (1/v_2), \ldots$.

In our constructions, we will use a polynomial ring as defined above. Such rings are called monogenic number rings, or simple algebraic extensions, because they are isomorphic to $Z[\alpha]$ where $\alpha$ is a root of $f(x)$. Algorithmically, such rings are easy to work with, which will be important later for minimizing the complexity of our decryption circuit.

Algebraically, however, a more natural ring would be the ring of integers associated to a number field. A number field is a finite extension $K=Q(\alpha)$ of the rationals Q, isomorphic to $Q[x]/(f(x))$ for some polynomial $f(x)$ irreducible over Q for which $f(\alpha)=0$. The ring of integers of a number field K is:

$\mathcal{O}_K = \{x \in K: fQ^x \in Z[x]\}$, where $fQ^x$ is the (monic) minimal polynomial of x in $Q[x]$ While it may not be immediately obvious that $\mathcal{O}_K$ is even a ring, $\mathcal{O}_{Q(\alpha)}$ generally has better algebraic properties than $Z_{[\alpha]}$, most notably that every ideal I of the ring of integers factors uniquely as a product of prime ideals in the ring. Also, all ideals I of $\mathcal{O}_K$ are "invertible"—i.e., $I^{-1} \cdot I = \mathcal{O}_K$ when the inverse $I^{-1}$ is taken in $\mathcal{O}_K$; this is not necessary true in $Z[\alpha]$, where $I^{-1} \cdot I$ may be a subset of R if Nm(I) is divisible by one of a small number of singular primes whose squares divide the discriminant $\Delta(f)$ of $f(x)$. (See the survey on number rings by Stevenhagen.) Peikert and Rosen show that ideal lattices associated to the ring of integers in fields with very small root discriminant have very small worst-case/average-case connection factors, only logarithmic (versus polynomial) in n. While their approach is appealing, and most likely can be used in connection with our scheme, we choose instead to use $Z[\alpha]$ because using integer vectors permits us to push complicated details away from the decryption circuit, which is already quite complicated. Also, it is straightforward, though tedious, to simply avoid the singular primes when working with $Z[\alpha]$.

Since all of the hardness assumptions are with respect to a fixed ring R, one must choose it wisely. For example, a seemingly attractive choice for R is the ring $Z[x]/(x^n-1)$. Aside from efficiency, this choice in some sense maximizes the multiplicative depth of circuits that our scheme can evaluate, since one can bound the Euclidean length $\|u \times v\|$ by $\gamma_{Mult}(R) \cdot \|u\| \cdot \|v\|$ for $\gamma_{Mult}(R) = \sqrt{n}$; other rings have larger values of $\gamma_{Mult}(R)$. We note that the NTRU encryption scheme, whose core hard problem has never been broken, uses this ring (though it uses a lattice basis that consists of 4 quadrants, where each quadrant is a basis of an ideal lattice in R). On the other hand, although there is no known attack against ideal lattice problems in this ring that is completely fatal, there are some attacks that suggest that this ring may be weaker than others. One fairly obvious attack by Gentry (C. Gentry, "Key Recovery and Message Attacks on NTRU-Composite", *Eurocrypt* '01, LNCS 2045, pp. 182-194) works when n is composite; essentially, it reduces a lattice problem over $\mathbb{Z}[x]/(x^{cm}-1)$ to a much more tractable m-dimensional lattice problem over $\mathbb{Z}[x]/(x^m-1)$ for small constant c. Generally, one would prefer $f(x)$ to be irreducible. Even when n is prime, Gentry and Szydlo (C. Gentry and M. Szydlo, "Cryptanalysis of the Revised NTRU Signature Scheme", *Eurocrypt* '02, LNCS 2332, pages 299-320) gave an algorithm that can be adapted to take an n-dimensional basis of a principal ideal lattice I of $R=\mathbb{Z}[x]/(x^n-1)$, and construct a $(n+1)/2$-dimensional lattice basis that contains at least one nonzero I-vector of length at most $\sqrt{2} \cdot \lambda_1(I)$; if I has an orthonormal basis, their algorithm can find it in polynomial time. But again we mention that these attacks are not fatal for $\mathbb{Z}[x]/(x^n-1)$. If one simply takes n prime and (easily) avoids ideals with orthonormal bases, the Gentry-Szydlo attack only gives an attack whose running time is at best square root of the original time of attack, which is fine (in principle) if the original time of attack is super-polynomial.

6.3 Probability Background

A family H of hash functions from X to Y, both finite sets, is said to be 2-universal if $$Pr_{h \xleftarrow{R} \mathcal{H}}[h(x) = h(x')] = 1/|Y|$$

for all distinct x, x'∈X. A distribution D is ∈-uniform if its statistical distance from the uniform distribution is at most ∈, where the statistical difference between two distributions $$D_1, D_2 \text{ is } \frac{1}{2} \sum_{x \in X} |D_1(x) - D_2(x)|.$$

Lemma 6.5 (Leftover Hash Lemma). Let H be a family of 2-universal hash functions from X to Y. Suppose that $$h \xleftarrow{R} \mathcal{H}$$

and $$x \xleftarrow{R} X$$

are chosen uniformly and independently. Then, (h, h(x)) is $$\frac{1}{2}\sqrt{|Y|/|X|} - \text{uniform}$$

over H×Y.

7 A Somewhat Homomorphic Encryption Scheme 7.1 Why Lattices?

To bootstrap our new notion of bootstrappability, we ask a natural question: where do we find encryption schemes that have decryption algorithms with low circuit complexity?

We note that this is not an essential question. Conceivably, $\epsilon$ could be tailored so that it evaluates only its (augmented) decryption circuits $D_\epsilon(\Gamma)$, or very few gates outside of this small set, even though its decryption circuit is "complex". However, our approach will be to look for a scheme that evaluates circuits at least as complex as (e.g., in terms of depth) its (augmented) decryption circuit.

Under this approach, it does not make much sense to look at schemes based on factoring or variants of Diffie-Hellman, even though there are several homomorphic schemes here—RSA, Goldwasser-Micali, ElGamal, Paillier, Boneh-Goh-Nissim, etc. In all of these schemes, decryption uses some operation—exponentiation, Legendre symbol computation, pairing—that is not even known to have circuit complexity in NC. For these schemes, we can reduce the depth of the decryption circuit somewhat by using techniques like those described in Section 10, where we offload some decryption work onto the encrypter, who outputs a longer ciphertext that can be decrypted by a shallower circuit, but we do not see how to reduce the decryption depth enough to make these schemes bootstrappable.

On the other hand, for encryption schemes based on lattices or linear codes or even simple integers (see Craig Gentry and Shai Halevi, "Implementing Gentry's Fully Homomorphic Encryption Scheme", available at http://eprint.iacr.org/2010/520), the dominant decryption operation is typically an inner product or matrix-vector multiplication or division, which is in NC1 (assuming the bit-length of the coefficients are polynomial in the vector dimension).

7.2 Why Ideal Lattices?

To be bootstrappable, it is not enough that the scheme has a decryption circuit of low complexity; the scheme needs to be able to evaluate that circuit. We already have schemes that can evaluate circuits in NC1. In fact, unless one wants circuit privacy (as in Sanders-Young-Yung), "evaluating" circuits of logarithmic depth is completely trivial: one simply outputs the circuit and the "unprocessed" input ciphertexts. So, why is it not trivial to construct a bootstrappable encryption scheme from a lattice-based scheme that has a decryption circuit in NC1?

The problem with the trivial construction, and with SYY, is that they achieve logarithmic depth by permitting the ciphertext size to grow exponentially with the circuit depth. As the ciphertext grows, the decryption circuit must also grow to handle the larger ciphertexts. In short, as one allows larger and larger ciphertexts, the evaluation depth will never "catch up" to the depth of the decryption circuit. To obtain a bootstrappable encryption scheme, it seems necessary to consider encryption schemes that have more complex inherent homomorphisms.

As we will see, while general lattices offer an additive structure, ideal lattices also have a multiplicative structure that will enable us to evaluate deep arithmetic circuits (though we will need more tricks before we ultimately obtain a bootstrappable scheme). Hence, they are well-suited to help construct one embodiment of our bootstrappable encryption scheme.

7.3 A Geometric Approach to Maximizing the Circuit Depth that can be Evaluated In Section 5, where we described the abstract scheme, we saw that $\epsilon$ correctly evaluates circuit C if the generalized circuit g(C) satisfies $g(C)(x_1, \ldots, x_t) \in X_{Dec}$ for all $(x_1, \ldots, x_t) \in X_{Enc}^t$. For example, it correctly evaluates the gate $Add_{B_I}$ if $X_{Enc} + X_{Enc} \subset X_{Dec}$, and the gate $Mult_{B_I}$ if $X_{Enc} \times X_{Enc} \subset X_{Dec}$. Our hope is that applying these gates—indeed, even applying high-depth circuits—does not cause to much "expansion," so that the output of the generalized circuit remains within $X_{Dec}$.

An important reason that we use ideal lattices, versus ideals over general rings, is that lattices permit a clean analysis of $X_{Enc}$ and $X_{Dec}$ in terms of Euclidean length. When we implement the abstract scheme using a polynomial ring $\mathbb{Z}[x]/(f(x))$ and ideal lattices as summarized above, the sets $X_{Enc}$ and $X_{Dec}$ become subsets of $\mathbb{Z}^n$. We re-characterize these sets geometrically as follows.

Definition 7.1 ($r_{Enc}$ and $r_{Dec}$). Let $r_{Enc}$ be the smallest value such that $X_{Enc} \subset \mathcal{B}(r_{Enc})$, where $\mathcal{B}(r)$ is the ball of radius r. Let $r_{Dec}$ be the largest such that $X_{Dec} \supset \mathcal{B}(r_{Dec})$.

Now, let us define a set of permitted circuits $\mathcal{C}_\epsilon$ as follows:

$$\mathcal{C}_\epsilon = \{C : \forall (x_1, \ldots, x_t) \in \mathcal{B}(r_{Enc})^t, g(C)(x_1, \ldots, x_t) \in \mathcal{B}(r_{Dec})\}$$

$\mathcal{C}_\epsilon$ is defined like the maximal set $\mathcal{C}_\epsilon'$ of permitted circuits in Definition 5.5, but we have replaced $X_{Enc}$ and $X_{Dec}$ with $\mathcal{B}(r_{Enc})$ and $\mathcal{B}(r_{Dec})$. Clearly, $\mathcal{C}_\epsilon \subset \mathcal{C}_\epsilon'$. (At several points later in the paper, we narrow our set of permitted circuits again so as to enable a less complex decryption algorithm.)

For fixed values of $r_{Enc}$ and $r_{Dec}$, what is $\mathcal{C}_\epsilon$? This is a geometric problem, and we can bound the Euclidean length $\|g(C)(x_1, \ldots, x_t)\|$ by bounding the lengths of $\|u+v\|$ and $\|u \times v\|$ in terms of $\|u\|$ and $\|v\|$. For addition, this is easy: using the triangle inequality, we have $\|u+v\| \leq \|u\|+\|v\|$ for $u, v \in R$. For multiplication, we can prove that $\|u \times v\| \leq \gamma_{Mult}(R) \cdot \|u\| \cdot \|v\|$, where $\gamma_{Mult}(R)$ is some factor that is dependent only on the ring R.

The following theorem characterizes the "error expansion" that a circuit can cause based on the circuit's depth.

Theorem 7.2. Suppose $r_E \geq 1$ and that circuit C's additive fan-in is $\gamma_{Mult}(R)$, multiplicative fan-in is 2, and depth is at most $$\log \log r_D - \log \log(\gamma_{Mult}(R) \cdot r_E)$$

Then, $C(x_1, \ldots, x_t) \in \mathcal{B}(r_D)$ for all $x_1, \ldots, x_t \in \mathcal{B}(r_E)$.

In particular, $\epsilon$ correctly evaluates circuits of depth up to $\log \log r_{Dec} - \log \log(\gamma_{Mult}(R) \cdot r_{Enc})$.

Proof. For a d-depth circuit, let $r_i$ be an upper-bound on the Euclidean norm of the values at level i, given that $r_d = r_E$. By the triangle inequality, an addition (or subtraction) gate at level i outputs some $v \in R$ such that $\|v\| \leq \gamma_{Mult}(R) \cdot r_i$. A multiplication gate at level i outputs some $v \in R$ such that $\|v\| \leq \gamma_{Mult}(R) \cdot r_i^2$. In either case, $r_{i-1} \leq \gamma_{Mult}(R) \cdot r_i^2$, and thus $r_0 \leq (\gamma_{Mult}(R) \cdot r_E)^{2^d}$. The result follows.

An (oversimplified) bottom line from Theorem 7.2 is that, to maximize the depth of circuits that $\epsilon$ can correctly evaluate (see Theorem 5.7), we should minimize $\gamma_{Mult}(R)$ and $r_{Enc}$, and maximize $r_{Dec}$. Most of the remainder of this section consists of proposals toward this goal.

7.4 Instantiating the Ring: The Geometry of Polynomial Rings

From Theorem 7.2, it seems important to set $f(x)$ so that $R = \mathbb{Z}[x]/(f(x))$ has a reasonably small value of $\gamma_{Mult}(R)$. (Recall that $\gamma_{Mult}(R)$ is a value such that $\|u \times v\| \leq \gamma_{Mult}(R) \cdot \|u\| \times \|v\|$.) The following results show that there are many $f(x)$ for which the associated $\gamma_{Mult}(R)$ is only polynomial in n.

Theorem 7.3. Let $f(x)$ be a monic polynomial of degree n. Let $F(x) = x^n \cdot f(1/x)$ and $g(x) = F(x)^{-1} \mod x^{n-1}$. Then, $\|u \times v\| \leq \gamma_{Mult}(R) \cdot \|u\| \cdot \|v\|$ for some $$\gamma_{Mult}(R) \leq \sqrt{2n} \cdot (1 + 2n \cdot \|f\| \cdot \|g\|)$$

Proof. (Theorem 7.3) Let $t(x) \leftarrow u(x) \cdot v(x)$ be the (unreduced) degree $2n-2$ product of u and v. Let $t(x) = q(x)f(x) + r(x)$, where $r(x) = t(x) \mod f(x)$ is a polynomial of degree $n-1$, and $q(x)$ is a polynomial of degree $n-2$. We have $\|u \times v\| = \|r\|$, the latter term denoting the Euclidean norm of the vector formed by the coefficients of $r(x)$.

Note that each coefficient of $t(x)$, being an inner product of some subset of coefficients of u and v, must have norm less than $\|u\| \cdot \|v\|$; overall, $\|t\| \leq \sqrt{2n} \cdot \|u\| \cdot \|v\|$.

Let $T(x) = x^{2n-2} t(1/x)$, $Q(x) = x^{n-2} q(1/x)$, and $R(x) = x^{2n-2} r(1/x)$. Then, $T(x) = Q(x)F(x) + R(x)$, where T, Q, F are all integer polynomials with the same degrees and norms as t, q, f. R, which has the same norm as r, is divisible by $x^{n-1}$, implying that $Q(x) = T(x)g(x) \mod x^{n-1}$. Since $Q(x)$ has degree $n-2$, this equation implies $\|Q\| \leq \sqrt{2n} \cdot \|T\| \cdot \|g\|$. We have $$\|u \times v\| = \|r\| = \|R\| \leq \|T\| + \|Q \cdot F\| \leq$$
$$\|T\| + \sqrt{2n} \cdot \|Q\| \cdot \|F\| \leq$$
$$\|T\| + 2n \cdot \|T\| \cdot \|g\| \cdot \|F\|$$
$$= \|t\| \cdot (1 + 2n \cdot \|f\| \cdot \|g\|) \leq$$
$$\|u\| \cdot \|v\| \cdot \sqrt{2n} \cdot (1 + 2n \cdot \|f\| \cdot \|g\|)$$

as required.

To find a suitable ring $R = \mathbb{Z}[x]/(f(x))$ for which $\gamma_{Mult}(R)$ is small, it suffices to find an $f(x)$ for which both $F(x)$ and $F(x)^{-1} \mod x^{n-1}$ have small norms, where $F(x) = x^n \cdot f(1/x)$. This gives us a lot of freedom in choosing $f(x)$.

For example, we can sample $f(x)$ from the large class of polynomials such that $f(x)$ has small norm and $f(x) = x^n - h(x)$ where $h(x)$ is a polynomial of degree at most $(n+1)/2$. In this case, for $R = \mathbb{Z}[x]/(f(x))$, one can prove that $\gamma_{Mult}(R) \leq \sqrt{2n} \cdot (1 + 2n \cdot \|f\|^2)$. One can generalize this to the case that $h(x)$ has degree at most $n-(n-1)/k$ for $k > 2$.

Theorem 7.4. Suppose $f(x) = x^n - h(x)$ where $h(x)$ has degree at most $n-(n-1)/k$ for $k \geq 2$. Then, for $R = \mathbb{Z}[x]/(f(x))$, it holds that $\gamma_{Mult}(R) \leq \sqrt{2n} \cdot (1 + 2n \cdot (\sqrt{(k-1)n} \|f\|)^k)$.

Proof. Let $F(x) = x^n \cdot f(1/x) = 1 - x^n \cdot h(1/x)$. Let $H(x) = x^n \cdot h(1/x)$. Note that $H(x)$ is divisible by $x^m$ for integer $m \geq (n-1)/k$, since $h(x)$ has degree at most $n-(n-1)/k$. This fact implies that $1 - H(x)^k = 1 \mod x^{n-1}$. So, $g(x) \leftarrow F(x)^{-1} = 1/(1-(H(x))^k)/(1-H(x)) \mod x^{n-1}$, and we have:

$$\|g(x)\| \leq 1 + \|H\| + \ldots + \|H^{k-1}\|$$
$$\leq 1 + \|H\| + \ldots + ((k-1)n)^{(k-1)/2} \|H\|^{k-1}$$
$$\leq 1 + \|f\| + \ldots + ((k-1)n)^{(k-1)/2} \|f\|^{k-1}$$
$$\leq ((\sqrt{(k-1)n} \|f\|)^k - 1)/((\sqrt{(k-1)n} \|f\|) - 1)$$

Since $\|f\| < (\sqrt{(k-1)n} \|f\|) - 1$, we have $\gamma_{Mult}(R) \leq \sqrt{2n} \cdot (1 + 2n \cdot (\sqrt{(k-1)n} \|f\|)^k)$.

Undoubtedly there are suitable $f(x)$ that do not fall into the class of polynomials above. For example, let $a_1, \ldots, a_k$, $b_1, \ldots, b_k$ be polynomials, such that for each i, $a_i = x^{r_i} - 1$ and $b_i = (1 - x^{r_i s_i})/(1 - x^{r_i})$ for some $\{r_i\}, \{s_i\}$ where $r_i s_i \geq n-1$ and $r_i < n-1$. Then, for each i, $a_i b_i = 1 \mod x^{n-1}$ (nontrivially) and $\|a_i\|$ and $\|b_i\|$ are both quite small. We could set $F(x)$ and $g(x)$ by picking a random subset $S \subset \{1, \ldots, k\}$ and setting $F(x) \leftarrow \Pi_{i \in S} a_i \mod x^{n-1}$ and $g(x) \leftarrow \Pi_{i \in S} b_i \mod x^{n-1}$. The Euclidean norms of F and g would be rather small, since the Euclidean norms of the $a_i$'s and $b_i$'s were very small. This technique seems messier than the approach above; the point here is that the approach above is not the only approach.

A simple case is to set $f(x) \leftarrow x^n - 1$. For the ring $R = \mathbb{Z}[x]/(x^n-1)$, it is easy to show that $\gamma_{Mult}(R) \leq \sqrt{n}$.

Lemma 7.5. Suppose x, $y \in R = \mathbb{Z}[x]/(x^n-1)$, and let $z \leftarrow x \times y$. Then $\|z\| \leq \sqrt{n} \cdot \|x\| \cdot \|y\|$.

Proof. Consider the i-th coefficient $z_i$ of z; we have $$z_i = \sum_j x_j \cdot y_{i-j} \bmod n$$

In particular, since $z_i$ is an inner product of (rotated versions of) x and y, we have that $|z_i| \leq \|x\| \cdot \|y\|$ (for all i). The result follows.

However, such circulant ideal lattices come with the disclaimer, mentioned in Section 6.2, that there are non-fatal but somewhat disconcerting attacks on hard problems over this particular ring.

We also prefer $f(x)$ to be irreducible, so that $K = \mathbb{Q}(x)/(f(x))$ is a field. In this case, $\mathbb{Z}[x]/(f(x))$ inherits the nice properties of its overlying ring of integers $\mathcal{O}_K$, with some qualifications. (See Section 6.) Using irreducible $f(x)$ also seems to make R less vulnerable to cryptanalytic attacks. If desired, we can get many of the benefits of using $\mathbb{Z}[x]/(x^n-1)$ by instead using $\mathbb{Z}[x]/(f(x))$ for $f(x) = (x^n-1)/(x-1)$, which is irreducible when n is prime.

7.5 Instantiating Encrypt and Minimizing $r_{Enc}$

From Theorem 7.2, we would like to set $r_{Enc}$ to be as small as possible, consistent with security. Recall that $X_{Enc} \subset \mathcal{B}(r_{Enc})$ is the image of the Samp algorithm used in Encrypt, where our security proof (Theorem 5.8) holds when Samp($B_I$, x) runs $r \leftarrow \text{Samp}_1(R)$ and outputs x+r×s, where s is a generator of the ideal I. Let $l_{Samp_1}$ be an upper bound on the length of r, drawn according to $Samp_1$. We have $$r_{Enc} = \max\{\|x + r \times s\|\} \leq n \cdot \|B_I\| + \sqrt{n} \cdot l_{Samp_1} \cdot \|B_I\|$$

Toward minimizing $r_{Enc}$, we can choose s to be short—e.g., use $s = 2 \cdot e_1$.

The size of $l_{Samp_1}$ is a security issue. We need it to be large enough so that the min-entropy of t mod $B_J^{pk}$ in the ICP is large. As a concrete example, one could set $l_{Samp_1} = n$, and have $Samp_1$ sample a uniformly random integer vector in $\mathcal{B}(l_{Samp_1})$.

Overall, we can take $r_{Enc}$ to be polynomial in n. We note that, even in this case, the plaintext space may be as large as $[R:I] = \det(I)$, which can be exponential in n.

There are certainly alternative ways of generating I and instantiating Samp. For example, one may set s in such a way that the Hermite normal form of (s) has all 1's along the diagonal, except for the upper-left corner, which equals det (I). (This property of the Hermite normal form will always hold when det(I) is prime.) This gives a plaintext space isomorphic to $\mathbb{Z}_{\det(I)}$, which may be more useful than the space $\mathbb{Z}_2^n$ for some application. Also, the image of Samp is not necessarily very "nice"—e.g., it may not be "spherical," but may rather be distorted in a way that depends on the ring R. Later, we discuss a different way to instantiate Samp is using Gaussian distributions over lattices.

7.6 Instantiating Decrypt and Maximizing $r_{Dec}$

From Theorem 7.2, we would like to set $r_{Dec}$ to be as large as possible, consistent with security. Recall that $r_{Dec}$ is the radius of the largest sphere centered at 0 that is circumscribed by $B_J^{sk}$. Also, recall our decryption equation.

$$\pi = \psi - B_J^{sk} \cdot \lfloor (B_J^{sk})^{-1} \cdot \psi \rceil \bmod B_I$$

To maximize $r_{Dec}$, one strategy is simply to scale up the parallelepiped $B_J^{sk}$. But this does not really buy us anything. For a fixed ratio $r_{Dec}/r_{Enc}$, one can verify that our maximum depth (per Theorem 7.2) of $\log \log r_{Dec} - \log \log(\gamma_{Mult}(R) \cdot r_{Enc})$ decreases as we scale up $r_{Dec}$ and $r_{Enc}$ simultaneously. (If we scale up $r_{Dec}$ without scaling up $r_{Enc}$, this increases the approximation factor of the associated bounded distance decoding lattice problem, which hurts security. See Section 7.7.) The important property of $B_J^{sk}$ is its shape—i.e., we want the parallelepiped $\mathcal{P}(B_J^{sk})$ to be "fat" enough to contain a large sphere. This property is easier to formalize in terms of the inverse matrix $(B_J^{sk})^{-1}$, whose transpose is a basis (or independent set) of the dual lattice $\mathcal{L}(B_J^{sk})$.

Lemma 7.6. Let B be a lattice basis and $B^* = (B^{-1})^T$. Let r be the radius of the largest sphere, centered at 0, circumscribed by $\mathcal{P}(B)$ (permitting tangential overlap). Then, $r = 1/(2 \cdot \|B^*\|)$. In particular, $$r_{Dec} = 1/(2 \cdot \|((B_J^{sk})^{-1})^T\|)$$

Suppose $\|t\| < r_{Dec}$; then each coefficient of $B^{-1} \cdot t$ has magnitude at most ½.

Proof. Suppose $\|x\| < 1/(2 \cdot \|B^*\|)$. Each coefficient of $B^{-1} \cdot x$ is an inner product of x with a column vector of $B^*$, and therefore has magnitude at most $\|x\| \cdot \|B^*\| < ½$. This implies that $\lfloor B^{-1} \cdot x \rceil = 0$, that $x = (x \bmod B)$, and that $x \in \mathcal{P}(B)$. Now, suppose $\|x\| > 1/(2 \cdot \|B^*\|)$ and is parallel to the longest vector $b_i$ in $B^*$. Then, $|\langle b_i, x \rangle| > ½$, implying that $\lfloor B^{-1} \cdot x \rceil \neq 0$, and that $x \neq (x \bmod B)$, and that $x \notin \mathcal{P}(B)$.

The relevance of Lemma 7.6 is that the decryption equation above is correct when $\psi$ is at most $r_{Dec} = 1/(2 \cdot \|((B_J^{sk})^{-1})^T\|)$ away from a lattice point in J.

It is easy to imagine ad hoc ways of instantiating IdealGen so that the parallelepiped $\mathcal{P}(B_J^{sk})$ is "fat"—i.e., contains a sphere whose radius is only polynomially shorter than the parallelepiped's diameter. For example, one could generate a random vector v and simply set $B_J^{sk}$ to be the rotation basis of v, and set $B_J^{pk}$ to be the HNF of (v). Very roughly speaking, if v is generated as a vector that is very "nearly parallel" to $e_1$ (i.e., the vector $(1, 0, \ldots, 0)$), then the rotational basis will have $r_{Dec}$ within a small (polynomial) factor of $\lambda_1(J)$. More formally, we have the following lemma.

Lemma 7.7. Let $t \geq 4 \cdot n \cdot \gamma_{Mult}(R) \cdot s$. Suppose $v \in t \cdot e_1 + \mathcal{B}(s)$—i.e., v is in the ball of radius s centered at $t \cdot e_1$. Let B be the rotation basis of v. Then, $\mathcal{P}(B)$ circumscribes a ball of radius at least t/4.

Proof. For $i \in [0, n-1]$, let $v_i = v \times x^i$, and $z_i = v_i - t \cdot e_i$. We have that $|z_i| = \|z_0 \times x^i\| \leq \gamma_{Mult}(R) \cdot \|z_0\| \leq \gamma_{Mult}(R) \cdot s$. (In other words, we have that $v_i = t \cdot e_i + z_i$ is nearly parallel to $e_i$ when $\gamma_{Mult}(R) \cdot s$ is much smaller than t.)

For every point a on the surface of $\mathcal{P}(B)$, there is an i such that $$a = (\pm 1/2) \cdot v_i + \sum_{j \neq i} x_j \cdot v_j$$

for $x_i \in [-\frac{1}{2}, \frac{1}{2}]$. So, $$|(a,e_i)| \geq t/2 - n \cdot \gamma_{Mult}(R) \cdot s$$

In particular, $\|a\| \geq t/2 - n \cdot \gamma_{Mult}(R) \cdot s$ and the lemma follows.

7.7 Security of the Concrete Scheme

When instantiated with ideal lattices, the ideal coset problem (ICP) becomes the following problem.

Definition 7.8 ((Decision) Bounded Distance Decoding Problem (Decision BDDP) for Ideal Lattices). Fix a polynomial ring $R = \mathbb{Z}[x]/(f(x))$, algorithm IdealGen that samples a basis of an ideal in R, and an algorithm $Samp_1$, that efficiently samples $\mathbb{Z}^n$. The challenger sets $$b \xleftarrow{R} \{0, 1\}$$

and $$(B_J^{sk}, B_J^{pk}) \xleftarrow{R} IdealGen(R, B_I).$$

If b=0, it sets $$r \xleftarrow{R} Samp_1(R)$$

and $t \leftarrow r \bmod B_J^{pk}$. If b=1, it samples t uniformly from R mod $B_J^{pk}$. The problem: guess b given $(t, B_J^{pk})$.

In short, the problem is to decide whether t is uniform modulo the ideal lattice J, or whether t was sampled according to a known "dumpier" distribution induced by $Samp_1$.

Obviously, the hardness of decision BDDP depends crucially on $Samp_1$—i.e., decision BDDP is an average-case problem whose hardness depends on the (average-case) distribution of $Samp_1$. For example, if $Samp_1(R)$ always output the zero vector 0, or sampled according to some other distribution with very low min-entropy, the problem would be easy. However, based on current knowledge, it seems reasonable to believe the problem can be hard when $Samp_1$'s min-entropy is high—e.g., when r is sampled from a sphere of radius n, or when r is sampled according to a discrete n-dimensional Gaussian distribution with a standard deviation parameter $s = w(\sqrt{\log n})$. As a concrete example, let's suppose that r is sampled uniformly from a sphere of radius $1_{Samp_1} = n$.

The hardness of decision BDDP also depends on how J is generated—in particular, on the value $\lambda_1(J)$, and whether $\lambda_1(J)$ is much larger than $1_{Samp_1}$. In particular, if $\lambda_1(J)/1_{Samp_1} \geq 2^n$ (and we could replace the rhs with a slightly subexponential value), then Babai's nearest plane algorithm or variants of the lattice reduction algorithm LLL can be used to recover the closest J-vector to t in polynomial time. This attack breaks decision BDDP for these parameters, since it is a very safe bet that t was generated using $Samp_1$ when $dist(J, t) < 1_{Samp_1}$; if $dist(J, t) > 1_{Samp_1}$, it is a certain bet that t was generated uniformly. However, there are no known attacks when, for example, $\lambda_1(J) = 2^{O(\sqrt{n})}$ (and $1_{Samp_1}$ is as before).

Above, we suggested ways of instantiating the ring R, the algorithm Samp used in Encrypt, and the algorithm IdealGen used in KeyGen. Let's reconsider these suggestions, and revisit the sizes of $r_{Enc}$ and $r_{Dec}$, with a view to how they impact the hardness of the induced decision BDDP.

In Section 7.5, we observed that $r_{Enc}$ is at most $n \cdot \|B_I\| + \sqrt{n} \cdot 1_{Samp_1} \cdot \|B_I\|$, where $B_I$ can be chosen so that $\|B_I\|$ is polynomial in n (or even constant). In short, we can have $r_{Enc}$ only polynomially larger than $1_{Samp_1}$. In Section 7.6, we observed that one can instantiate IdealGen so that it outputs a secret basis $B_J^{sk}$ for J such that, if $r_{Dec}$ is the radius of the largest ball circumscribed by $\mathcal{P}(B_J^{sk})$, then $r_{Dec}$ is only polynomially smaller than $\lambda_1(J)$. Overall, we can make $r_{Dec}/r_{Enc}$ be within a polynomial factor of $\lambda_1(J)/1_{Samp_1}$, where the latter is essentially the approximation factor of our decision BDDP problem. As a rule of thumb, solving $2^k$-approximate decision BDDP takes time roughly $2^{n/k}$ using known attacks; so, $r_{Dec} = 2^{O(\sqrt{n})}$ and $r_{Enc} = poly(n)$ seems to be a reasonable setting of parameters. When $r_{Dec} = 2^{n^{c_1}}$ and $\gamma_{Mult}(R) \cdot r_{Enc} = 2^{n^{c_2}}$, then Theorems 5.7 and 7.2 imply that the scheme can correctly evaluate circuits of depth $(c_1 - c_2) \log n$.

Remark 7.9. Setting $r_{Dec}$ to be small permits a weaker assumption, but leads to a scheme that can evaluate only very shallow circuits. Let us suppose that $r_{Dec} = n^{\alpha(n)}$ and $\gamma_{Mult}(R) \cdot r_{Enc} = n^{\beta(n)}$ for some functions $\alpha(n)$, $\beta(n)$. As far as we know, for irreducible $f(x)$, $\gamma_{Mult}(R)$ must be at least polynomial in n, so $\beta(n)$ must be at least constant. In this case, the scheme can evaluate depth $\log \alpha(n) - \log \beta(n)$. This implies that we can only evaluate constant depth circuits, unless $r_{Dec}/r_{Enc}$ is super-polynomial. Though we omit details here, constant depth will be insufficient to make our eventual scheme bootstrappable; bootstrappability will require the BDDP approximation factor to be super-polynomial.

Again, one may question how hard the decision BDDP actually is for our ad hoc instantiation of IdealGen. In Section 6, we mentioned that Gentry and Szydlo have a polynomial-time attack on circulant ideal lattices that have orthonormal bases. This attack suggests that we may want to avoid principal ideal lattices with "nearly orthonormal" bases even in non-cyclotomic polynomial rings.

We stress that our analysis below regarding the decryption circuit does not rely on the ad hoc concrete suggestions in this section—e.g., the analysis does not require I or J to be principal ideals.

7.8 How Useful is the Somewhat Homomorphic Scheme By Itself?

The momentum of our paper is directed toward obtaining a bootstrappable, and hence a (leveled) fully homomorphic, encryption scheme. However, we pause briefly to consider how we can use our somewhat homomorphic scheme even if we do not try to bootstrap.

Theorem 7.2 tells us that we can evaluate circuits of depth $$\log \log r_{Dec} - \log \log(\gamma_{Mult}(R) \cdot r_{Enc})$$

even if the $Add_{B_I}$ gates have high fan-in (i.e., $\gamma_{Mult}(R)$ fan-in). We have seen above that we can take $r_{Dec}$ to be of the form $2^{n^c}$ for some constant $c < 1$, and $\gamma_{Mult}(R)$ and $r_{Enc}$ to be polynomial in n. In this case, we can evaluate logarithmic depth.

Already this is a significant improvement on prior work. For example, the Boneh-Goh-Nissim (BGN) pairing-based cryptosystem was the first to permit efficient evaluation of 2-DNF formulas, quadratic formulas that may have a polynomial number of monomials. Being able to compute quadratic formulas is extremely useful—e.g., Groth, Ostrovsky, and Sahai used their system to construct a perfectly NIZK system for general circuits, with length proportion to the size of the circuit. (See J. Groth, R. Ostrovsky, and A. Sahai, "Perfect Non-Interactive Zero Knowledge for NP", *Eurocrypt '06*, LNCS 4004, pp. 339-358.) However, one shortcoming of the BGN system is its small plaintext space—$\log \lambda$ bits for security parameter $\lambda$. Our somewhat homomorphic scheme, without the bootstrapping, already improves upon this, allowing both greater multiplicative depth in the circuit and a larger plaintext space.

As an example, we obtain the first single-database private information retrieval scheme with communication complexity $O(\lambda \cdot \log m)$, where $\lambda$ is the security parameter and m is bit-length of the database $s_1, \ldots, s_m$. The querier encrypts the binary representation $\pi_1, \ldots, \pi_M$ of the index that it wants, constructing the ciphertexts $\psi_1, \ldots, \psi_M$, where $M = \lfloor \log m \rfloor + 1$. Homomorphically, the server homomorphically evaluates the formula $$f(\pi_1, \ldots, \pi_M, s_1, \ldots, s_m) = \sum_{t \in [0,1]^M} s_t \cdot \prod_{j=1}^{M} (t_i - \pi_i + 1) \bmod 2$$

where, in $s_t$, t is interpreted as a number in [1, m]. Notice that this formula encrypts the correct entry in the database. Also, observe that if the ciphertexts $\psi_1, \ldots, \psi_M$ have offsets in $\mathcal{B}(r_{Enc})$, then the offset of the output is in $\mathcal{B}(r)$ for $r = O(m \cdot (\gamma_{Mult}(R) \cdot r_{Enc})^M) = O((2 \cdot \gamma_{Mult}(R) \cdot r_{Enc})^M)$. If one permits $r_{Dec} = 2^{\Theta(\sqrt{n})}$, then one can permit $M = \Theta(\sqrt{n}/\log(\gamma_{Mult}(R) \cdot r_{Enc}))$, which is polynomial in n. In other words, our scheme correctly evaluates the PIR formula even when the database is sub-exponential (super-polynomial) in size, though of course the computation would be very high in that case.

In general, when the function to be evaluated is highly parallel, the bootstrapping step may be unnecessary, permitting better efficiency.

Another example is returning an (encrypted) file that contains a particular keyword. Searching for such a file can roughly be broken down into two steps: searching within a single file to see if the keyword is present, and then aggregating the searching information across all of the files. The first step basically involves string matching. If the keyword k is represented as a bit string of t bits, one can compare each t-bit portion of the file with the keyword, trying to detect a match. One can compare two t-bit strings k and s as follows: compute $\Pi_{i=1}^{t}(1-k_i-s_i) \bmod 2$. If this quantity equals 1, then the strings are equal; otherwise, the quantity equals 0, and the strings are unequal.

However, there is a trick due to Smolensky that can detect a string match with high probability while using a mod-2 polynomial of lower degree (lower than degree t). To compute $OR(x_1, \ldots, x_t)$, where $x_i \in \{0, 1\}$, correctly with probability $1-(\frac{1}{2})^l$, the trick generates l bit-strings $(a_{j1}, \ldots, a_{jt})$ for $j \in [1, l]$, and outputs $1 - \Pi_{j=1}^{l}(1 + \Sigma_{i=1}^{t} a_{ji} \cdot x_i) \bmod 2$. If the $x_i$'s are all 0, then the terms $(1 + \Sigma_{i=1}^{t} a_{ji} \cdot x_i)$ all equal 1, and therefore the overall expression is 0. On the other hand, if at least one of the $x_i$'s equals 1, then the term $(1 + \Sigma_{i=1}^{t} a_{ji} \cdot x_i)$ is even with probability $\frac{1}{2}$, and consequently the overall expression is 1 with probability $1-(\frac{1}{2})^l$. In short, the trick computes the OR of a high number of terms using a polynomial having degree that is largely independent of the number of terms. Now, if the plaintext space of our somewhat homomorphic encryption scheme is modulo (2), we can use Smolensky's trick in the straightforward way to homomorphically compute an OR of many terms using a low-degree polynomial, a polynomial that our somewhat homomorphic encryption scheme can handle (whereas it may or may not be able to handle the high-degree version of OR). Observe that the negation of $OR(k_1 XORs_1, \ldots, k_t XORs_t)$ is 1 precisely when the strings match.

The second step of keyword search involves aggregating the search information across the files. If we simply want to detect whether the keyword was in one of the files, this involves another OR computation: simply take the OR of all of the respective bits indicating whether or not the bit was in the respective file. So, again, we can use Smolensky's trick to keep the polynomial degree down. Overall, we see that, by using Smolensky's trick, we only need our somewhat homomorphic encryption scheme (not a homomorphic encryption that can evaluate very high degree polynomials) to (homomorphically) detect whether a keyword (even if the keyword is long) is in a set of files (even if the set is long) with high probability. The Smolensky trick is applicable in many other settings, where we want to homomorphically evaluate a circuit that has high-fan-in ANDs or ORs.

8 Tweaks to the Somewhat Homomorphic Scheme

At this point, we have described our somewhat homomorphic scheme in enough detail to begin considering whether the scheme is bootstrappable. First, however, we describe two "tweaks" to the scheme. The purpose of these tweaks is to lower the eventual circuit complexity of decryption without substantially reducing the depth that the scheme can evaluate.

As the first tweak, we modify the secret key of our scheme so that the decryption equation simplifies from $$\pi = \psi - B_J^{sk} \cdot \lfloor (B_J^{sk})^{-1} \cdot \psi \rceil \bmod B_I$$

to $$\pi = \psi - \lfloor v_J^{sk} \times \psi \rceil \bmod B_I$$

where $v_J^{sk} \in J^{-1}$.

Before describing the tweak, it is helpful to understand the relationship between the dual of a lattice (a good basis for which was originally used as the decryption key) and the inverse of an ideal lattice (a vector from which is used as the decryption key in our revised decryption equation).

8.1 On the Relationship Between the Dual and the Inverse of an Ideal Lattice

Recall the definition of the dual of an ideal lattice J: $J^* = \{x \in \mathbb{R}^n : \forall v \in J, \langle x, v \rangle \in \mathbb{Z} \}$. The inverse in $R = \mathbb{Z}[x]/(f(x))$ of an ideal has a superficially similar definition: $J^{-1} = \{x \in \mathbb{Q}[x]/(f(x)) : \forall v \in J, x \times v \in \mathbb{R} \}$.

If $B_J$ happens to be a rotation basis of $J = (v)$, then the inverse $J^{-1} = (1/v)$ is generated by the rotation basis of $1/v$, the columns of $B_J^{-1}$. However, the dual of J is generated by the inverse transpose of $B_J$. So it is certainly not true in general that the ideal lattice associated to $J^{-1}$ is generated by the dual of the ideal lattice associated to J. However, for rotation bases, since the bases of the dual and the inverse are just transposes of each other, we have the following easy lemma, which is analogous to Lemma 7.6.

Lemma 8.1. Let B be a rotation basis and B* be its inverse transpose. Then, $\|B^*\| \cdot \sqrt{n} \geq \|B^{-1}\| \geq \|B^*\|/\sqrt{n}$. In particular, if $B_J^{sk}$ is a rotation basis, we have $1/(2\sqrt{n}\|(B_J^{sk})^{-1}\|) \leq r_{Dec} \leq \sqrt{n}/(2 \cdot \|(B_J^{sk})^{-1}\|)$.

Proof. Let $b_{ij}$ be the highest-magnitude coefficient in the matrix $B^{-1}$. Then, $$\|B^{-1}\| \geq b_{ij} \geq \|B^*\|/\sqrt{n} \text{ and } \|B^*\| \geq b_{ij} \geq \|B^{-1}\|/\sqrt{n}$$

Using Lemma 7.6, we have $$1/(2\sqrt{n} \cdot \|(B_J^{sk})^{-1}\|) \leq r_{Dec} \leq \sqrt{n}/(2 \cdot \|(B_J^{sk})^{-1}\|)$$

Can we provide a more precise characterization of this relationship between the dual and the inverse for general (non-principal) ideal lattices? For example, given a short vector in $J^{-1}$, can we find a short basis of $J^*$? Or, given a short vector in $J^*$, can we output a short basis of $J^{-1}$. The answer to both of these questions is yes.

Lemma 8.1 already answers the first question. Let $B_J$ be a basis of J, with column vectors $u_0, \ldots, u_{n-1}$. If v is a short vector in $J^{-1}$ and $B_v$ is its rotation basis, then $v \times u_i \in R$ for all i, and therefore $B_v \cdot B_J$ is an integer matrix. This implies that the rows of $B_v$ form an independent set in $J^*$. The longest row of $B_v$ cannot be much longer than the longest column, as in the proof of Lemma 7.6.

The second question—i.e., whether one can generate a short basis of $J^{-1}$ from a short vector in $J^*$ is more challenging, but we have the following lemma.

Lemma 8.2. Let $w \in J^*$, where $J^*$ is the dual of the ideal lattice J. Let $$v = \sum_{i=0}^{n-1} x^i \sum_{j=i+1}^{n} f_j \cdot w_{j-i-1}$$

Then, $v \in J^{-1}$. Let $B_v$ be the rotation basis of v. Then, $\|B_v\| \leq \sqrt{n} \cdot \|f\| \cdot \|w\|$. This applies even when J is a fractional ideal.

The idea of the proof is to take $w \in J^*$, place it as the bottom row in an n×n matrix, and then to try to fill out the rest of the matrix so that we end up with the rotation basis of a vector in $J^{-1}$. Together, the vector w and the polynomial $f(x)$ dictate what the rest of the matrix must be.

Proof. We claim that the bottom row of $B_v$ is $(w_0, w_1, \ldots, w_{n-1})$. In other words, in some sense, one can view $B_v$ as an "extension" of the single row $(w_0, w_1, \ldots, w_{n-1})$ into an entire matrix that happens to be a rotation basis.

Denote the columns of $B_v$ by $v^{(k)} = v \cdot x^i \mod f(x)$. We claim that $$v^{(k)} = \sum_{i=k}^{n-1} x^i \sum_{j=i+1}^{n} f_j \cdot w_{j-i-1+k} - \sum_{i=0}^{k-1} x_i \sum_{j=0}^{i} f_j \cdot w_{j-i-1+k}$$

from which it follows that the coefficient of $x^{n-1}$ in $v^{(k)}$ is indeed $w_k$. This is clearly true for $k=0$; assume it is true for $k'-1$. We have that $$v^{(k')} = x \left( \sum_{i=k'-1}^{n-1} x^i \sum_{j=i+1}^{n} f_j \cdot w_{j-i-1+k'-1} - \right.$$
$$\left. \sum_{i=0}^{k'-2} x^i \sum_{j=0}^{i} f_j \cdot w_{j-i-1+k'-1} \right) \mod f(x)$$

$$= \sum_{i=k'}^{n} x^i \sum_{j=i}^{n} f_j \cdot w_{j-i-1+k'} - \sum_{i=1}^{k'-1} x^i \sum_{j=0}^{i-1} f_j \cdot w_{j-i-1+k'} \mod f(x)$$

$$= \sum_{i=k'}^{n} x^i \sum_{j=i}^{n} f_j \cdot w_{j-i-1+k'} - \sum_{i=1}^{k'-1} x^i \sum_{j=0}^{i-1} f_j \cdot w_{j-i-1+k'} -$$
$$(f_n \cdot w_{k'-1}) \cdot f(x)$$

$$= \sum_{i=k'}^{n} x^i \sum_{j=i}^{n} f_j \cdot w_{j-i-1+k'} - \sum_{i=1}^{k'-1} x^i \sum_{j=0}^{i-1} f_j \cdot w_{j-i-1+k'} -$$
$$\sum_{i=0}^{n} x^i \cdot w_{k'-1} \cdot f_i$$

$$= \sum_{i=k'}^{n} x^i \left( -f_i \cdot w_{k'-1} + \sum_{j=i}^{n} f_j \cdot w_{j-i-1+k'} \right) -$$
$$\sum_{i=1}^{k'-1} x^i \left( f_i \cdot w_{k'-1} + \sum_{j=0}^{i-1} f_j \cdot w_{j-i-1+k'} \right) - w_{k'-1} \cdot f_i$$

$$= \sum_{i=k'}^{n} x^i \sum_{j=i+1}^{n} f_j \cdot w_{j-i-1+k'} - \sum_{i=1}^{k'-1} x^i \sum_{j=0}^{i} f_j \cdot w_{j-i-1+k'} - w_{k'-1} \cdot f_i$$

as required.

To show that $v \in J^{-1}$, it suffices to prove that $z \leftarrow v \times x \in R$ for any $x \in J$. Let $B_x$ and $B_z$ be the rotation bases of x and z. We know that $B_z = B_v \cdot B_x$. We also know that the bottom row of $B_z$ is an integer vector, since this row is $w \cdot B_x$ and w has an integer inner product with all vectors in J (which includes the column vectors of $B_x$).

Assume, toward a contradiction that z is not an integer vector—in particular, that $i^*$ is the largest such that the coefficient $z_{i^*}$ is not an integer. Consider $z^{(n-i^*-1)} \leftarrow x^{n-i^*-1} \cdot z \mod f(x)$, which is a column vector in $B_z$. In $x^{n-i^*-1} \cdot z$, the coefficients of $x^n$ through $x^{2n-i^*-2}$—all of the highest coefficients—are integers. Therefore, since $f(x)$ is monic, $z^{(n-i^*-1)} = x^{n-i^*-1} \cdot z - a(x) \cdot f(x)$, where $a(x)$ is an integer polynomial. On the other hand, the coefficient of $x^{n-1}$ in $x^{n-i^*-1} \cdot z$ is not an integer, since $z_{i^*}$ is not an integer. Consequently, since $z^{(n-i^*-1)}$ differs from $x^{n-i^*-1} \cdot z$ by an integer polynomial, the coefficient of $x^{n-1}$ in $z^{(n-i^*-1)}$ is also not an integer. But we have established that the bottom row of $B_z$ is integral, a contradiction. Therefore, z is in R and $v \in J^{-1}$.

Regarding $\|B_v\|$, we have established that each entry of this matrix is an inner product of two vectors—one vector with coefficients in $\{f_0, \ldots, f_n\}$, the other with coefficients in $\{w_0, \ldots, w_{n-1}\}$ (up to sign). The magnitude of each coefficient in $B_v$ is therefore at most $\|f\| \cdot \|w\|$, implying that $\|B_v\| \leq \sqrt{n} \cdot \|f\| \cdot \|w\|$.

8.2 Transference Lemmas for Ideal Lattices

As an easily corollary, we can obtain a bound on the determinant of $J^{-1}$ in terms of det(J), and also place a bound on $\lambda_n(J^{-1})$ in terms of $\lambda_n(J)$. Not all ideals are "invertible" in the sense that it is not always the case that $J^{-1} \cdot J = R$. But we bound the discrepancy in the following lemma.

Lemma 8.3. Let J be a (possibly fractional) ideal of $R = \mathbb{Z}[x]/(f(x))$. Then, $\lambda_n(J^{-1}) \leq \sqrt{n} \cdot \|f\| \cdot \lambda_1(J^*) \leq n \cdot \|f\|/\lambda_n(J)$. Also, $\det(J^{-1}) < n^n \cdot \|f\|^n/\det(J)$.

Proof. Let w be a vector in $J^*$ of length $\lambda_1(J^*)$. Generate $v \in J^{-1}$ from $w \in J^*$ as in Lemma 8.2, and let $B_v$ be its rotation basis. By Lemma 8.2, $\|B_v\| \leq \sqrt{n} \cdot \|f\| \cdot \|w\|$. By the transference theorem $\lambda_1(L) \cdot \lambda_n(L^*) \leq \sqrt{n}$ for general lattices, we have that $\|w\| \leq \sqrt{n}/\lambda_n(J)$ which implies the first statement. Since $\det(J^*) = 1/\det(J)$, $\|w\| \leq \sqrt{n}/\det(J)^{1/n}$ by Minkowski, we have $\det(B_v) \leq n^n \cdot \|f\|^n/\det(J)$.

Using Lemma 8.3, we can upper bound $\lambda_n(J)$ in terms of n, $|f|$ and det(J).

Lemma 8.4. Let J be an ideal of $R = \mathbb{Z}[x]/(f(x))$. Then, $\lambda_n(J) < n \cdot \|f\| \cdot \det(J)^{1/n}$.

Proof. We have $$\lambda_n(J) \leq n \cdot \|f\|/\lambda_n(J^{-1})$$

$$\leq n \cdot \|f\|/\det(J^{-1})^{1/n}$$

$$\leq n \cdot \|f\| \cdot \det(J)^{1/n} \quad \text{(by Lemma 8.3)}$$

We have a similar result regarding the product of two general ideals (not necessarily inverses of each other).

Lemma 8.5. Let J and K be two (possibly fractional) ideals of R. Then, $\lambda_n(JK) < n \cdot \|f\| \cdot (\det(J) \cdot \det(K))^{1/n}$. Also, $\det(JK) \leq n^n \cdot \|f\|^n \det(J) \cdot \det(K)$.

Proof. This would follow trivially from Lemma 8.4, except that it is possible that $\det(J \cdot K) > \det(J) \cdot \det(K)$ when J and K are divisible by singular primes.

By Lemma 8.3, we have that $$\lambda_n(JK) \leq \sqrt{n} \cdot \|f\| \cdot \lambda_1(((JK)^{-1})^*)$$

The determinant of the latter ideal is at most $\det(J) \cdot \det(K)$, since, in general, $\det(I_1 \cdot I_2) \geq \det(I_1) \cdot \det(I_2)$ and det(I) ·

$\det(I^{-1}) \geq 1$. So, by Minkowski, $\lambda_n(JK) < n \cdot \|f\| (\det(J) \cdot \det(K))^{1/n}$.

By Lemma 8.3, we have that $\det(JK) \cdot \det((JK)^{-1}) < n^n \cdot \|f\|^n$. So, we have $$n^n \cdot \|f\|^n \geq \det(JK) \cdot \det((JK)^{-1})$$
$$\geq \det(JK) \cdot \det(J^{-1}) \cdot \det(K^{-1})$$
$$\geq \det(JK) \cdot \det(J^*) \cdot \det(K^*)$$

from which the result follows.

8.3 Tweaking the Decryption Equation

Having characterized the relationship between the inverse and the dual, we return to our first tweak.

Tweak 1: From $B_I$ and secret key $B_J^{sk}$, compute a certain short $v_J^{sk} \in J^{-1}$ and redefine decryption to output $\pi = \psi - \lfloor v_J^{sk} \times \psi \rceil$ mod $B_I$. Also, redefine $\mathcal{C}_\epsilon$ so that it instead uses $\mathcal{B}(r_{Dec}/(n^{2.5} \cdot \|f\| \cdot \|B_I\|))$ instead of $\mathcal{B}(r_{Dec})$.

Purpose: To simplify the decryption equation and improve computational efficiency.

This tweak is not actually essential, since matrix-vector multiplication is just as parallelizable as ring multiplication—i.e., the circuits have essentially the same depth. However, the tweak reduces the size of our secret key. This will help reduce the computational complexity of decryption (and, thus, the computational complexity of the homomorphic decryption step in bootstrapping). Essentially, it makes the already shallow decryption circuit less wide.

Tweak 1 requires us to reduce the permitted distance of ciphertexts from the J-lattice. But it does not affect our maximum evaluation depth very much when $|f|$ and $\|B_I\|$ are only polynomial in n, and $r_{Dec}/r_{Enc}$ is super-polynomial (as it will need to be to make our scheme bootstrappable).

Toward understanding how this simplification works, suppose that it is the case that $B_J^{sk}$ is the rotation basis for some vector $w_J^{sk} \in \mathbb{Z}[x]/(f(x))$. Let $x_J^{sk} = 1/w_J^{sk} \in \mathbb{Q}[x]/(f(x))$. Then, since the rotation basis of $x_J^{sk}$ is precisely $(B_J^{sk})^{-1}$, and by properties of rotation bases we have that $$\pi = \psi - B_J^{sk} \cdot \lfloor (B_J^{sk})^{-1} \cdot \psi \rceil \bmod B_I = \psi - w_J^{sk} \times \lfloor x_J^{sk} \times \psi \rceil \bmod B_I$$

As for generating the initial $B_J^{sk}$ as a rotation basis, for now we just mention that the ad hoc instantiation of IdealGen given in Section 7.6 suffices. However, as the lemmas below establish, Tweak 1 works even when $B_J^{sk}$ is not a rotation basis.

Lemma 8.6. Let $B_J^{sk}$ be an initial secret basis that decrypts correctly for parameter $r_{Dec}$. From $B_J^{sk}$ and $B_I$, we can compute in polynomial time a vector $v_J^{sk} \in J^{-1}$ such that the rotation basis of $1/v_J^{sk}$ circumscribes a ball of radius at least $r_{Dec}/(n^{2.5} \cdot \|f\| \cdot \|B_I\|)$. In particular, if $\psi$ is a valid ciphertext according to Tweak 1, in the sense that it equals $\pi + i + j$ for plaintext $\pi$, $i \in I$, $j \in J$, and $\pi + i \in \mathcal{B}(r_{Dec}/(n^{2.5} \cdot \|f\| \cdot \|B_I\|))$, then $\pi = \psi - (v_J^{sk})^{-1} \times \lfloor v_J^{sk} \times \psi \rceil$ mod $B_I$. For our particular value of $v_J^{sk} \in J^{-1}$, it will also hold that $\pi = \psi - \lfloor v_J^{sk} \times \psi \rceil$ mod $B_I$.

Proof. Since $B_J^{sk}$ be an initial secret basis that decrypts correctly for parameter $r_{Dec}$, Lemma 7.6 tells us that $\|((B_J^{sk})^{-1})^T\| \leq 1/2r_{Dec}$. Let $w \in J^*$ be a vector in this basis. By Lemma 8.2, we can use $w$ to generate a vector $x \in J^{-1}$ whose rotation basis $B_x$ has length at most $\sqrt{n} \cdot \|f\| \cdot \|w\| \leq \sqrt{n} \cdot \|f\|/2r_{Dec}$. From $B_x$ and a vector in I of length at most $\|B_I\|$, we can generate an independent set $B_{J^{-1}I}$ of $(x) \cdot I \subset J^{-1}$ of length at most $\sqrt{n} \cdot \|B_x\| \cdot \|B_I\| \leq n \cdot \|f\| \cdot \|B_I\|/2r_{Dec}$. We set $v_J^{sk} \leftarrow e_1$ mod $B_{J^{-1}I}$. It has length at most $n^2 \cdot \|f\| \cdot \|B_I\|/2r_{Dec}$.

Let $B_J^\dagger$ be the rotation basis of $(v_J^{sk})^{-1}$; we want to prove that this basis can be used as the secret key for ciphertexts that are valid according to Tweak 1. Certainly $B_J^\dagger$ fulfills the requirement of generating a super-lattice of J, since $v_J^{sk}$ generates a sub-lattice of $J^{-1}$. It remains to show that a large enough sphere is circumscribed by $B_J^\dagger$. Let $r'_{Dec}$ be the radius of the largest such sphere. We have $$r'_{Dec} \geq 1/(2\sqrt{n} \cdot \|(B_J^\dagger)^{-1}\|) \geq r_{Dec}/(n_{2.5} \cdot \|f\| \cdot \|B_I\|)$$

where the first inequality follows from Lemma 8.1, and the second substitutes in the upper bound on the length of the rotation basis for $v_J^{sk}$. The correctness of decryption with the new key follows.

However, now we need to establish that we can simply drop the $(v_J^{sk})^{-1}$ term in the decryption equation. Since I and J are relatively prime, there is a vector $j \in J \cap (1 + I)$. Such a $j$ can be found efficiently using the Chinese remainder theorem and bases for I and J. Let $r = j \times v_J^{sk}$. Since $v_J^{sk} \in J^{-1}$, we have $r \in R$. In fact, since $v_J^{sk} \in 1 + J^{-1}I$, we have $r \in 1 + I$. Since, by the correctness of decryption, we know that $(v_J^{sk})^{-1} \times \lfloor v_J^{sk} \cdot \psi \rceil \in R$ (even though $v_J^{sk})^{-1}$ may not be in R, we have the following congruences modulo I:

$$(v_J^{sk})^{-1} \times \lfloor v_J^{sk} \cdot \psi \rceil = r \times (v_J^{sk})^{-1} \times \lfloor v_J^{sk} \cdot \psi \rceil$$
$$= j \times \lfloor v_J^{sk} \cdot \psi \rceil$$
$$= \lfloor v_J^{sk} \cdot \psi \rceil$$

8.4 A Tweak to Reduce the Circuit Complexity of the Rounding Step in Decryption Tweak 2 will actually be more critical than Tweak 1 for reducing the depth of our decryption circuit and enabling bootstrapping.

Tweak 2: Redefine the set of permitted circuits $\mathcal{C}_\epsilon$, replacing $\mathcal{B}(r_{Dec})$ with $\mathcal{B}(r_{Dec}/2)$.

Purpose: To ensure that ciphertext vectors are closer to the lattice J than they strictly need to be, so that we will need less "precision" to ensure the correctness of decryption.

Remark 8.7. If using Tweak 1 and Tweak 2, then use $\mathcal{B}(r_{Dec}/(2n^{2.5} \cdot \|f\| \cdot \|B_I\|))$ in the redefinition of permitted circuits—i.e., a radius half as small as the one used in Tweak 1. For simplicity, in this Subsection, we will abuse notation and use $r_{Dec}$ to refer to the value of the permitted radius before Tweak 2. The purpose of the tweak will become clearer as we delve into the details of the decryption circuit. But, briefly, recall that Decrypt computes $B_J^{sk1} \cdot \lfloor (B_J^{sk2})^{-1} \cdot \psi \rceil$. (If Tweak 1 is used, then $B_J^{sk1}$ is just the identity matrix and $(B_J^{sk2})^{-1}$ is the rotation basis of $v_J^{sk}$.) If we permitted the coefficients of $(B_J^{sk2})^{-1} \cdot \psi$ to be very close to half-integers, we would need high precision to ensure correct rounding. However, after Tweak 2, we have the following lemma:

Lemma 8.8. If $\psi$ is a valid ciphertext after Tweak 2, then each coefficient of $(B_J^{sk2})^{-1} \cdot \psi$ is within 1/4 of an integer.

Proof. Observe that $\psi \in \mathcal{B}(r_{Dec}/2) + J$. Let $\psi = x + j$ for $x \in \mathcal{B}(r_{Dec}/2)$ and $j \in J$. We have $(B_J^{sk})^{-1} \cdot \psi = (B_J^{sk})^{-1} \cdot x + (B_J^{sk})^{-1} \cdot j$, where the former term has coefficients of magnitude at most 1/4 by Lemma 7.6 and the latter is an integer vector.

This fact will help us simplify our decryption circuit, and does not substantially impair the evaluative capacity of our scheme. The new maximum evaluation depth, per Theorem 7.2, is $\log \log(r_{Dec}/2) \cdot \log \log(\gamma_{Mult}(R) \cdot r_{Enc})$, which is less than the original amount by only a subconstant additive factor.

Again, to use Tweaks 1 and 2 simultaneously, use $\mathcal{B}(r_{Dec}/(2n^{2.5} \cdot \|f\| \cdot \|B_I\|))$.

9 Decryption Complexity of the Tweaked Scheme

To decrypt, we compute $$(\psi - B_J^{sk1} \cdot \lfloor B_J^{sk2} \cdot \psi \rceil) \bmod B_I$$

where $\psi \in Z^n$, $B_J^{sk1} \in Z^{n \times n}$, $B_J^{sk2} \in Q^{n \times n}$, and $B_I$ is a basis of an ideal I of $R = Z[x]/(f(x))$. From Tweak 2, we have the promise that the coefficients of $B_J^{sk2} \cdot \psi$ are all within ¼ of an integer. Optionally, Tweak 1 ensures that $B_J^{sk1}$ is the identity matrix and $B_J^{sk2}$ is a rotation matrix. How do we optimally express this computation as a circuit?

Let us split the computation into pieces—in particular, the following steps:

Step 1: Generate n vectors $x_1, \ldots, x_n$ with sum $B_J^{sk2} \cdot \psi$.
Step 2: From the n vectors $x_1, \ldots, x_n$, generate integer vectors $y_1, \ldots, y_{n+1}$ with sum $\lfloor \Sigma x_i \rceil$.
Step 3: Compute $\pi \leftarrow \psi - B_J^{sk1} \cdot (\Sigma y_i) \bmod B_I$ We do not claim that this way of splitting up the computation leads to an optimal decryption circuit. But, we will eventually see that, thanks to Tweak 2, Step 3 can be done in constant depth using a circuit with polynomial fan-in addition gates. (In Theorem 7.2, we saw that constant fan-in multiplication gates were as bad as, or worse than, polynomial fan-in addition gates.) We will see that Step 2 requires a deep circuit, but that there is a way to squash this aspect of the computation. (See Section 10.) Step 1 could be done by multiplying the n columns of $B_J^{sk2}$ by the n coefficients of $\psi$. But our method for squashing the decryption circuit will eliminate Step 1. So, we will concentrate on analyzing the complexity of Steps 2 and 3 in this Section.

To better understand the circuit complexity issues here, consider the problem of adding n numbers in [0, 1), each one a fraction in [0, 1) represented in binary with k bits of precision. As far as we know, this requires a constant fan-in boolean circuit of depth $\Omega(\log n + \log k)$. Here is a concrete example of such a circuit. First, we use the "3-for-2" trick (see Karp's survey of parallel algorithms, R. Karp, "A Survey of Parallel Algorithms for Shared Memory Machines"): given 3 numbers in binary representation, there is a constant-depth (say, depth c) boolean circuit that replaces these 3 numbers with 2 numbers having the same sum. (Essentially, one of the two numbers receives the XOR of the 3 addends, and the other number receives the carry bits.) Using this trick recursively, one can replace n numbers with 2 numbers having the same sum in depth approximately $c \cdot \log_{3/2} n$. As for adding the final two numbers, there is certainly no general guarantee that this can be done in constant depth. The problem is that the least significant bit of the addends could affect the most significant bit of the sum. One needs $\Omega(\log k)$ depth to ensure the final sum is computed correctly.

But suppose one is given the promise that the sum of the numbers is very close to an integer, and that one is only interested in computing this integer. In this case, we can eliminate all but $O(\log n)$ bits of precision in each of the n addends, and still obtain the correct result. This integer can be computed in $c \log_{3/2} n + O(\log \log n)$ depth; there is no longer any dependence on k. Indeed, this was the purpose of Tweak 2—to obtain exactly this promise.

However, the $c \log_{3/2} n$ term is still problematic for us. We have seen that our somewhat homomorphic scheme can evaluate $O(\log n)$ depth, but where the hidden constant is less than 1, whereas the c induced by the 3-for-2 trick (combined with the constant $\log_{3/2} 2$) is certainly greater than 1, and thus prevents bootstrapping. Also, even after we apply our "squashing the decryption circuit" technique to make our scheme bootstrappable, a constant factor in the depth of the decryption circuit makes a huge difference in the performance and security of the scheme. Can we make this constant smaller?

Toward this goal, we compute the rounded sum using elementary symmetric polynomials. Roughly speaking, using symmetric polynomials eliminates some of the inefficiencies of the 3-for-2 technique. Also, although we have been saying (as shorthand) that we want to minimize the "depth" of the decryption circuit $D_\epsilon$, this is an oversimplification; we are actually trying to minimize $\|D_\epsilon(x_1, \ldots, x_t)\|$ where the inputs $x_i$ are in $\mathcal{B}(r_{Enc})$. The value $\|D_\epsilon(x_1, \ldots, x_t)\|$ is actually more tightly related to the degree of the multivariate polynomial $D_\epsilon(x_1, \ldots, x_t)$ than to the depth of the circuit that computes this polynomial. Elementary symmetric polynomials are the lowest-degree multivariate polynomials (that we know of) that compute certain Hamming weights that arise when computing the sum of numbers.

What do elementary symmetric polynomials have to do with adding up n numbers, represented in binary? Let $\{a_i\}$ be the n numbers, where $a_i$ has bits $(a_{i,-1}, \ldots, a_{i,-T})$. We can add up these numbers by separately adding up the least significant bits of the numbers, the penultimate bits, etc., and thereafter combining the partial results. That is, for $j \in [-1, -T]$, we compute the Hamming weight $b_j$, represented in binary, of $(a_{1,j}, \ldots, a_{n,j})$, and then we add up the T numbers $b_j$. (We established above that the precision T only needs to be logarithmic in n, so this final step should take up much less depth than computing the binary representations $b_j$ of the Hamming weights.) Now, it turns out, through the magic of binomial coefficients, that the binary representation of the Hamming weight of $(x_1, \ldots, x_n)$ is given by $$(e_{2^{\lfloor \log n \rfloor}}(x_1, \ldots, x_n) \bmod 2, \ldots, e_{2^0}(x_1, \ldots, x_n) \bmod 2)$$

where $e_i(x_1, \ldots, x_n)$ is the ith elementary symmetric polynomial over $x_1, \ldots, x_n$. The highest degree among these polynomials is at most n, versus the multivariate polynomial we would obtain from the 3-for-2 trick, which has degree $n^c$ for some $c > 1$. Also, we know how to efficiently evaluate the elementary symmetric polynomials. They are simply coefficients of the polynomial $p(z) = \Sigma_{i=1}^n (z - x_i)$.

We have been talking about the decryption circuit as if it is boolean. However, for bootstrapping to work—i.e., to be able to perform decryption homomorphically—we know that we need to express decryption as a mod-$B_I$ circuit. Of course, one option is simply to take $I = (2)$. (We hasten to add that the reduction given in Section 5 applies even for $I = (2)$.) In any case, it is easy to emulate boolean circuits using mod-$B_I$ circuits for any I. In particular, for $x, y \in \{0, 1\}$, the value $1 - x \times y$ equals $NAND(x, y) \in \{0, 1\}$, regardless of the ring of cosets in which the computation is performed. We restrict the plaintext space $\mathcal{P}$ to be $\{0, 1\} \bmod B_I$, and represent the inputs and output as elements of this restricted plaintext space, regardless of the underlying ideal I. Of course, this plaintext space restriction is unnecessary if we use the somewhat homomorphic scheme without bootstrapping.

Restricting the plaintext space to $\{0, 1\}$ rather than using all det(I) cosets of I, just so that we can emulate boolean circuits, seems rather wasteful and inefficient. Is this waste necessary? We leave this as an open problem to which we have not found a satisfactory solution. As far as we can tell, adding terms represented in general "base-I", where det(I) is large, results in "carries" that are represented by multivariate polynomials of degree too high for our purposes.

Now, we have the following lemma regarding Step 2.

Lemma 9.1. For $i \in [1, t]$, let $a_i = (\ldots, a_{i,1}, a_{i,0}, a_{i,-1}, \ldots)$ be a real number given in binary representation mod $B_I$ with the promise that $\Sigma_i a_i \bmod 1 \in [-¼, ¼]$. There is a mod-$B_I$ circuit C for generating t+1 integers $z_1, \ldots, z_{t+1}$ (also represented in binary) whose sum is $\lfloor \Sigma_i a_i \rceil$, such that if the generalized circuit g(C)'s inputs are in $\mathcal{B}(r_{in})$, then its outputs are in $\mathcal{B}(r_{out})$ for:

$$r_{out} \leq (\gamma_{Mult}(R) \cdot n \cdot \|B_I\| \cdot (1 + \gamma_{Mult}(R) \cdot r_{in})^t \cdot t)^{poly \, \log(t)}$$

For $\|B_I\| \leq r_{in}$, $t \leq n$, and $\gamma_{Mult}(R) = n^{\Omega(1)}$, we have:

$$r_{out} \leq (\gamma_{Mult}(R) \cdot r_{in})^{t \cdot poly \log(t)}$$

Proof. Let $a^*_i$ be the integer part of $a_i$ and let $a_i^\dagger = (a_{i,-1}, a_{i,-2}, \ldots)$ be the fractional part. Let $T = \lfloor \log t \rfloor + 2$. Let $b_i = (a_{i,-1}^\dagger, \ldots, a_{i,-T}^\dagger)$. First, we claim that $\lfloor \Sigma a_i^\dagger \rceil = \lfloor \Sigma b_i \rceil$ — i.e., that truncating the least significant bits of the $a_i^\dagger$'s does not affect the rounded sum. This claim follows from the promise that $\Sigma_i a_i^\dagger$ is within $\frac{1}{4}$ of an integer, and that $$\left| \sum_i a_i^\dagger - \sum_i b_i \right| = \left| \sum_i^{j \in [T+1, \infty]} 2^{-j} \cdot a_{i,-j} \right| < 1/4$$

The $t+1$ integers that we will eventually output will be $a^*_1, \ldots, a^*_t, \lfloor \Sigma b_i \rceil$.

Our strategy for computing $\lfloor \Sigma b_i \rceil$ is first to compute, for each $j \in [1, T]$, the binary representation $c_j$ of the Hamming weight of $(b_{1,-j}, \ldots, b_{t,-j})$. Then, we finish by computing the sum $\lfloor \Sigma_{j=1}^T 2^{-j} \cdot c_j \rceil$; this latter term is much easier to compute than the original term, since it only consists of $T$ numbers, rather than $t$.

This strategy is straightforward when $I = (2 \cdot e_1)$ and the plaintext space is $\{0, 1\}$ mod I. The binary representation of the Hamming weight of $(x_1, \ldots, x_t)$ is given by $$(e_{2^{\log t}}(x_1, \ldots, x_t) \bmod 2, \ldots, e_{2^0}(x_1, \ldots, x_t) \bmod 2)$$

where $e_i(x_1, \ldots, x_t)$ is the ith elementary symmetric polynomial over $x_1, \ldots, x_t$. These elementary symmetric polynomials can obviously be computed efficiently. Specifically, one obtains them as the coefficients of the polynomial $$p(z) = \prod_{i=1}^{t} (z - x_i).$$

The next step would be to bound $\|e_{2^k}(x_1, \ldots, x_t)\|$ for $x_i \in \mathcal{B}(r_{in})$, for $k \in \{0, \ldots, \lfloor \log t \rfloor\}$.

However, for $I \neq (2 \cdot e_1)$ the situation is complicated by the fact that reduction modulo 2 does not occur automatically in the mod-$B_I$ circuit. Here we use a slightly different approach (which also works when $I = (2 \cdot e_1)$). Let $M \in \mathbb{Z}^{(t+1) \times (t+1)}$ be given by $M_{ij} = \binom{i}{j}$ for $i, j \in [0, t]$. Let $M^{-1}$ be a matrix with elements in R mod I such that $M^{-1}$. M is the identity matrix modulo I; M is invertible modulo I, since $\det(M) = 1$. First, our circuit will compute $v \leftarrow (e_0(b_1, \ldots, b_t), \ldots, e_t(b_1, \ldots, b_t))^T$. Note that $M^{-1} \cdot v = e_h$, which is essentially the Hamming weight h of $(b_1, \ldots, b_t)$ in unary. From the unary, we obtain the binary expression by computing the inner product of $e_h$ with the multi-vector $(c_0, \ldots, c_h, \ldots, c_t)$, where $c_i$ is the binary representation of i.

Let C be the mod-$B_I$ sub-circuit above for computing any bit of the binary representation of the Hamming weight. Using $n \cdot \|B_I\|$ as an upper bound on the length of elements in R mod $B_I$, we have $$\|g(C)(x_1, \ldots, x_t)\| \leq \gamma_{Mult}(R) \cdot n \cdot \|B_I\| \cdot \left( \sum_{i \in [0,t]} \|e_i(x_1, \ldots, x_t)\| \right) \cdot t \leq$$

$$\gamma_{Mult}(R) \cdot n \cdot \|B_I\| \cdot \left( \sum_{i \in [0,t]} \binom{t}{i} \gamma_{Mult}(R)^{i-1} \cdot r_{in}^i \right) \cdot t =$$

$$n \cdot \|B_I\| \cdot (1 + \gamma_{Mult}(R) \cdot r_{in})^t \cdot t$$

At this point, we have generated T numbers, each with $O(T)$ bits, with the same sum as $\Sigma b_i$. There is a $O(\log T)$-depth constant fan-in boolean circuit for computing this sum, which can be emulated by a $O(\log T)$-depth mod-$B_I$ circuit. (We omit the details.) Combining the above with results in the proof Theorem 7.2, the result follows.

Unfortunately, Step 2 uses $t = n$, implying $r_{Dec}/r_{Enc} \geq r_{out}/r_{in} > 2^n$, and therefore the above analysis cannot show that the scheme is both bootstrappable and secure. However, Lemma 9.1 will be relevant to our final scheme, as will the following lemma regarding Step 3:

Lemma 9.2. Using a constant depth circuit having polynomial fan-in $Add_{B_I}$ gates and constant fan-in $Mult_{B_I}$ gates, we can compute $\psi - B_J^{sk1} \cdot (\Sigma y_i)$ mod $B_I$ from a binary representation (using the bits $\{0, 1\}$ mod $B_I$) of the terms of the expression.

The proof of Lemma 9.2 involves converting the binary representation of the terms to a more "natural" mod-$B_I$ representation, at which point the computation is trivially constant depth. As a toy example for intuition, suppose we have mod-13 gates, where the numbers $0, \ldots, 12$ are represented by 13 different "frequencies" (not in terms of a binary representation), and $Add_{13}$ and $Mult_{13}$ perform addition and multiplication modulo 13 "automatically." Also suppose that we are given a number $b = \ldots b_1 b_0$ in binary representation, where each of the $b_i$ is separately represented by the frequency for '0' or '1' (not by any of the other 11 frequencies). For example, suppose 9 is represented as 1001 rather than by the natural frequency for '9'. From the initial representation of b, how do we compute the "natural" representation of b mod 13 as a single frequency (from among the 13 different frequencies)? First, we precompute the frequencies $a_j \leftarrow 2^j$ mod 13. Next, we output $Add_{13}(\ldots, Mult_{13}(a_1, b_1), Mult_{13}(a_0, b_0))$. Using polynomial-fan-in $Add_{13}$ gates, this takes constant depth even if b has a polynomial number of bits. Essentially the same considerations apply in the proof of Lemma 9.2. The simplest case is where $I = (2)$ and the conversion is unnecessary.

Proof. For a slightly simpler case, let us first assume that $B_J^{sk1}$ is a rotation basis, so that the remaining decryption computation is to compute $\psi - v_J^{sk1} \times (\Sigma y_i)$ mod $B_I$ for $v_J^{sk1} \in R$. Consider one of the vectors—say, $y \leftarrow y_1$. How do we compute the "natural" representation of y mod $B_I$?

Currently, the ith coefficient $y_i$ of y is represented by the elements $y_{ix} \times e_1, \ldots, y_{i0} \times e_1 \in \{0, 1\}$ mod $B_I$ where $y_i = \Sigma_{j=0}^x 2^j \cdot u_{ij}$. So, we have $$y = \sum_{i \in [1,n], j \in [0,x]} 2^j \times (y_{ij} \times e_1) \times e_i \bmod B_I$$

After pre-computing values $a_j \leftarrow 2^j$ mod $B_I$ for $j \in [0, x]$, we can compute this representation of y mod $B_I$ by using two levels of $Mult_{B_I}$ gates (since each term in the sum is the product of three terms) and then $\log_{f(n)}(nx)$ levels of $f(n)$-fan-in $Add_{B_I}$ gates. Overall, this is constant depth assuming y was initially represented by a polynomial number of bits.

We obtain the natural mod-$B_I$ representations of the other vectors in a similar fashion. Thereafter, we compute the result in constant depth, using one level to compute $v_J^{sk1} x y_i$ mod $B_I$ for each i and a constant number of polynomial fan-in mod-$B_I$ gates for addition.

The case of a general matrix $B_f^{sk1}$ is only slightly more complicated. Basically, since the matrix inhibits our use of ring multiplication, we first compute the "natural" mod-$B_I$ representation of each individual coefficient (rather than the full vector), multiply the coefficients together in the proper fashion to obtain the natural representations of coefficients in the vectors $B_f^{sk1} \cdot y_i$, and then multiply the representations by the appropriate $e_i$'s, and add the results modulo $B_f$.

At this point, it may be tempting to ask: how is a mod-$B_I$ gate implemented, and doesn't this implementation add to the decryption complexity? But we have shown that ring addition and multiplication applied to ciphertexts induces mod-$B_I$ operations over plaintexts: e.g., adding two ciphertexts that encrypt $\pi_1$ and $\pi_2$ mod $B_I$ gives a third ciphertext that encrypts $\pi_3 = \pi_1 + \pi_2$ mod $B_I$—i.e., already reduced modulo $B_I$. The mod-$B_I$ operations, implicitly applied to plaintexts, come for free with the ring operations applied to ciphertexts (up to a point defined by the permitted circuits $\mathcal{C}_\epsilon$).

From Lemmas 9.1 and 9.2, we conclude that, aside from the coefficient multiplication operations in the computation of $B_f^{sk2} \cdot \psi$ that we have ignored, the depth of our decryption circuit is O(log n), where the hidden constant is greater than 1. By Theorem 7.2, the maximum depth that we can evaluate is $d = \log \log r_{Dec} - \log \log \gamma_{Mult}(R) \cdot r_{Enc}$. Can we take d to be greater than log n?

Unfortunately, the answer appears to be 'no.' Specifically, the dominant computation in decryption is $\lfloor (B_f^{sk})^{-1} \cdot \psi \rfloor$, which occurs within the computation of $\psi$ mod $B_f^{sk}$. Roughly speaking, to ensure that the rounding is correct, one must use a sufficient number of bits of precision. Then, the high precision of each number-number multiplication that occurs within the matrix-vector multiplication forces us to use a high-depth circuit. Specifically, two k-bit numbers can be multiplied together using a O(log k)-depth circuit (with constant fan-in). The precision we seem to need is roughly log det(J)>n·log $r_{Dec}$ bits, and therefore we need about a O(log n+log $r_{Dec}$)-depth circuit.

Unfortunately, for this initial scheme, it seems that no matter how the parameters are set, the decryption circuit is always slightly too complex for the scheme to evaluate.[6] This problem is difficult to fix post hoc, in part due to the self-referential nature of the bootstrapability property: intuitively, if one expands the set of circuits that $\epsilon$ can "handle" in an effort to include $D_\epsilon$, one seemingly must increase the complexity of $Decrypt_\epsilon$ to accommodate, thereby making the circuit $D_\epsilon$ more complex, possibly such that $D_\epsilon$ always elusively falls outside of the expanded set. To obtain a bootstrappable encryption scheme, it seems necessary to change the decryption algorithm fundamentally.

[6]However, we do not prove this. It remains possible that the decryption circuit of this initial scheme can be expressed in a way that makes the scheme bootstrappable.

10 Squashing the Decryption Circuit

Let $\epsilon^*$ be the encryption scheme described in Section 7, modified by Tweak 2 and preferably also Tweak 1 as described in Section 8. In this Section, we describe how to transform $\epsilon^*$ so as to lower the complexity of the decryption circuit and achieve a bootstrapable scheme. A crucial point is that this transformation does not reduce the evaluative capacity at all—i.e., the set of permitted circuits remains fixed. Of course, there is a price: in our new scheme $\epsilon$, we potentially weaken security by including information about the $\epsilon^*$ secret key inside the $\epsilon$ public key. We first describe our transformation generically. We prove security of $\epsilon$ (generically) based on $\epsilon^*$ and the assumed hardness of a certain abstract distinguishing problem, where the latter arises from the new information included in the $\epsilon$ public key. We then instantiate the transformation, where the distinguishing problem becomes a lattice problem that we discuss in Section 11.

10.1 A Generic Description of the Transformation

At a high level, our transformation works by splitting the original decryption algorithm into two phases—an initial computationally intensive preprocessing phase performed without the secret key (by the encrypter), followed by a computationally lightweight phase using the secret key (by the decrypter). In short, the encrypter preprocesses its own initial ciphertext, leaving less work for the decrypter to do.

Interestingly, this two-phase approach to decryption is precisely what one finds in server aided cryptography. In that setting, a user wants to minimize its cryptographic computation—e.g., because it is using a constrained device, such as a smartcard or handheld. So, it outsources expensive computations to a server. To set up this arrangement, the user (in some schemes) must give the server a tag T that is statistically dependent on its secret key sk, but which is not sufficient to permit the server to decrypt efficiently on its own. The processing that the server performs may expand the size of the ciphertext substantially, but nonetheless the processed ciphertext requires less computation for the user to decrypt. In our setting, the encrypter plays the role of the server. We will also use a secret-key-dependent tag $\tau$ and suffer from ciphertext expansion.

Now, we describe the transformation in detail. Let $\epsilon^*$ be the initial encryption scheme. We construct a modified scheme $\epsilon$ that uses two new algorithms, $SplitKey_\epsilon$ and $ExpandCT_\epsilon$, that will remain abstract for now.

$KeyGen_\epsilon(\lambda)$. Runs $$(pk^*, sk^*) \xleftarrow{R} KeyGen_{\epsilon^*}(\lambda)$$

and $$(sk, \tau) \xleftarrow{R} SplitKey_\epsilon(sk^*, pk^*).$$

The secret key is sk. The public key pk is (pk*, $\tau$).
$Encrypt_\epsilon(pk, \pi)$. Runs $\psi^* \leftarrow Encrypt_{\epsilon^*}(pk^*, \pi)$. It then sets $\psi$ to include $\psi^*$ and the output of $ExpandCT_\epsilon(pk, \psi^*)$. ($ExpandCT_\epsilon$ makes heavy use of $\tau$.)
$Decrypt_\epsilon(sk, \psi^*)$. Uses sk and expanded ciphertext to decrypt more efficiently. $Decrypt_\epsilon(sk, \psi)$ should work whenever $Decrypt_{\epsilon^*}(sk^*, \psi^*)$ works.
$Add_\epsilon(pk, \psi_1, \psi_2)$. Extracts $(\psi^*_1, \psi^*_2)$ from $(\psi_1, \psi_2)$, computes $\psi^* \leftarrow Add_{\epsilon^*}(pk^*, \psi^*_1, \psi^*_2)$, and sets $\psi$ to include $\psi^*$ and the output of $ExpandCT_\epsilon(pk, \psi^*)$. $Mult_\epsilon(pk, \psi_1, \psi_2)$ is analogous.

The security of the transformation relies on the following problem, which is completely abstract at this point.
Definition 10.1 (SplitKey Distinguishing Problem). The challenger sets $$(sk^*, pk^*) \xleftarrow{R} KeyGen_{\epsilon^*}$$

and $$b \xleftarrow{R} \{0, 1\},$$

If b=0, it sets $$(sk, \tau) \xleftarrow{R} SplitKey(sk^*, pk^*).$$

If b=1, it sets $$(sk, \tau) \xleftarrow{R} SplitKey(\perp, pk^*),$$

where $\perp$ is a special symbol. The problem: guess b given ($\tau$, sk*, pk*).

Theorem 10.2. Suppose that there is an algorithm $\mathcal{A}$ that breaks the semantic security of $\epsilon$ above with advantage $\in$. Then, there exist algorithms $\mathcal{B}_0$ and $\mathcal{B}_1$, running in about the same time as $\mathcal{A}$, such that either $\mathcal{B}_0$'s advantage against the SplitKey Distinguishing Problem or $\mathcal{B}_1$'s advantage against the semantic security of $\epsilon^*$ is at least $\in/3$.

Proof. Let Game 0 be the real-world semantic security game. Game 1 is like Game 0, except the challenger generates pk differently. Specifically, instead of inputting sk* into Split-Key, it inputs $\perp$ to obtain $\tau$, and adds $\tau$ to the pk it sends to $\mathcal{A}$. By assumption, $\in$ is $\mathcal{A}$'s advantage in Game 0. Let $\in'$ be $\mathcal{A}$'s advantage in Game 1.

$\mathcal{B}_0$ runs as follows. The challenger sets bit $$b \xleftarrow{R} \{0, 1\}$$

and sends a SplitKey Distinguishing Problem instance ($\tau$, sk*, pk*) to $\mathcal{B}_0$. $\mathcal{B}_0$ sends pk←(pk*, $\tau$) to $\mathcal{A}$. When $\mathcal{A}$ asks for a challenge ciphertext on one of ($\tau_0, \tau_1$), $\mathcal{B}_0$ sets $$\beta \xleftarrow{R} \{0, 1\}$$

and sends $\psi$←Encrypt$_\epsilon$(pk, $\tau_\beta$). Eventually, $\mathcal{A}$ sends a bit $\beta'$. $\mathcal{B}_0$ sends b'←$\beta \oplus \beta'$ to the challenger. Note that the public key pk (and the other aspects of the simulation) is distributed exactly as in Game b. We compute that $\mathcal{B}_0$'s advantage is at least $|\in - \in'|/2$.

$\mathcal{B}_1$ runs as follows. It obtains an $\epsilon^*$ public key pk* from the challenger. It runs $$(sk, \tau) \xleftarrow{R} SplitKey(\perp, pk^*)$$

and sends pk←(pk*, $\tau$) to $\mathcal{A}$. When $\mathcal{A}$ asks for a challenge ciphertext on one of ($\tau_0, \tau_1$), $\mathcal{B}_1$ asks the challenger for a challenge ciphertext on one of ($\tau_0, \tau_1$). The challenger sends back $\psi^*$. $\mathcal{B}_1$ sets $\psi$ to include $\psi^*$ and the output of ExpandCT$_\epsilon$(pk, $\psi^*$) and sends $\psi$ to $\mathcal{A}$. $\mathcal{A}$ sends a bit b', which $\mathcal{B}_1$ forwards to the challenger. We see that the distribution is the same as in Game 1. Also, $\mathcal{B}_1$'s bit is correct if $\mathcal{A}$'s bit is correct; so $\mathcal{B}_1$ has advantage $\in'$.

In the next Subsection, we specify how to instantiate Split-Key, ExpandCT, and the new Decrypt algorithm. After that, we will analyze the new decryption circuit, and prove that we finally have a bootstrappable encryption scheme. We will consider the hardness of our concrete version of the SplitKey Distinguishing Problem in Section 11.

10.2 How to Squash, Concretely

Let $v_J^{sk*}$ be the secret key vector of our somewhat homomorphic encryption scheme $\epsilon^*$ after Tweak 1. (Our concrete transformation below can be adapted to handle the scheme without Tweak 1, but handling a secret matrix rather than a secret vector is less efficient.) Recall that this vector is an element of the fractional ideal $J^{-1}$. Also, recall our decryption equation:

$$\tau = \psi - \lfloor v_J^{sk*} \times \psi \rceil \mod B_I$$

The idea of our abstract transformation was to place a "hint" about the $\epsilon^*$ secret key inside the $\epsilon$ public key; what hint do we give about $v_J^{sk*}$?

Our hint will consist of a set of vectors that has a (secret) sparse subset of vectors whose sum is essentially $v_J^{sk*}$. More specifically, the set of vectors $\tau$ is $t_1, \ldots, t_{\gamma_{setsize}(n)} \in J^{-1}$, where $\gamma_{setsize}(n)$ is a parameter that is polynomial in n. $S \subset \{1, \ldots, \gamma_{setsize}(n)\}$ will be a subset of indices having cardinality $\gamma_{subsetsize}(n)$. And it will hold that $\Sigma_{i \in S} t_i = v_J^{sk*}$ mod I. The new secret key sk is a 0/1-matrix encoding the subset S. The SplitKey distinguishing problem becomes essentially: given $v_J^{sk*}$ and $\tau$ decide whether there is actually a sparse subset whose sum if $v_J^{sk*}$ mod I, or whether there is a sparse subset whose sum is 0 mod I.

In the ExpandCT operation, the "encrypter" processes a ciphertext $\psi^*$ output by the original scheme $\epsilon^*$ by computing all of the products $c_i \leftarrow t_i \times \psi^* \mod B_I$ and including them in the new ciphertext $\psi$. To decrypt $\psi$, the user basically extracts the $\gamma_{subsetsize}(n)$ $c_i$'s that are "relevant"—the $c_i$'s for which $i \in S$. It then uses the decryption equation $$\pi = \psi^* - \left\lfloor \sum_{i \in S} c_i \right\rceil \mod B_I$$

which can easily be verified to be correct.

This transformation will actually end up increasing the computational complexity of decryption. However, the important point is that the ExpandCT operation, which does not need to be performed homomorphically, prepares a ciphertext that can be decrypted by a shallower circuit. The essential reason is that summing up $\gamma_{subsetsize}(n)$ values (in the new decryption equation) requires much less depth—less than log n, as we will see—when $\gamma_{subsetsize}(n)$ is much less than n. We now describe the transformation more formally.

Let (sk*, pk*) be an $\epsilon^*$ key pair. Let $\gamma_{setsize}(n)$ and $\gamma_{subsetsize}(n)$ be functions, where the former is w(n) and poly(n) and the latter is w(1) and o(n). Here are the concrete instantiations of SplitKey$_\epsilon$, ExpandCT$_\epsilon$, and Decrypt$_\epsilon$ used to construct $\epsilon$.

SplitKey$_\epsilon$(sk$^\dagger$, pk*). Takes as input sk$^\dagger$, which may be either sk* or $\perp$. If the former, it extracts the vector $v_J^{sk*}$ from sk*; if the latter, it sets $v_J^{sk*} \leftarrow 0$. It outputs (sk, $\tau$), where:

- $\tau$ is a set of $\gamma_{setsize}(n)$ vectors $t_1, \ldots, t_{\gamma_{setsize}(n)}$ that are uniformly random in $J^{-1}$ mod $B_J$, except there exists a subset $S \subset \{1, \ldots, \gamma_{setsize}(n)\}$ of cardinality $\gamma_{subsetsize}(n)$ such that $\overline{\Sigma}_{i \in S} t_i \in v_J^{sk*} + I$.
- sk is a matrix $\gamma_{subsetsize}(n) \times \gamma_{setsize}(n)$ matrix M of 0's and 1's, where $M_{ij} = 1$ if j is the ith member of S.

ExpandCT$_\epsilon$(pk,$\psi^*$). Outputs $c_i \leftarrow t_i \times \psi^* \mod B_I$ for $i \in [1, \gamma_{setsize}(n)]$.

Decrypt$_\epsilon$(sk,ψ). Takes as input the secret key sk and a ciphertext ψ. It performs the following steps:
Step 0: Set the vectors $w_{ij} \leftarrow M_{ij} \cdot c_j$
Step 1: Set the vectors $$x_i \leftarrow \sum_{j=1}^{\gamma_{setsize}(n)} w_{ij}$$

Step 2: From $x_1, \ldots, x_{\gamma_{subsetsize}(n)}$, generate integer vectors $y_1, \ldots, y_{\gamma_{subsetsize}(n)+1}$ with sum $\lceil \Sigma x_i \rceil$.
Step 3: Compute $\Sigma \leftarrow \psi^* - (\Sigma y_i) \mod B_I$
Remark 10.3. To generate τ, one may, for example, just set $t_1, \ldots, t_{\gamma_{setsize}(n)-1}$ to be uniformly random vectors in $J^{-1} \cap \mathcal{P}(B_I)$. Then, one sets $$t_{\gamma_{setsize}(n)} \leftarrow v_J^{sk^*} - \sum_{i=1}^{\gamma_{subsetsize}(n)-1} t_i \mod B_I.$$

Then one permutes the vectors.
Remark 10.4. Without Tweak 2, we could have instead used a $\gamma_{setsize}(n)$-sized set of matrices with a hidden $\gamma_{subsetsize}(n)$-sized subset whose sum is related to $(B_J^{sk})^{-1}$. This would have resulted in a larger public key.
10.3 Bootstrapping Achieved: The Decryption Circuit for the Transformed System
We analyzed Steps 2 and 3 in Section 9. It is obvious that Step 0 requires only constant depth. We claim that Step 1 requires only constant depth, but why? Computing $$\sum_{j=1}^{\gamma_{setsize}(n)} w_{ij}$$

is very cheap because, in the set $\{w_{ij}: j \in [1, \gamma_{setsize}(n)]\}$, there is only one nonzero vector. Therefore, when we add the vectors, no expensive carry operations are required; we simply "XOR" the vectors together using polynomial-fan-in Add$_{B_I}$ operations, using constant depth. At last, we have the following theorem.
Theorem 10.5. The scheme ε is bootstrappable when $$\gamma_{subsetsize}(n) \cdot \log^{c_1} \gamma_{subsetsize}(n) \leq \left( \frac{\log(r_{Dec}/m)}{2^{c_2} \cdot \log(\gamma_{Mult}(R) \cdot r_{Enc})} \right)$$

where $\log^{c_1} \gamma_{setsize}(n)$ is the polylog term arising in Lemma 9.1, m arises from the re-definition of $\mathcal{C}_\epsilon$ in the Tweaks (m=2 when just Tweak 2 is used), and $c_2$ is a constant representing the depth needed in a circuit having Add$_{B_I}$ gates with $\gamma_{Mult}(R) = n^{\Omega(1)}$ fan-in and Mult$_{B_I}$ gates with constant fan-in to sequentially perform Decrypt$_\epsilon$ Steps 0, 1, and 3, and a NAND gate.
Proof. As in the proof of Theorem 7.2, for a c-level circuit, if the inputs to the generalized circuit are in $\mathcal{B}(r)$, the outputs are in $\mathcal{B}((\gamma_{Mult}(R) \cdot r)^{2^c})$. Combining with Lemma 9.1, we have that if the inputs to our generalized NAND-augmented decryption circuit are in $\mathcal{B}(r_{Enc})$, the output is in $$(\gamma_{Mult}(R) \cdot r_{Enc})^{2^{c_2} \cdot (\gamma_{subsetsize}(n) \cdot poly \log(\gamma_{subsetsize}(n)))}$$

The result follows when this value is at most $r_{Dec}/m$.
For example, suppose $\gamma_{Mult}(R) \cdot r_{Enc}$ is polynomial in n, and $r_{Dec} = 2^{n^c}$ for C<1. In this case, $\gamma_{subsetsize}(n)$ can be polynomial in n (but sub-linear). The constants $c_1$ and $c_2$ are not very large, though in practice one would want to optimize them beyond what we have done.

11 Security

From Theorem 10.2, we know that the bootstrappable encryption scheme described in Section 10.2 is semantically secure as long as the SplitKey distinguishing problem (instantiated as described as in Section 10.2) is hard and the somewhat homomorphic encryption scheme of Section 7 (possibly with the tweaks of Section 8) is semantically secure. In other words, the bootstrappable encryption scheme's security is based on two assumptions.
We already addressed the security of the somewhat homomorphic encrypion scheme in Section 7.7, basing it on the decision BDDP. In the remainder of this Section, we will consider the hardness of our concrete version of the SplitKey distinguishing problem. Concretely, the SplitKey distinguishing problem will become the (decision) sparse subset sum problem (SSSP). (See Definition 11.4.) We then show how to reduce search SSSP to decision SSSP using Goldreich-Levin. (See O. Goldreich and L. Levin, "Hard-Core Predicates for Any One-Way Function", in *Proc. of STOC* '89, ACM, 1989.)
11.1 Regarding the Hint Given in Our "Squashing" Transformation
For the concrete instantiation of SplitKey given in Section 10.2, the SplitKey distinguishing problem becomes the following.
Definition 11.1 (SplitKey Distinguishing Problem, Concrete Version). Let $\gamma_{setsize}(n)$ and $\gamma_{subsetsize}(n)$ be functions as above, and $B_I$ a basis of an ideal I. The challenger sets $$(sk^*, pk^*) \xleftarrow{R} KeyGen_{\epsilon^*}$$

and $$b \xleftarrow{R} \{0, 1\},$$

where sk* includes the secret vector $v_J^{sk^*} \in J^{-1}$. If b=1, it sets $v_J^{sk^*} \leftarrow 0$. It sets τ to be a set of $\gamma_{setsize}(n)$ vectors $t_1, \ldots, t_{\gamma_{setsize}(n)}$ that are uniformly random in $J^{-1} \mod B_I$ subject to the constraint that there exists a subset $S \subseteq \{1, \ldots, \gamma_{setsize}(n)\}$ of cardinality $\gamma_{subsetsize}(n)$ such that $\tau_{i \in S} t_i \in v_J^{sk^*} + I$. The problem is to guess b given (τ, sk*, pk*).
Here we discuss the hardness of our concrete version of the SplitKey Distinguishing Problem given in Definition 11.1. The problem is somewhat unnatural, in the sense that it depends on our key generation algorithm. Below, we base the hardness of our SplitKey Distinguishing Problem on a sparse subset sum problem modulo an integer that is essentially independent of our encryption scheme. We do this in two steps. First, we relate the SplitKey Distinguishing Problem to a sparse subset vector sum problem modulo the lattice IJ, where the problem is independent of the secret key output by our key generation algorithm (but not the public key). Next, as long as I and J satisfy certain criteria, we remove the dependence on I and J.

Here is the intermediate problem that we use.

Definition 11.2 (Sparse Vector Subset Sum Problem (SVSSP)). Let $\gamma_{setsize}(n)$ and $\gamma_{subsetsize}(n)$ be functions as above, and $B_I$ a basis of an ideal I. The challenger sets $$(sk^*, pk^*) \xleftarrow{R} KeyGen_{\mathcal{E}^*}$$

and $$b \xleftarrow{R} \{0, 1\},$$

where the key pair includes bases of an ideal J. It sets $B_{IJ}$ to be the Hermite normal form of IJ. If b=0 it generates $\tau$ as a set of $\gamma_{setsize}(n)$ vectors $u_1, \ldots, u_{\gamma_{setsize}(n)}$ that are uniformly random in $\mathbb{Z}^n \cap \mathcal{P}(B_{IJ})$, subject to the constraint that there exists a subset $S \subseteq \{1, \ldots, \gamma_{setsize}(n)\}$ of cardinality $\gamma_{subsetsize}(n)$ such that $\Sigma_{i \in S} \overline{u_i} \in IJ$. If b=1, it sets the vectors without the constraint. The problem is to guess b given $(\tau, sk^*, pk^*)$.

Theorem 11.3. Let $\mathcal{A}$ be an algorithm that decides the concrete version of the SplitKey Distinguishing Problem with advantage $\in$. Then, there is an algorithm $\mathcal{B}$, running in about the same time as $\mathcal{A}$, that solves the SVSSP with advantage $(\in_{subsetsize}(n)/2\gamma_{setsize}(n)) \cdot \in$.

Proof. The challenger generates a bit $$b \xleftarrow{R} \{0, 1\}$$

and gives $\mathcal{B}$ an appropriate instance $(\tau, sk^*, pk^*)$ of SVSSP, where $pk^*$ includes a basis for ideal J, and $sk^*$ contains $v_J^{sk*} \in J^{-1}$. To generate a tag $\tau'$ for the SplitKey Distinguishing Problem, $\mathcal{B}$ does the following. Let $B_{J^{-1}}$ be a basis of $J^{-1}$ and let U be the $n \times \gamma_{setsize}(n)$ matrix formed by the vectors $\{u_i\}$. $\mathcal{B}$ sets $T' \leftarrow B_{J^{-1}} \cdot U$, reducing the columns modulo $B_I$. It sets a bit $$b \xleftarrow{R} \{0, 1\};$$

if $\beta=0$ it sets $v \leftarrow V_J^{sk*}$, otherwise it sets $v \leftarrow 0$. It adds v to a random column (say the lith column) of T', reducing the column modulo $B_I$, to obtain matrix T. It outputs $\tau'$ as the column vectors of T. $\mathcal{A}$ responds with a bit $\rho'$. $\mathcal{B}$ outputs $b' \leftarrow \beta \oplus \beta'$.

We have that $$Pr[b'=b]=(½) \cdot Pr[b'=0|b=0]+(½) \cdot Pr[b'=1|b=1]=(½) \cdot Pr[b'=0|b=0]+¼$$

The last equality follows from the fact that, when b=1, the column vectors of T' are random and independent in $J^{-1} \cap \mathcal{P}(B_I)$ and thus T is independent of $\beta$, $\beta'$ is independent of $\beta$, and b' is uniformly random. We know that the column vectors of T' are random and independent, since multiplication by $B_{J^{-1}}$ induces a bijection between $\mathbb{Z}^n \cap \mathcal{P}(B_{IJ})$ and $J^{-1} \cap \mathcal{P}(B_I)$ that preserves rank: for $c \in \mathbb{Z}^{\gamma_{setsize}(n)}$, we have $$T' \cdot c = 0 \Leftrightarrow B_{J^{-1}} \cdot U \cdot c = 0 \Leftrightarrow U \cdot c = 0$$

In short, the uniformity of U when b=1 implies the uniformity of

Now, assume b=0. For $i \in \{0, 1\}$, let $\in_i$ be the probability that $\mathcal{A}$ outputs 1 when $b^\dagger=i$ in the SplitKey Distinguishing Problem. (We used '$b^\dagger$' to avoid a notation conflict.) We have $$Pr[b'=0]=(½) \cdot (Pr[\beta'0|\beta==0]+Pr[\beta'=1|\beta=1]$$

If $\beta=1$, then indeed T has the same distribution as in the $b^\dagger=1$ case in the SplitKey Distinguishing Problem (i.e., a sparse subset sums to 0 modulo I), so $Pr=[\beta'=1|\beta=1]=\in_1$. However, if $\beta=0$, then T has the same distribution as in the $b^\dagger=0$ case in the SplitKey Distinguishing Problem (i.e., a sparse subset sums to $v_J^{sk*}$) when $k \in S$, but when $k \notin S$, the distribution is the same as in the $b^\dagger=1$ case (since $v_J^{sk*}$ is added to a vector that is not a part of the sparse subset and thus is lost in the randomness of the other vectors, while the sparse subset sum is unaffected and is thus still 0). Therefore, assuming $\beta=0$, we have $$Pr[\beta'=0] = Pr[\beta'=0 \mid k \in S] \cdot Pr(k \in S] +$$
$$Pr[\beta'=0 \mid k \notin S] \cdot Pr\{k \notin S]$$
$$= (1 - \in_0)(\gamma_{subsetsize}(n) / \gamma_{setsize}(n)) +$$
$$(1 - \in_1) \cdot (1 - \gamma_{subsetsize}(n) / \gamma_{setsize}(n))$$

Overall, we have $$Pr[b'=0|b=0]=½+(\in_1-\in_0)(\gamma_{subsetsize}(n)/2\gamma_{setsize}(n))$$

and thus $Pr[b'=b]=½+(\in_1-\in_0)(\gamma_{subsetsize}(n)/4\gamma_{setsize}(n))$. In other words, $\mathcal{B}$'s advantage is less than $\mathcal{A}$'s advantage by at most a multiplicative advantage of $2\gamma_{setsize}(n)/\gamma_{subsetsize}(n)$.

Now, we provide a problem that is independent of the particular ideal J output by KeyGen.

Definition 11.4 (Sparse Subset Sum Problem (SSSP)). Let $\gamma_{setsize}(n)$ and $\gamma_{subsetsize}(n)$ be functions as above, and let q be a prime positive integer. The challenger sets $$b \xleftarrow{R} \{0, 1\}.$$

If b=0 it generates $\tau$ as a set of $\gamma_{setsize}(n)$ integers $\{a_1, \ldots, a_{\gamma_{setsize}(n)}\}$ in $[-q/2, q/2]$ that are uniformly random, subject to the constraint that there exists a subset $S \subseteq \{1, \ldots, \gamma_{setsize}(n)\}$ of cardinality $\gamma_{subsetsize}(n)$ such that $\Sigma_{i \in S} \overline{a_i} = 0 \mod q$. If b=1, it sets the elements without the constraint. The problem is to guess b given $\tau$.

The SSSP is a type of knapsack problem; it asks whether there is a sparse knapsack that sums to 0 modulo q. However, the SSSP should not be confused with the low-density knapsack problem. In the latter, $\gamma_{setsize}(n)/\log q$ is small (less than 1). Consequently (though we omit details), one can construct a lattice corresponding to the set of possible knapsack solutions in which the target solution vector corresponding to the subset sum is exponentially shorter than the rest of the solution vectors; this solution vector can then be recovered by a polynomial-time lattice reduction algorithm. In our case, $\gamma_{setsize}(n)/\log q$ will be greater than 1. The consequence of this is that there will be (exponentially) many subsets whose sum is zero modulo q, and known polynomial-time lattice reduction algorithms will fail to extract the sparse solution from the many non-sparse ones.

Theorem 11.5. Assume $B_I$ and IdealGen are such that det(I) and det(J) are distinct primes and q/det(IJ) is super-polynomial. Suppose $\mathcal{A}$ decides SVSSP with advantage $\in$ in this setting. Then, there is an algorithm $\mathcal{B}$ that decides the SSSP with advantage $\in/2\gamma_{subsetsize}(n)$, up to negligible factors.

The intuition of the proof is that, if there is a sparse subset S such that $\tau_{i \in S} a_i = 0 \mod q$, then this set sums to zero over the integers with non-negligible probability, since the only possible sums are $k \cdot q$ for $k \in (-\gamma_{subsetsize}(n)/2, \gamma_{subsetsize}(n)/2)$. If this holds, then q is irrelevant; $\Sigma_{i \in S} a_i = 0 \mod p$ holds for any p. In particular, $\Sigma_{i \in S} a_i = 0 \mod \det(IJ)$.

Accordingly, $\mathcal{B}$'s initial strategy is to set $a_i \leftarrow a_i \cdot e_i \mod B_{IJ}$ for all i, and ask $\mathcal{A}$ whether these $a_i$ are statistically uniform or there is a sparse subset of them that sum to 0 modulo IJ. There surely is such a sparse subset (namely, S) when $\Sigma_{i \in S} a_i = 0$. If the $a_i$'s are completely random and independent, then the $a_i$'s will be statistically random modulo $B_{ij}$, since $q/\det(IJ)$ is super-polynomial random and thus the $a_i$'s are statistically random modulo $\det(IJ)$, and because (for technical reasons) multiples of $e_i$ run over all of the cosets $\mathbb{Z}^n/IJ$.

The difficult case is when $\Sigma_{i \in S} a_i$ is a nonzero multiple of q. For this case, we would like to map the $a_i$'s to $a_i$'s so that the $a_i$'s are statistically uniform, but the initial strategy above does not quite work, since the resulting $a_i$'s would have a sparse subset that adds up to $k \cdot q \cdot e_1 \mod B_{IJ}$ where $k \in (-\gamma_{subsetsize}(n)/2, \gamma_{subsetsize}(n)/2) \setminus \{0\}$, whereas the $a_i$'s would be unlikely to have such a sparse subset if they were uniform. So, we revise $\mathcal{B}$'s initial strategy slightly: it chooses a random integer m that is invertible modulo $\det(IJ)$ and sets $a_i \leftarrow m \cdot a_i \cdot e_1$. This new strategy still works for the cases when the $a_i$'s are random or have a sparse subset that sums to 0 over the integers; for the case that $\Sigma_{i \in S} a_i$ is a nonzero multiple of q, the new strategy randomizes the sum of the sparse subset so that it equals $x \cdot e_1$ for some random x that is invertible modulo $\det(IJ)$. If $\det(I)$ and $\det(J)$ are both super-polynomial, then an overwhelming fraction of numbers are invertible modulo $\det(IJ)$, and the distribution of the $a_i$'s is thus statistically uniform. If $\det(I)$ is not super-polynomial ($\det(J)$ of course must be), then we can use the Leftover Hash Lemma to prove that the distribution is still statistically uniform.

Overall, if $\mathcal{A}$ has a non-negligible advantage in the SVSSP, then $\mathcal{B}$ can use $\mathcal{A}$ to distinguish when an SSSP instance has a sparse subset that sums to 0 over the integers, which is enough to give $\mathcal{B}$ a non-negligible advantage in the SSSP.

Proof. The challenger generates a bit $$b \xleftarrow{R} \{0, 1\}$$

and gives $\mathcal{B}$ an appropriate instance $\tau$ of SSSP. To generate a tag $\tau'$ for the SVSSP, $\mathcal{B}$ does the following. $\mathcal{B}$ sets $$(sk^*, pk^*) \xleftarrow{R} KeyGen_{\mathcal{E}^*}$$

and sets $B_{ij}$ to be the Hermite normal form of IJ. It sets m to be random integer that is invertible modulo $\det(IJ)$ and sets $\tau'$ to be $u_i \leftarrow m \cdot a_i \cdot e_i \mod B_{IJ}$.

There are three cases to consider. If b=1, the $a_i$'s are random and independent in $[-q/2, q/2]$. Since $q/\det(IJ)$ is super-polynomial, the $a_i$'s are also (statistically) random and independent modulo $\det(IJ)$. Since $e_i$ generates all of the cosets $\mathbb{Z}^n/IJ$ (we will show this momentarily), and m is invertible modulo $\det(IJ)$, the $a_i$'s are random and independent among the cosets $\mathbb{Z}^n/IJ$.

As to why $e_i$ generates all of the $\det(IJ)$ cosets of $\mathbb{Z}^n/IJ$, let d be the smallest positive integer such that $d \cdot e_1 \in IJ$. If $d = \det(IJ)$, then clearly $e_1$ must traverse all of the $\det(IJ)$ cosets. Otherwise, d is a proper divisor of $\det(IJ)$, either $\det(I)$ or $\det(J)$. But $\det(I) \cdot e_1$ cannot be in J, since $\det(J) \cdot e_1 \in J$, which would imply $e_1 \in J$, since $\det(I)$ and $\det(J)$ are relatively prime. This is impossible, since $e_1$ generates the entire ring R.

Suppose that b=0 and that $\Sigma_{i \in S} a_i = 0$ (over the integers). Let S be the set of indices corresponding to the subset whose sum is 0. In this case, $\Sigma_{i \in S} a_i = 0 \mod \det(IJ)$, and so $\Sigma_{i \in S} a_i = 0 \mod B_{IJ}$. If we consider any subset of $\gamma_{setsize}(n) - 1$ indices that excludes an index in S, the vectors associated to those indices are random and independent modulo $B_{IJ}$ for the same reasons as in the first case. Thus, in this case, $\tau'$ leads to a (statistically) properly distributed instance of the SVSSP for the $b^\dagger = 0$ case.

Suppose that b=0 and that $\tau_{i \in S} a_i$ is a nonzero multiple of q. Consider the distribution of $\Sigma_{i \in S} m \cdot a_i \mod \det(IJ)$; we claim that it is statistically uniform. If this sum is statistically uniform, then the distribution of $\{a_i\}$ is uniform modulo IJ, since we already know that the distribution is uniform apart from the possibility that there is a sparse subset S with an improbable sum.

First, consider $\Sigma_{i \in S} m_J \cdot a_i \mod \det(J)$, where $m_J$ is the residues of m modulo $\det(J)$. We claim that it is statistical uniform and independent of $\Sigma_{i \in S} m_I \cdot a_i \mod \det(I)$, where $m_I$ is the residues of m modulo $\det(I)$. Toward this claim, first we note that $\Sigma_{i \in S} a_i$ is nonzero modulo $\det(J)$, since it equals $k \cdot q$ for some small k, since $\det(J)$ and q are distinct primes, and since k is too small to be divisible by $\det(J)$. We also note that, via CRT, $m_J$ is sampled from $(\mathbb{Z}/\det(J))^*$ randomly and independently of $m_I$, and, since J is necessarily super-polynomial (for basic security reasons), sampling uniformly from $(\mathbb{Z}/\det(J))^*$ is statistically indistinguishable from sampling uniformly from $(\mathbb{Z}/\det(J))$. The claim follows.

Now, it suffices to show that $\Sigma_{i \in S} m_I \cdot a_i \mod \det(I)$ is statistically uniform. If $\det(I)$ is also super-polynomial, then uniformity follows for the same reason it was true wrt $\det(J)$. Otherwise, we apply the Leftover Hash Lemma. Specifically, let H be a family of hash functions, each hash function h in the family associated a distinct $(h_1, \ldots, h_{\gamma_{setsize}(n)-1}) \in (\mathbb{Z}/\det(I))^{\gamma_{setsize}(n)-1}$. The function maps from the set X of $(\gamma_{subsetsize}(n)-1)$-sized subsets of $\{1, \ldots, \gamma_{setsize}(n)-1\}$ to the set $Y = \mathbb{Z}/\det(I)$ via $h(x) = -\Sigma_{i \in x} h_i \mod \det(I)$. This family is clearly 2-universal. By the Leftover Hash Lemma (Lemma 6.5), if h and x are selected uniformly and independently, then (h, h(X)) is $$\frac{1}{2}\sqrt{|Y|/|X|} \text{-uniform}$$

The statistical difference from uniform is negligible when $$\det(I) = \binom{\gamma_{setsize}(n) - 1}{\gamma_{subsetsize}(n) - 1} / n^{\omega(1)},$$

which will certainly be true when $\det(I)$ is not super-polynomial. The distribution of $\Sigma_{i \in S} m_I \cdot a_i \mod \det(I)$ is even closer to uniform than the distribution induced by the above family of hash functions, since this distribution is equivalent to picking a random hash function from the family above, computing (h, h(x)), replacing h(x) with h(x)+z for a uniformly random $z \in (\mathbb{Z}/\det(I))^*$, and then permuting the resulting $\gamma_{setsize}(n)$ elements of $(\mathbb{Z}/\det(I))^*$.

Overall, given that $\Sigma_{i\in S}a_i=0 \bmod q$, the most likely multiple of q, out of less than $\gamma_{subsetsize}(n)$ possibilities, is 0 (since the expected mean is 0 when q is odd). Thus, the middle case occurs with probability at least $1/\gamma_{subsetsize}(n)$ and $\mathcal{B}$'s advantage is therefore at least $\in/2\gamma_{subsetsize}(n)$, up to negligible factors.

Finally, we reduce search SSSP to decision SSSP.

Definition 11.6 (Search SSSP). Let $\gamma_{setsize}(n)$ and $\gamma_{subsetsize}(n)$ be functions as above, and let q be a prime positive integer. The challenger generates $\tau$ as a set of $\gamma_{setsize}(n)$ integers $\{\alpha_1, \ldots, a_{\gamma_{setsize}(n)}\}$ in $[-q/2, q/2]$ that are uniformly random, subject to the constraint that there exists a subset $S \subset \{1, \ldots, \gamma_{setsize}(n)\}$ of cardinality $\gamma_{subsetsize}(n)$ such that $\Sigma_{i\in S}a_i=0 \bmod q$. The problem is to output the set S given $\tau$.

Theorem 11.7. Suppose $\mathcal{A}$ decides SSSP with non-negligible advantage in polynomial time. Then, there is an algorithm $\mathcal{B}$ that solves search SSSP with probability ½ in polynomial time.

Here is the intuition of the proof. Suppose that we have a flawless oracle $\mathcal{O}$ that decides whether $\tau'$ is uniformly random or has a sparse subset that sums to 0. Suppose that we are also given a set $\tau=(a_1, \ldots, a_{\gamma_{setsize}(n)})$ that sums to 0 over a sparse subset S. To decide whether an index $i\in[1, \gamma_{setsize}(n)]$ is in S, we set $$r \xleftarrow{R} \mathbb{Z}/(q),$$

set $a'_i \leftarrow a_i+r \bmod q$, and give $\tau'=(a_1, \ldots, a_{i-1}, a'_{i+1}, \ldots, a_{\gamma_{setsize}(n)})$ to $\mathcal{O}$. If $i\notin S$, then $\tau'$ still sums to 0 over S. $\mathcal{O}$ will tell us that there is a sparse subset, and we conclude that $i\notin S$. But if $i\in S$, then $\tau'$ is distributed like a random member of $[-q/2, q/2]^{\gamma_{setsize}(n)}$ and we conclude from $\mathcal{O}$'s response that $i\in S$.

Instead of a flawless oracle, we are given algorithm $\mathcal{A}$, which by assumption solves decision SSSP with non-negligible advantage. However, the Goldreich-Levin Theorem shows us how to use a decision oracle to invert certain functions, even when that oracle is faulty.

Theorem 11.8. (Goldreich-Levin Theorem) Suppose we have oracle access to a random process $b_x\colon \{0, 1\}^n \to \{0, 1\}$ such that, for some unknown $x \in \{0, 1\}^n$, we have $$\Pr_{r\in\{0,1\}^n}[b_x(r) = b(x, r)] \geq \frac{1}{2} + \epsilon$$

where the probability is taken uniformly over the internal coin tosses of $b_x$ and all possible choices of $r\in\{0, 1\}^n$, and $b(x, r)$ denotes the inner product mod 2 of the binary vectors x and r. Then, we can in time polynomial in $n/\in$ output a list of strings that with probability at least ½ contains x.

Proof. (Theorem 11.7) $\mathcal{B}$ receives a search SSSP instance $\tau=(a_1, \ldots, a_{\gamma_{setsize}(n)})$ from the challenger. Let $x\in\{0, 1\}^{\gamma_{setsize}(n)}$ be the (unknown) incidence vector associated to the sparse subset $S \subset \{1, \ldots, \gamma_{setsize}(n)\}$ over which $\tau$ sums to 0 modulo q. We will use Goldreich-Levin to recover x.

For $r\in\{0, 1\}^n$, define the random process $b_x(r)$ as follows. Sample $$c \xleftarrow{R} [-q/2, q/2]$$

and $$s \xleftarrow{R} \{-1, 1\}^{\gamma_{setsize}(n)},$$

set $$\tau' \leftarrow (a_1+c\cdot s_1\cdot r_1 \bmod q, \ldots, a_{\gamma_{setsize}(n)}+c\cdot s_{\gamma_{setsize}(n)}\cdot r_{\gamma_{setsize}(n)} \bmod q)$$

give $\tau'$ to $\mathcal{A}$ as its SSSP instance, and output $\mathcal{A}$'s response bit b'. We claim that $b'/=\langle x, r\rangle \bmod 2$ with probability non-negligibly bounded away from ½, from which the result follows by Goldreich-Levin.

For $i\in\{0, 1\}$, let $\in_0$ be the probability that $\mathcal{A}$ outputs 1 when a decision SSSP instance has a sparse subset that sums to 0, and let $\in_1$ be the probability that $\mathcal{A}$ outputs 1 otherwise. By assumption, $\in_1 - \in_0$ is non-negligible. Let $E_1$ and $E_2$ be the events that $\langle x, r\rangle = 0 \bmod 2$ and $\Sigma_{i\in S}s_i\cdot r_i=0$, respectively. Note that $E_2$ implies $E_1$. We have $$Pr[b' = \langle x, r\rangle] =$$
$$Pr[b' = 0 \mid E_2]\cdot Pr[E_2] + Pr[b' = 0 \mid E_1 \wedge \neg E_2]\cdot Pr[E_1 \wedge \neg E_2] +$$
$$Pr[b' = 1 \mid \neg E_1]\cdot Pr[\neg E_1] = (1 - \epsilon_0)\cdot Pr[E_2] +$$
$$(1 - \epsilon_1)\cdot((1/2) - Pr[E_2]) + \epsilon_1\cdot(1/2) = 1/2 + (\epsilon_1 - \epsilon_0)\cdot Pr[E_2]$$

The first equality follows from the fact that, if $E_2$ occurs, then $\tau'$ sums to 0 over S (and is otherwise randomly distributed). However, if $E_2$ does not occur, then $\tau'$ is just a uniformly random member of $[-q/2, q/2]^{\gamma_{setsize}(n)}$, since the sum over S is uniformly random.

We have that $Pr[E_2]$ is non-negligible—in particular, it is at least $1/(2\gamma_{subsetsize}(n)+1)$—since there are only $2\gamma_{subsetsize}(n)+1$ possibilities for $\Sigma_{i\in S}s_i\cdot r_i$ and 0 is the most likely.

As mentioned in Section 10, our approach to reducing the complexity of the decryption circuit is abstractly similar to approaches used in server-aided cryptography to outsource some of the decryption work to an untrusted server. In fact, the similarity is more than just abstract; there are concrete server-aided schemes whose security relies on the SSSP. In particular, in the Matsumoto, Kato and Imai server-aided RSA scheme—called, RSA-S1—the private exponent d is decomposed into $\gamma_{setsize}(n)$ integers $\{a_i\}$ such that there is a set $\{x_i\in[0,2^l-1]\}$, only $\gamma_{subsetsize}(n)$ of which are nonzero, such that $\Sigma_i x_i a_i = d \bmod \phi(N)$, where N is the RSA modulus. (In our version of SSSP, we restrict the $x_i$'s to $\{0, 1\}$, but this is just for simplicity; like RSA-S1, we could permit the $x_i$'s to have a slightly larger range.) The SSSP is also similar the "full rank avoidance" problem initially proposed by Mulmuley and Sohoni as part of their program to separate P from NP. The full rank avoidance problem asks: given a matrix X with n rows and kn columns grouped as n blocks of k, is it possible to choose one column from each block so that the resulting n×n matrix M has det(M)=0? In our setting, we need k to be at least $\gamma_{setsize}(n)/n$. Gurvitz showed the problem to be NP-hard for k=2.

If the SSSP is hard, what are we to make of all of the published attacks against RSA-S1 and its variants? (See B. Pfitzmann and M. Waidner, "Attacks on protocols for server-aided RSA computation", in *Proc. of Eurocrypt '92*, LNCS 658, pages 153-162, Springer, 1993, and P. Q. Nguyen and J. Stern, "The BeguinQuisquater server-aided RSA protocol from Crypto '95 is not secure", in *Proc. of Asiacrypt '98*, pages 372-379, Springer, 1998, and J. Merkle, "Multi-round passive attacks on server-aided RSA protocols", in *Proc. of ACM CCS '00*, pages 102-107, ACM, 2000, and P. Q. Nguyen and I. Shparlinski, "On the Insecurity of Some Server-Aided RSA Protocol", *Asiacrypt '01*, LNCS 2248, pp. 21-35.) These attacks are feasible only for limited choices of RSA-S1 parameters; they are not polynomial-time in general. Some of these are essentially time-space tradeoffs, meet-in-the-middle type attacks, whose complexity is exponential in $\gamma_{subsetsize}(n)$; these attacks are not polynomial-time when $\gamma_{subsetsize}(n) = w(1)$.

Nguyen and Shparlinski present a lattice-based cryptanalysis of RSA-S1 that succeeds with advantage at least $$1 - (\gamma_{subsetsize}(n))^{\gamma_{setsize}(n)+2} \cdot \alpha)/q$$

where $\alpha$ is a term that is greater than 1, and where $q = \phi(N)$ and N is the RSA modulus. We can easily avoid the attack by choosing $\gamma_{setsize}(n)$ to be larger than $\log q$. Note that Theorem 11.5 only requires $\log q$ to be larger than $\log(\det(IJ))$ by an additive factor that super-logarithmic in n. So, for example, we could take $\gamma_{setsize}(n)$ to be about $2 \cdot \log(\det(IJ))$. The intuition is that, once $\gamma_{setsize}(n)$ is sufficiently large, there will be exponentially many subsets in $\tau$ (not necessarily sparse) whose vector sum is congruent to $v_J^{sk*}$; lattice reduction techniques have trouble extracting the sparse subset from among the many subset solutions.

11.2 Counterbalancing Assumptions

As discussed above, the best known attack on the SSSP is exponential in $\gamma_{subsetsize}(n)$, as long as $\gamma_{setsize}(n)$ is chosen to be large enough to avoid a lattice attack by Nguyen and Shparlinski. I.e., the best attack takes time (roughly) $2^{\gamma_{subsetsize}(n)}$.

On the other hand, by Theorem 10.5, our scheme becomes bootstrappable when $$\gamma_{subsetsize}(n) \cdot \log^{c_1} \gamma_{subsetsize}(n) \leq \left( \frac{\log(r_{Dec}/m)}{2^{c_2} \cdot \log(\gamma_{Mult}(R) \cdot r_{Enc})} \right)$$

To allow $\gamma_{subsetsize}(n)$ to be as large as possible for a fixed value of $r_{Dec}/r_{Enc}$, we let $\gamma_{Mult}(R)$, $r_{Enc}$ and m be as small as possible (polynomial in n), and $r_{Dec}$ is then approximately $2^{\gamma_{subsetsize}(n)}$. We saw in Section 7.7 that the approximation factor of the decision BDDP on which we base security is at least as large as $r_{Dec}/r_{Enc}$—i.e., about $2^{\gamma_{subsetsize}(n)}$. We use the rule of thumb that solving $2^{\gamma_{subsetsize}(n)}$-decision BDDP takes time approximately $2^{n/\gamma_{subsetsize}(n)}$ using known attacks.

We can set $\gamma_{subsetsize}(n) \approx \sqrt{n}$ to make known attacks on the two problems "equally" expensive (up to the crudeness of our approximations). Or, to put it another way, we can set $\gamma_{subsetsize}(n) \approx \lambda$, where $\lambda$ is the security parameter of our scheme, and obtain exponential $2^\lambda$ security against known attacks. Note that this requires our lattice dimension to be quite large: $n \approx \lambda^2$.

Note that in the somewhat homomorphic scheme without bootstrapping, we do not put any "hint" about the original secret key in the public key, and do not need the second computational assumption. In this case, if we (say) only want to evaluate constant depth, then (as far as we know) it suffices to take n quasi-linear in $\lambda$ to achieve $2^\lambda$ security against known attacks. On the other hand, if we want to evaluate $\theta(\log n)$ depth, this forces us to use a sub-exponential approximation factor in decision BDDP, permitting sub-exponential attacks, and forcing us to take n to be a higher-degree polynomial in $\lambda$.

12 Performance and Optimizations

In this Section, we analyze the performance of our (leveled) fully homomorphic encryption scheme, and describe a few ways to improve the scheme's computational efficiency.

Even after some simple optimizations described in Subsection 12.1, we find in Subsection 12.2 that if we want to obtain $2^\lambda$ security against known attacks (on each of the two problems on which the security of our scheme is based), the computation per gate in our unoptimized scheme is quasi-linear in $\lambda^9$. The computational expense has several sources:

Homomorphic Decryption: The fact that we perform decryption homomorphically, rather than just conventionally, essentially "squares" the computational complexity Squashing the Decryption Circuit: This procedure minimized the depth of our decryption circuit, but at the expense of substantially increasing the circuit's size, and increasing the size of the secret key and ciphertexts Counterbalancing assumptions: Make both of our problems hard requires a large lattice dimension These problems all go away if we only use the somewhat homomorphic encryption scheme (without bootstrapping); this basic scheme is quite efficient.

In Subsection 12.3, we provide two optimizations, neither substantially decreasing security, that reduce the computation per gate to quasi-linear in $\lambda^6$. While still high, this does not seem so unreasonable when one considers that, to get $2^\lambda$ security against the number field sieve, one should use an RSA modulus whose bit-length is quasi-linear in $\lambda^3$, in which case a full exponentiation takes time quasi-linear in $\lambda^6$, even when one uses fast FFT multiplication. We also provide a third optimization, but where security only holds under the assumption that a different SplitKey Distinguishing Problem is hard. For this different version of the problem, we have no reduction from the SSSP.

12.1 Simple Optimizations

First, we note some very simple optimizations, before getting to the more technical ones described in Subsection 12.3.

As a preliminary matter, before we begin discussing the scheme's computation per gate, we note that there is some flexibility in how one defines a gate. (See Section 4, where we defined what it means for an encryption scheme to be bootstrappable with respect to a set of gates $\Gamma$.) In particular, a "gate" could be a "normal" boolean circuit of depth greater than 1. If we use "bigger" gates, then we perform expensive Recrypt operations less often, which may improve efficiency. However, for simplicity of exposition, we will assume in the discussion below that we use NAND gates.

For each NAND gate in C, we evaluate two decryption circuits $D_\epsilon$ homomorphically, and then compute NAND homomorphically. In our transformation above from $\epsilon^*$ (the somewhat homomorphic scheme) to $\epsilon$ (with the squashed decryption circuit), we said that a homomorphic Add consisted of extracting $(\psi^*_1, \psi^*_2)$ (the ciphertexts from the somewhat homomorphic scheme) from $(\psi_1, \psi_2)$ (the ciphertexts from the transformed scheme), adding $\psi^*_1$ and $\psi^*_2$ within the somewhat homomorphic scheme (using simple ring addition) to obtain $\psi^*$, and then setting the output $\psi$ to include $\psi^*$ and the output of $\text{ExpandCT}_\epsilon(pk, \psi^*)$. However, it is actually overkill to use ExpandCT for the interior gates of the NAND-augmented decryption circuit that we are computing; really we only need apply ExpandCT at the end, and can use simple ring addition and multiplication for the interior gate homomorphisms.

Another optimization is that, when applying Recrypt to $\psi$ (the encryption of $\tau$ under $pk_1$), we do not really need to first encrypt the bits of $\psi$ under $pk_2$. Instead, we can view the bits themselves as ciphertexts under $pk_2$, since there is no requirement that these "ciphertexts" be hiding. In other words, we do not actually need to evaluate the general decryption circuit, but rather merely a non-uniform decryption circuit that takes only the secret key as input and has the ciphertext hard-wired. So, overall, the complexity (per gate in C) is approximately twice the complexity of this simplified version of Recrypt, plus the complexity of ExpandCT.

12.2 Basic Performance

As discussed in Section 11.2, the SplitKey Distinguishing Problem becomes harder as $\gamma_{subsetsize}(n)$ increases, while the decision BDDP becomes easier, since increasing $\gamma_{subsetsize}(n)$ increases the approximation factor of the problem. To make both of the problems hard, such that the breaking time of both problems is $2^\lambda$, requires us to use a large lattice dimension: $n \approx \gamma_{subsetsize}(n)^2 \approx \lambda^2$.

Now, let us consider the size of an encrypted secret key in our scheme. The secret key (unencrypted) is a $\gamma_{subsetsize}(n) \times \gamma_{setsize}(n)$ matrix of bits. We need $\gamma_{setsize}(n)$ to be rather large—larger than log det(IJ)—for our reduction from the SSSP to work. Since J contains a ball of radius $r_{Dec}$, where the latter is exponential in $\gamma_{subsetsize}(n)$, we have that log det(IJ)>n log $r_{Dec}$>n·$\gamma_{subsetsize}(n) \approx \lambda^3$. (And the upper bound log det (IJ)= $O(\lambda^3)$ works as well.) So, the secret key (unencrypted) key is approximately $\lambda^4$ bits. Encryption multiplies the bit-length by another factor of $\lambda^3$, since each ciphertext is a coset of J, where log det(IJ)=$O(\lambda^3)$ as described above. Overall, the encrypted secret key is approximately $\lambda^7$ bits.

Circumstances become even worse when this encrypted secret key is applied to the ciphertext components output by ExpandCT. Consider a single ciphertext component $c_i$. It has n coefficients, though each coefficient only needs to have a very small (poly-logarithmic) number of bits, the minimal number needed to ensure that the rounded sum is computed correctly. Each encrypted secret key bit is multiplied with one ciphertext component. Overall, this computation is quasi-linear in $\lambda^7 \times n \approx \lambda^9$, and in fact the result of this intermediate computation also has length quasi-linear in $\lambda^9$. The remaining computation is quasi-linear in $\lambda^9$, assuming FFT multiplication is used.

12.3 More Optimizations

As our first optimization, we observe that a simplified version of the secret key still works, due to properties of symmetric polynomials.

Optimization 1: Encode the secret key sk as a vector in $\{0, 1\}^{\gamma_{setsize}(n)}$, rather than a 0/1 incidence matrix of dimension $\gamma_{subsetsize}(n) \times \gamma_{setsize}(n)$.

Gain: Computational complexity is reduced by a factor of approximately $\gamma_{subsetsize}(n) \approx \lambda$.

In Optimization 1, $\tau$ and $ExpandCT_\epsilon$ are as before; the changes are in the format of sk and in the decryption algorithm, which is as follows.

$Decrypt_\epsilon(sk, \psi)$. Takes as input the secret key sk and a ciphertext $\psi$. It performs the following steps:

Step 1: Set the vectors $x_i \leftarrow sk_i \cdot c_i$

Step 2: From $x_1, \ldots, x_{\gamma_{setsize}(n)}$, generate integer vectors $y_1, \ldots, y_{\gamma_{setsize}(n)+1}$ with sum $\lfloor \Sigma x_i \rceil$.

Step 3: Compute $\pi \leftarrow \psi - (\Sigma y_i) \bmod B_I$

The key observation here is that all but $\gamma_{subsetsize}(n)$ of the $x_i$'s are 0, and that, if we have the promise that most of the numbers that we are summing up are 0, then we can compute the output above using a shallower circuit. Why? Recall that, in Lemma 9.1, we basically reduced computing the sum of t numbers to computing the Hamming weight of a vector $b \in \{0, 1\}^t$. Then, we used the fact that the binary representation of this Hamming weight is precisely $$(e_{2^{\lfloor \log t \rfloor}}(b_1, \ldots, b_t) \bmod 2, \ldots, e_{2^0}(b_1, \ldots, b_t) \bmod 2)$$

where $e_i$ is the ith symmetric polynomial. In Optimization 1, we use symmetric polynomials in the same way, but now with the observation that if we have the promise that b has Hamming weight at most k, then there is no need to compute evaluate the polynomials $e_{2^i}(b_1, \ldots, b_t)$ for $i > \lfloor \log k \rfloor$, since they will all be 0 anyway. So, in optimization 1, despite the more concise encoding of sk, we get by with computing the same low-degree elementary symmetric polynomials that we did originally, albeit now with $\gamma_{setsize}(n)$ inputs rather than $\gamma_{subsetsize}(n)$ inputs.

In particular, we have the following lemma, which is analogous to Lemma 9.1.

Lemma 12.1. For $i \in [1, t]$, let $a_i = (\ldots, a_{i,1}, a_{i,0}, a_{i,-1}, \ldots)$ be a real number given in binary representation mod $B_I$ with the promises that $\Sigma_i a_i \bmod 1 \in [-¼, ¼]$ and at most k of the $a_i$'s are nonzero. There is a mod-$B_I$ circuit C for generating t+1 integers $z_1, \ldots, z_{t+1}$ (also represented in binary) whose sum is $\lfloor \Sigma_i a_i \rceil$, such that if the generalized circuit g(C)'s inputs are in $\mathcal{B}(r_{in})$, then its outputs are in $\mathcal{B}(r_{out})$ for:

$$r_{out} \leq k \cdot t \cdot n \cdot \|B_I\| \cdot (t \cdot \gamma_{Mult}(R) \cdot r_{in})^{k \cdot poly \log(k)}$$

For $\|B_I\| \leq r_{in}$, $t \leq n$, and $\gamma_{Mult}(R) = n^{\Omega(1)}$, we have:

$$r_{out} \leq (\gamma_{Mult}(R) \cdot r_{in})^{k \cdot poly \log(k)}$$

Proof. The proof is essentially identical to the proof of Lemma 9.1—i.e., we compute the elementary symmetric polynomials up to degree k and use the matrix $M^{-1}$, now of rank k+1. The only real difference is in the value of $r_{out}$, which is affected by the fact that the polynomials now take more input variables.

Let C be the mod-$B_I$ sub-circuit for computing any bit of the binary representation of the Hamming weight. Using $n \cdot \|B_I\|$ as an upper bound on the length of elements in R mod $B_I$, we have $$\|g(C)(x_1, \ldots, x_t)\| \leq \gamma_{Mult}(R) \cdot n \cdot \|B_I\| \cdot \left(\sum_{i \in [0,k]} \|e_i(x_1, \ldots, x_t)\|\right) \cdot t \leq$$

$$\gamma_{Mult}(R) \cdot n \cdot \|B_I\| \cdot \left(\sum_{i \in [0,k]} \binom{t}{i} \gamma_{Mult}(R)^{i-1} \cdot r_{in}^i\right) \cdot t =$$

$$t \cdot n \cdot \|B_I\| \cdot \left(\sum_{i \in [0,k]} \binom{t}{i} (\gamma_{Mult}(R) \cdot r_{in})^i\right) \leq$$

$$t \cdot n \cdot \|B_I\| \cdot \left(\sum_{i \in [0,k]} (t \cdot \gamma_{Mult}(R) \cdot r_{in})^i\right) \leq k \cdot t \cdot n \cdot \|B_I\| \cdot (t \cdot \gamma_{Mult}(R) \cdot r_{in})^k$$

At this point, we have generated about log k numbers, each with O(log k) bits, with the same sum as $\Sigma b_i$. There is a O(log log k)-depth constant fan-in boolean circuit for computing this sum, which can be emulated by a O(log log k)-depth mod-$B_I$ circuit. Combining the above with results in the proof Theorem 7.2, the result follows.

Since $r_{out}$ is similar to before—i.e., exponential in $\gamma_{subsetsize}(n)$ (up to polylogarithmic factors)—one obtains a bootstrappable scheme with Optimization 1 with parameters similar to those required by Theorem 10.5.

Now, let us analyze the computation needed after Optimization 1. The more concise representation of the secret key has size quasi-linear in $\lambda^6$—i.e., $\gamma_{setsize}(n) \approx \lambda^3$ bits, each encrypted in a ciphertext of size approximately $n \cdot \gamma_{subsetsize}(n) \approx \lambda^3$. Multiplying the encrypted secret key balloons the result up to size quasilinear in $\lambda^8$. The dominant remaining computation is computing the elementary symmetric polynomials up to degree $\gamma_{subsetsize}(n)$. We need to do one such computation for the least significant bits of the least significant coefficients of the $c_i$'s, etc.; the total number of such computations is the number of bits in $c_i$, which is quasi-linear in $n \approx \lambda^2$.

The symmetric polynomials are the coefficients of $z^i$, $i \in [\gamma_{setsize}(n) - \gamma_{subsetsize}(n), \gamma_{setsize}(n)]$, in the polynomial $p(z) = \prod_{i=1}^{\gamma_{setsize}(n)}(z - b_i)$. Let $f(t)$ be the computation needed to compute the product of t of the $(z-b_i)$'s. Using the recursion that $f(t) = 2 \cdot f(t/2) + \text{poly} \log(t/2)$, the total computation needed to compute the symmetric polynomials (non-homomorphically) is $\gamma_{setsize}(n) \cdot \text{poly} \log(\gamma_{setsize}(n))$. Since the operations are performed homomorphically—i.e., with ciphertexts of size quasi-linear in $\lambda^3$ instead of with bits—the computation needed is quasilinear in $\lambda^6$. Since the number of Hamming weight computations is quasi-linear in $n \approx \lambda^2$, the total computation in quasi-linear in $\lambda^8$.

Remark 12.2. Though it does not affect the asympotics very much, we can optimize Optimization 1 as follows. When a polynomial associated to an interior node has degree $d > \gamma_{subsetsize}(n)$, we can discard its coefficients for $z^i$ for $i < d - \gamma_{subsetsize}(n)$, since they will not affect the end result; thus, at any node, we never maintain more than $\gamma_{subsetsize}(n)+1$ coefficients.

Optimization 2: Preprocess the initial ciphertext $\psi^*$ even more, collapsing each n-coefficient ciphertext component $c_i$ into a single coefficient.

Gain: Computational complexity is reduced by a factor of approximately $n \approx \lambda^2$. Combining with Optimization 1, the computational complexity per gate is reduced to $\lambda^6$.

Suppose the plaintext space is $\{0, 1\}$ and that $I=(2)$.[7] A ciphertext $\psi^*$ from the somewhat homomorphic scheme has the form $m+j$, where $m \in \pi \cdot e_1 + 2\mathbb{Z}^n$ is "short" and $j \in J$. Addition and multiplication of ciphertexts does not change the essential form of the ciphertext. In particular, the plaintext $\pi$ always hides in the least significant coefficient of $\psi^*$; for all of the other coefficients, the offset from the closest J-vector is even. This suggests that, our decryption equation

[7]Shai Halevi observed the optimization for this case.

$$\pi = \psi^* - \lfloor v_j^{sk*} \times \psi^* \rfloor \mod 2$$

we only really care about the least significant coefficient—i.e., $\pi$ can be recovered from the least significant coefficient of $\psi^*$ and the least significant coefficient of $$v_j^{sk*} \times \psi^* = \sum_{i \in S} t_i \times \psi^*$$

In Optimization 2, we modify ExpandCT to output only the least significant coefficients of the ciphertext components $c_i = t_i \times \psi^*$, and simplify decryption so that it only sums up these coefficients, reducing decryption computation by a factor of $n \approx \lambda^2$.

In certain cases, we can perform this optimization even when $I \neq (2)$. For example, the optimization works when $\det(I)$ is a small prime p, though the optimization is more complicated in this setting. First, compute a basis $B'_I$ of I, where the first column vector $b_0 = (p, 0, \ldots, 0)$, and $b_i = (a_i, 0, \ldots, 0, 1, 0, \ldots, 0)$ for $i \in [1, n-1]$, where the '1' is in the ith row and $a_i \in (-p/2, p/2)$. (This can easily be done using elementary column operations.) Consider a vector $m \in \mathbb{Z}^n$. Let $$m' \leftarrow m - \sum_{i=1}^{n-1} m_i \cdot b_i = m \bmod B_I,$$

Then all of the coefficients of m' are 0, except possibly the least significant coefficient. The idea is that if we could apply this transformation to the value of m hiding inside the ciphertext (i.e., where $\psi^* = m+j$ for $m \in \pi \cdot e_1 + I$ and $j \in J$), then it seems that we could ignore all but the least significant coefficient, as when $I=(2)$. But how do we apply this transformation to ciphertexts, when the value m is not accessible?

Before we get to how ExpandCT and Decrypt are modified, let us define a convenient notation. For $B'_I$ and p as above and $x \in \mathbb{Q}^n$, let $$x \text{ red } B'_I = x - \sum_{i=1}^{n-1} x_i \cdot b_i$$

Notice that all of the coefficients of $x \text{ red } B'_I$ are 0, except possibly the least significant one. Also, notice that $x+y$ red $B'_I = (x \text{ red } B'_I) + (y \text{ red } B'_I)$. Finally, notice that $x \text{ red } B'_I$ seems to have a close relationship with $x \bmod B'_I$, which equals $$x - \sum_{i=1}^{n-1} \lfloor x_i \rceil \cdot b_i \bmod p$$

The following lemma characterizes this relationship.

Lemma 12.3. Let $B'_I$ and p be as described above. Let $\delta$ and $\eta$ be positive reals such that $(np/2) \cdot \delta < \eta < \frac{1}{2}$. Suppose the coefficients of x are within $\delta$ of integers. Then, $$\lfloor x \bmod B'_I \rceil = \lfloor x \text{ red } B'_I \rceil \bmod p$$

Also, the least significant coefficient of $x \text{ red } B'_I$ has size at most $p \cdot \Sigma_i |x_i|$ and is within $\eta$ of an integer.

Proof. The upper bound on the magnitude of the least significant coefficient of $x \text{ red } B'_I$ is obvious.

Since the vectors in $B'_I$ are integer vectors, the coefficients of $(x \bmod B'_I)$ are within $\delta$ of integers. Also, for some integer k, we have $$(x \bmod B'_I) - (x \text{ red } B'_I) = \left(x - k \cdot p \cdot e_1 - \sum_{i=1}^{n-1} \lfloor x_i \rceil \cdot b_i\right) - \left(x - \sum_{i=1}^{n-1} x_i \cdot b_i\right)$$

$$= -k \cdot p \cdot e_1 + \sum_{i=1}^{n-1} (x_i - \lfloor x_i \rceil) \cdot b_i$$

Aside from the $-k \cdot p \cdot e_1$ term, all the coefficients of this difference have magnitude at most $(n-1) \cdot (p/2) \cdot \delta$. Since $\delta + (n-1) \cdot (p/2) \cdot \delta \leq (np/2) \cdot \delta < \eta$, the coefficients of $(x \text{ red } B'_I)$ are close (within $\eta$) to the same integers that the coefficients of $(x \bmod B'_I)$ are close to (up to a multiple of p for the least significant coefficient).

With that technical lemma in hand, we modify ExpandCT$_\epsilon$ and Decrypt$_\epsilon$ as follows.

ExpandCT$_\epsilon$(pk, ψ*). Computes $c'_i \leftarrow t_i \times \psi^*$ mod $B_I$ for $i \in [1, \gamma_{setsize}(n)]$, and outputs $c_i \leftarrow c'_i$ red $B'_I$. (All but the first coefficient of these vectors is 0, so these coefficients do not actually need to be output.)

Decrypt$_\epsilon$(sk, ψ). Takes as input the secret key sk and a ciphertext ψ. It performs the following steps, which are the same as after Optimization 1, but only the least significant coefficients need to be operated on:

Step 1: Set the vectors $x_i \leftarrow sk_i \cdot c_i$
Step 2: From $x_1, \ldots, x_{\gamma_{setsize}(n)}$, generate integer vectors $y_1, \ldots, y_{\gamma_{setsize}(n)+1}$ with sum $[\Sigma x_i]$.
Step 3: Compute $\pi \leftarrow \psi(\Sigma y_i)$ mod $B'_I$ To show that decryption is correct, it suffices to show that $$\psi - \left[\sum_{i \in S} c_i\right] = \psi - \left[\sum_{i \in S} c'_i\right] \bmod I$$

where the first expression is what is computed in the new decryption algorithm, and the second expression is what was computed prior to Optimization 2. But this follows from Lemma 12.3 as long as $\Sigma_{i \in S} c'_i$ has coefficients that are sufficiently close to integers.

Modulo I, $\Sigma_{i \in S} c'_i$ equals $v_J^{sk*} \cdot \psi^*$. To ensure that this quantity is sufficiently close to an integer vector, we tweak the set of permitted circuits once again, in much the same way as we did in Tweak 2 (see Section 8.4). (Recall that in Tweak 2, we changed the set of permitted circuits to require a ciphertext ψ* to be within $r_{Dec}/2$ of the J-lattice, so that the coefficients of $v_J^{sk*} \cdot \psi^*$ would be within ¼ of integers, thereby simplifying the rounding step.)

Optimization 3: Use the ring $R = Z[x]/(f(x))$ for $f(x) = x^n + 1$, where n is a power of 2. (Alternatively, one could use some other irreducible $f(x)$ that equals $x^n + h(x)$ for some constant-degree polynomial h(x) with $\|h\| = poly(n)$.) To set τ, generate $2 \cdot \gamma_{subsetsize}(n)$ random vectors $$x_j \xleftarrow{R} J^{-1}$$

subject to the constraint that that there exists a vector $s \in \{0, 1\}^{2 \cdot \gamma_{subsetsize}(n)}$ of Hamming weight $\gamma_{subsetsize}(n)$, and a vector $r \in \{0, \ldots, n-1\}^{2 \cdot \gamma_{subsetsize}(n)}$ such that $$v_J^{sk*} = \sum_{i=1}^{2 \cdot \gamma_{subsetsize}(n)} (s_i \cdot x_i^{r_i} \bmod f(x)) \bmod I$$

Gain: Computational complexity is reduced by a factor of approximately $n \approx \lambda^2$. With the previous optimizations, the computation per gate is quasilinear in $\lambda^4$.

To describe the optimization another way, τ does not consist of $\gamma_{setsize}(n)$ vectors that are random and independent (aside from the subset sum constraint). Instead, it consists of only $2 \cdot \gamma_{subsetsize}(n)$ vectors that we "unpack" into $2 \cdot n \cdot \gamma_{subsetsize}(n)$ vectors by using all the "rotations" of the original $2 \cdot \gamma_{subsetsize}(n)$ vectors; the vectors are random and independent aside from a subset sum constraint on the $2 \cdot n \cdot \gamma_{subsetsize}(n)$ vectors. The secret key sk consists of $2 \cdot \gamma_{subsetsize}(n)$ ciphertexts encrypting the bits of s, as well as $2 \cdot \gamma_{subsetsize}(n)$ ciphertexts that encrypt the rotations; the value $r_i \in [0, n-1]$ is encrypted in a ciphertext having the form $x^{r_i} + i + j$ for $i \in I$ and $j \in J$. Notice that this secret key is much more concise, by a factor of approximately $\gamma_{setsize}(n)/\gamma_{subsetsize}(n)$.

In ExpandCT, we output $\{x_i \times \psi^*\}$, much fewer values than before. Combining the secret key with these ciphertext components (in the obvious way) also takes much less computation than before, by a multiplicative factor of approximately $\lambda^2$.

The drawback of this optimization is that its security is questionable. In particular, the less random choice of τ prevents the reduction from the SSSP.

The optimizations above are directed toward minimizing the total computational complexity of our scheme. But we note that the parallel computational complexity of scheme is already inherently low, precisely because we require the circuit depth of our decryption to be very low. Even with bootstrapping, our scheme could be extremely efficient in a massively parallel implementation.

13 Circuit Privacy

Recall our definition of circuit privacy (Definition 2.6). We say that a homomorphic encryption scheme ϵ is circuit-private for circuits in $\mathcal{C}_\epsilon$ if, for any key-pair (sk, pk) output by KeyGen$_\epsilon(\lambda)$, any circuit $C \in \mathcal{C}_\epsilon$, and any fixed ciphertexts $\Psi = \langle \psi_1, \ldots, \psi_t \rangle$ that are in the image of Encrypt$_\epsilon$ for plaintexts $\pi_1, \ldots, \pi_t$, the following distributions (over the random coins in Encrypt$_\epsilon$, Evaluate$_\epsilon$) are (statistically) indistinguishable:

$$\text{Encrypt}_\epsilon(pk, C(\pi_1, \ldots, \pi_t)) \approx \text{Evaluate}_\epsilon(pk, C, \Psi)$$

where correctness obviously still must hold.

So far, our scheme may not be circuit private. In fact, ciphertexts output by Evaluate clearly come from a different distribution than those output by Encrypt, since ciphertexts output by Evaluate will tend to be further away from the lattice J (since they are not as "fresh").

However, obtaining circuit privacy for our scheme is quite straightforward. Our approach is to use a public (i.e., not using the secret key) algorithm RandomizeCT$_\epsilon$ that, applied post hoc, induces the same distribution (statistically) to ciphertexts output by Encrypt$_\epsilon$ and Evaluate$_\epsilon$, while preserving correctness.

The idea is simple: to construct a random encryption ψ' of π from a particular encryption ψ of π, we simply add an encryption of 0 that has a much larger random "error" vector than ψ—super-polynomially larger, so that the new error vector statistically obliterates all information about ψ's error vector. However, this description is not entirely accurate, since a "proper" encryption of '0,' whether output by Encrypt$_\epsilon$ or Evaluate$_\epsilon$, is a vector lying inside $J + \mathcal{B}(r_{Dec}/m)$—i.e., a vector whose distance from J is at most $r_{Dec}/m$, where m depends on which tweaks we use. On the other hand, our randomizing encryption of '0' will be much further away from J. In particular, it will be chosen from $J + \mathcal{B}(\alpha \cdot r_{Dec}/m)$ where α is super-polynomial, so that the "noise" from this randomizing encryption statistically obliterates any information about the initial ciphertext's offset from J. We need $\mathcal{B}(\alpha \cdot r_{Dec}/m) \subset X_{Dec}$ to ensure correct decryption; so, this tweak once again entails increasing m.

14 Other Embodiments

Above, we described (among other things) a bootstrappable encryption scheme, and a method to use a bootstrappable encryption to construct a (leveled, unless circular security is assumed) fully homomorphic encryption scheme. Here, we mention (in a non-limiting fashion) other embodiments of the invention.

We described a bootstrappable encryption scheme that uses ideal lattices. However, the scope of bootstrappable encryption schemes is not limited to lattices; it may be possible to construct one that uses some other mathematical object. (Indeed, in subsequent work, Marten van Dijk, Craig Gentry, Shai Halevi, and Vinod Vaikuntanathan, "Fully Homomorphic Encryption over the Integers", in *Eurocrypt* 2010, LNCS 6110, pages 24-43, Springer, 2010, describes a different embodiment of a bootstrappable encryption scheme that uses mere integers, rather than lattices.) The essence of a bootstrappable encryption scheme is defined in Section 4—i.e., that the scheme is able to evaluate its own decryption circuit, as well as an augmentation of its decryption circuit by some set of nontrivial gates, where these gates are preferably sufficient for universal computation (e.g., AND, and NOT). In connection with this invention, we have described the first bootstrappable encryption scheme. We have emphasized how a bootstrappable encryption scheme is useful as a tool to construct a fully homomorphic encryption scheme, but the utility of bootstrappable encryption may not be limited to this application. Indeed, we described how bootstrappable encryption can be used to construct a one-way multi-use proxy re-encryption scheme.

It is easily understood to one versed in the art that the algorithms of the encryption schemes described herein can be represented as programs of executable code, stored in computer memory, and executed by a computer processor. This computer could be a general purpose computer. Alternatively, it could be a computer that is equipped to handle highly parallel processing; indeed, since some of the algorithms in our scheme (such as the homomorphic decryption operation) require a lot of computation, but computation which can be performed in a highly parallel fashion, using such a computer architecture in connection with our scheme would be highly advantageous. Alternatively, the computer architecture and hardware could be designed and optimized specifically to run our encryption scheme as efficiently as possible.

What is claimed is:

1. A method, comprising: receiving a plurality of ciphertexts that encrypt information under a public key of a bootstrappable homomorphic encryption scheme; and applying the Evaluate function of the bootstrappable homomorphic encryption scheme to inputs comprising the ciphertexts and a circuit.

2. The method of claim 1, where the bootstrappable homomorphic encryption scheme is a leveled fully homomorphic encryption scheme.

3. The method of claim 1, where the bootstrappable homomorphic encryption scheme is a fully homomorphic encryption scheme.

4. A method, comprising: receiving a plurality of ciphertexts that encrypt information under a public key of a homomorphic encryption scheme, where the homomorphic encryption scheme is operable to compactly evaluate the addition of two values and also operable to compactly evaluate a multiplication of two values, where the homomorphic encryption scheme uses public key information and secret key information, and includes an encryption function, a decryption function and an evaluation function, where the secret key information in the homomorphic encryption scheme comprises a secret representation of an algebraic ideal in a ring, where the encryption function takes input comprising first information and outputs second information comprising an element of the ring that is in a coset of the algebraic ideal, where the distribution of coset conditioned on the first information has high minentropy, where the decryption function operates to decrypt data encrypted under the certain public key by using at least the secret representation of the algebraic ideal in the secret key information; and applying the Evaluate function of the homomorphic encryption scheme to inputs comprising the ciphertexts and a circuit.

5. The method of claim 4, where the homomorphic encryption scheme has a proof of semantic security against CPA attacks.

6. The method of claim 4, where the homomorphic encryption scheme uses ideal lattices.

7. The method of claim 4, where the homomorphic encryption scheme uses two relatively prime algebraic ideals.

8. The method of claim 4, where the encryption scheme is operable to compactly evaluate any boolean circuit of depth logarithmic in the security parameter.

9. A program storage device readable by a machine and tangibly embodying a program of instructions executable by the machine for performing operations comprising: receiving a plurality of ciphertexts that encrypt information under a public key of a bootstrappable homomorphic encryption scheme; and applying the Evaluate function of the bootstrappable homomorphic encryption scheme to inputs comprising the ciphertexts and a circuit.

10. The program storage device of claim 9, where the bootstrappable homomorphic encryption scheme is a leveled fully homomorphic encryption scheme.

11. The program storage device of claim 9, where the bootstrappable homomorphic encryption scheme is a fully homomorphic encryption scheme.

12. A program storage device readable by a machine and tangibly embodying a program of instructions executable by the machine for performing operations comprising: receiving a plurality of ciphertexts that encrypt information under a public key of a homomorphic encryption scheme, where the homomorphic encryption scheme is operable to compactly evaluate the addition of two values and also operable to compactly evaluate a multiplication of two values, where the homomorphic encryption scheme uses public key information and secret key information, and includes an encryption function, a decryption function and an evaluation function, where the secret key information in the homomorphic encryption scheme comprises a secret representation of an algebraic ideal in a ring, where the encryption function takes input comprising first information and outputs second information comprising an element of the ring that is in a coset of the algebraic ideal, where the distribution of coset conditioned on the first information has high min-entropy, where the decryption function operates to decrypt data encrypted under the certain public key by using at least the secret representation of the algebraic ideal in the secret key information; and applying the Evaluate function of the homomorphic encryption scheme to inputs comprising the ciphertexts and a circuit.

13. The program storage device of claim 12, where the homomorphic encryption scheme has a proof of semantic security against CPA attacks.

14. The program storage device of claim 12, where the homomorphic encryption scheme uses ideal lattices.

15. The program storage device of claim 12, where the homomorphic encryption scheme uses two relatively prime algebraic ideals.

16. The program storage device of claim 12, where the encryption scheme is operable to compactly evaluate any boolean circuit of depth logarithmic in the security parameter.

* * * * *